United States Patent

Ishihara et al.

[11] Patent Number: 5,530,497
[45] Date of Patent: Jun. 25, 1996

[54] CAMERA IN WHICH THE NUMBER OF FILM REWINDING OPERATIONS MAY BE RESTRICTED

[75] Inventors: Masaaki Ishihara, Yokohama; Kenichiro Amano, Tokyo, both of Japan

[73] Assignee: Canon Kabushiki Kaisha, Japan

[21] Appl. No.: 278,125

[22] Filed: Jul. 21, 1994

Related U.S. Application Data

[63] Continuation of Ser. No. 865,041, Apr. 1, 1992, abandoned.

[30] Foreign Application Priority Data

| Apr. 2, 1991 | [JP] | Japan | 3-094923 |
| Apr. 2, 1991 | [JP] | Japan | 3-094924 |
| Apr. 2, 1991 | [JP] | Japan | 3-094925 |
| May 28, 1991 | [JP] | Japan | 3-150965 |
| Sep. 24, 1991 | [JP] | Japan | 3-270544 |
| Sep. 24, 1991 | [JP] | Japan | 3-270545 |

[51] Int. Cl.⁶ ............................... G03B 7/00
[52] U.S. Cl. ............................ 354/21; 354/106
[58] Field of Search .................. 354/21, 105, 106, 354/173.1, 207, 212, 213, 214, 215

[56] References Cited

U.S. PATENT DOCUMENTS

| 4,864,332 | 9/1989 | Harvey | 354/21 |
| 4,947,197 | 8/1990 | Smart et al. | 354/214 |
| 4,965,600 | 10/1990 | Smart et al. | 354/212 |

FOREIGN PATENT DOCUMENTS 3200131  9/1991  Japan.

Primary Examiner—Howard B. Blankenship
Attorney, Agent, or Firm—Fitzpatrick, Cella, Harper & Scinto

[57] ABSTRACT

Camera apparatus capable of restricting the number of intermediate rewinding operations of a film into the film cartridge includes intermediate rewinding structure for rewinding the film into the film cartridge at a stage where a portion of the film frames has not yet been exposed. Restriction circuitry is provided for restricting the number of intermediate rewinding operations permitted to be performed on said film by said intermediate rewinding structure.

23 Claims, 83 Drawing Sheets

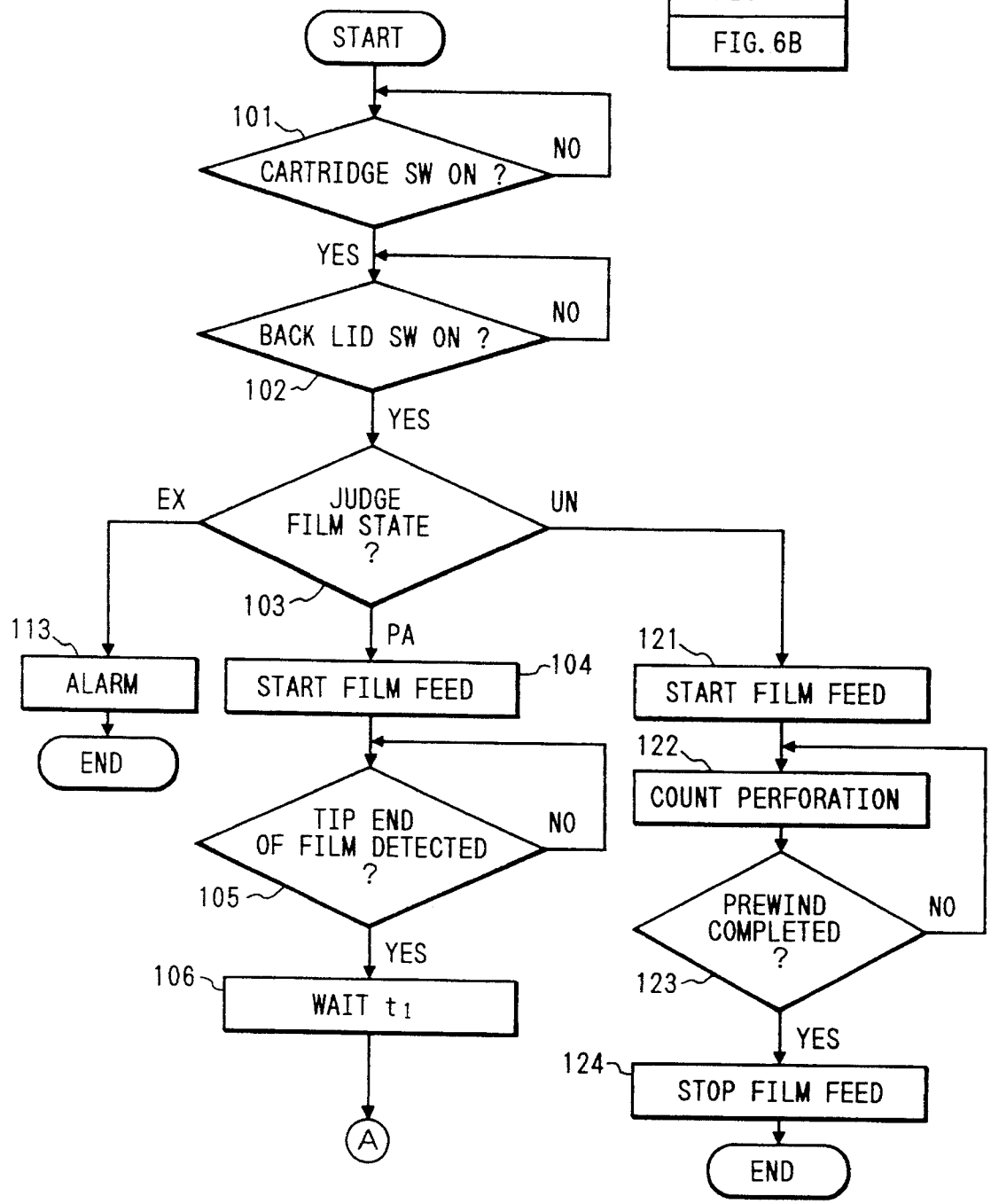

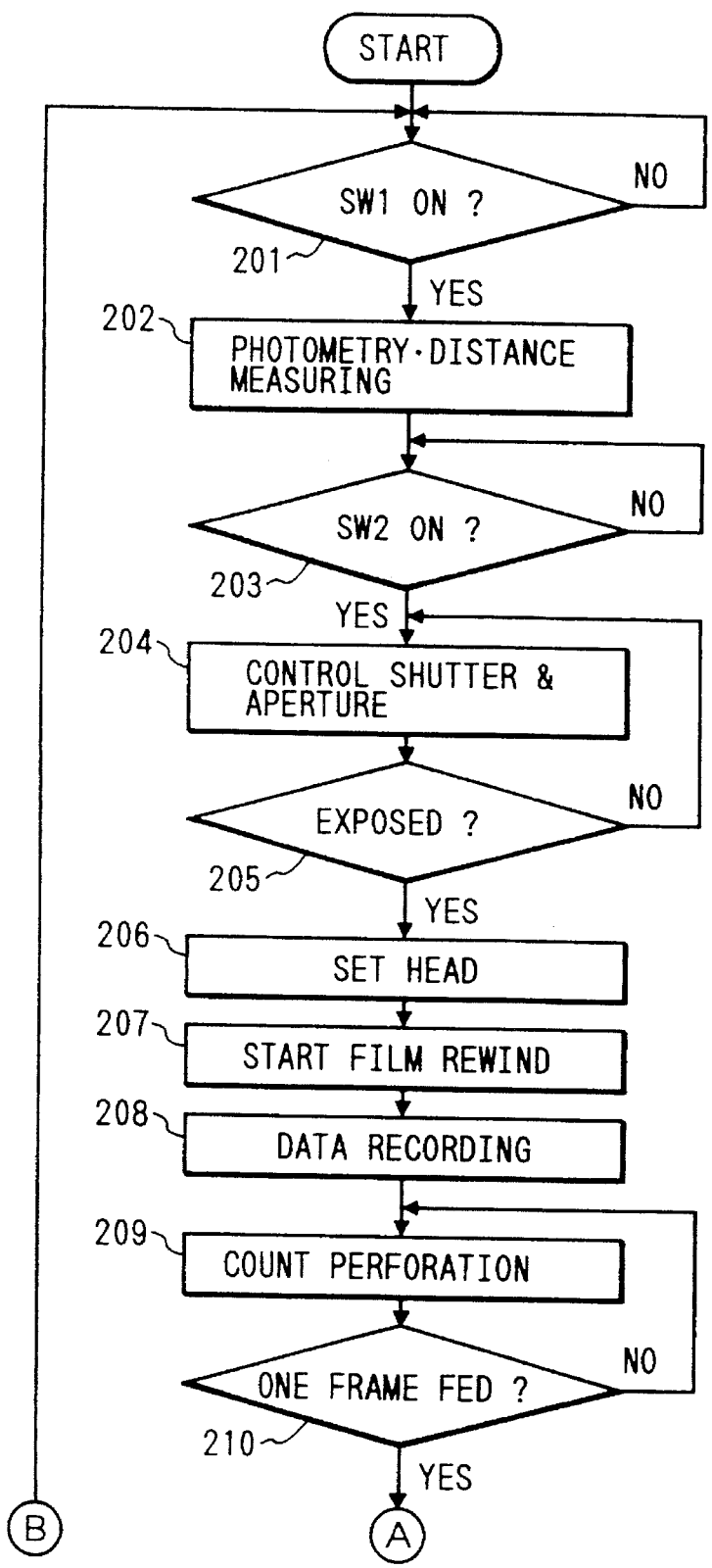

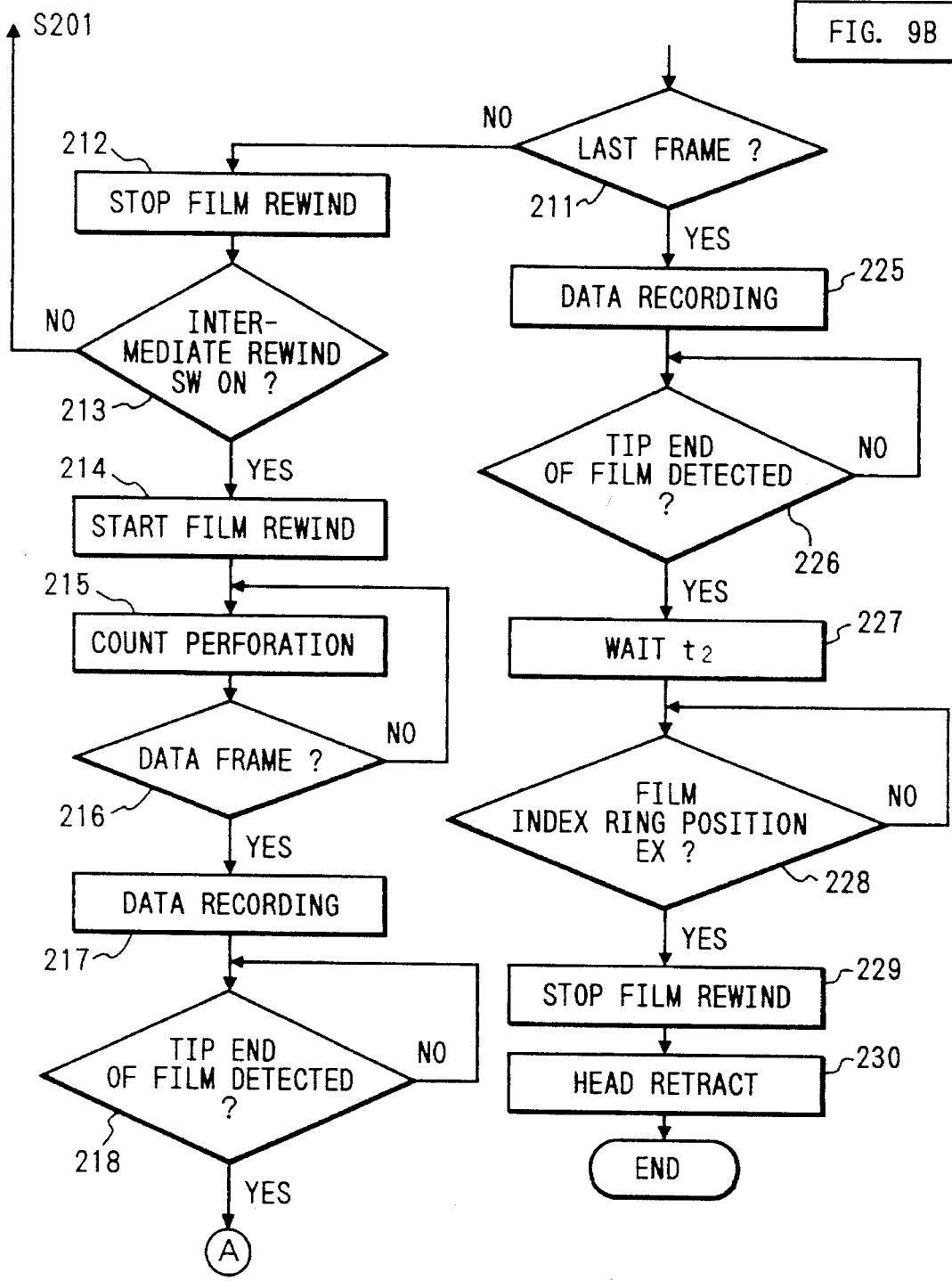

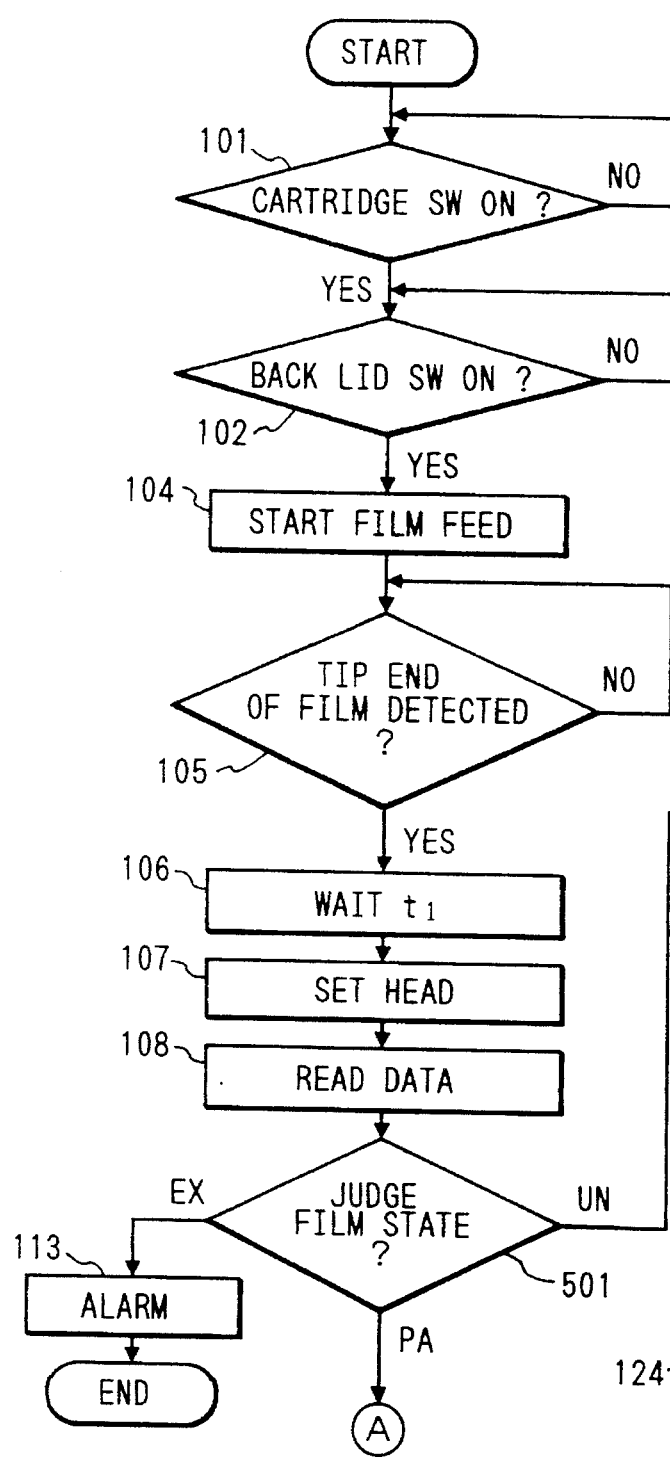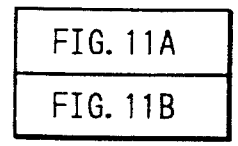

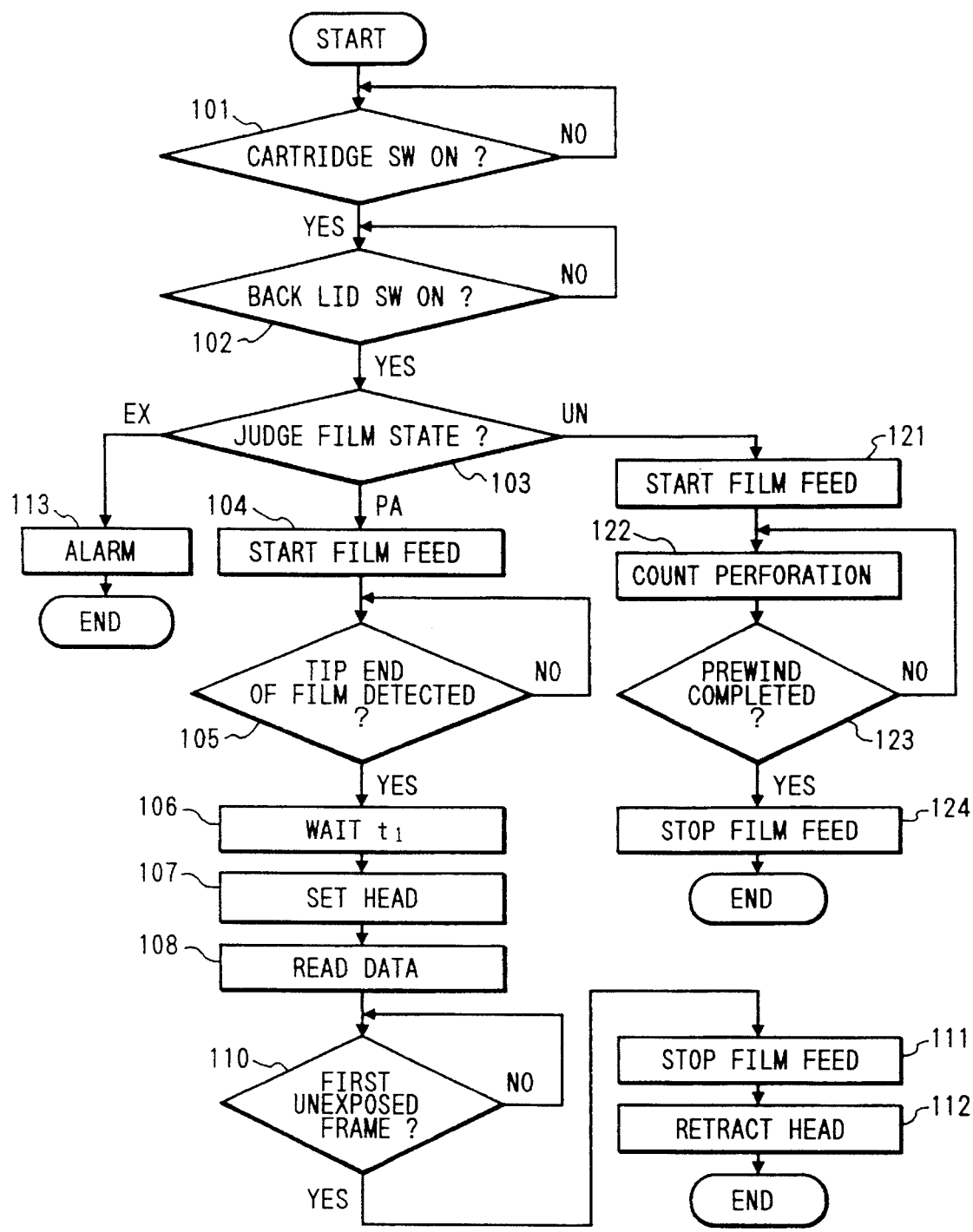

FIG. 16
| FIG. 16A |
| FIG. 16B |
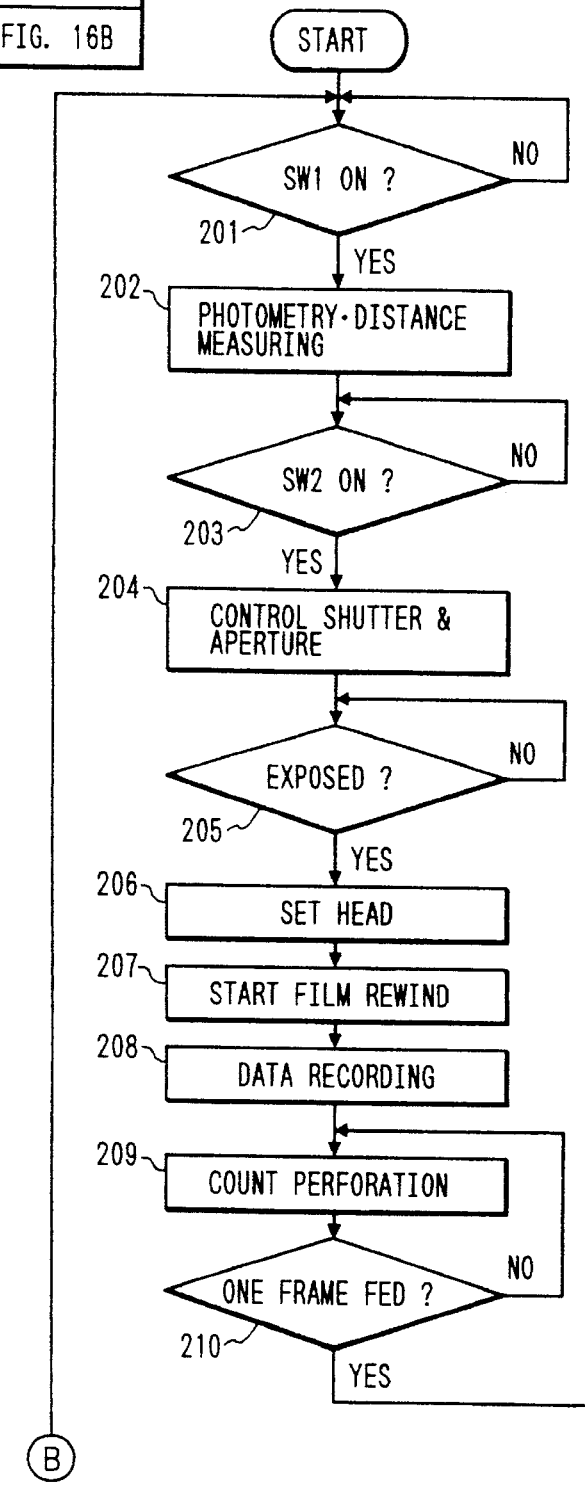
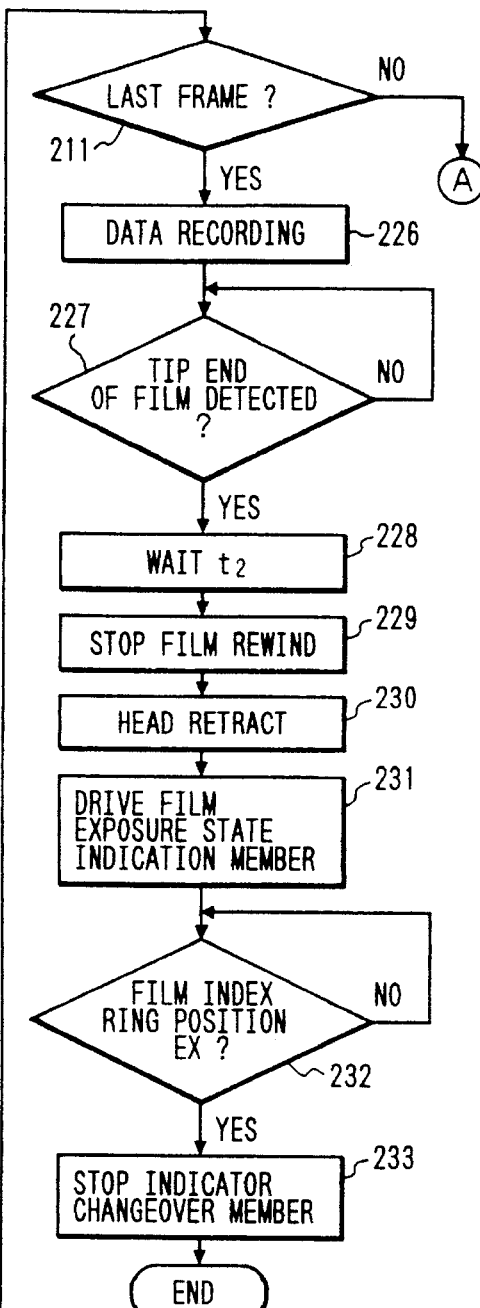
FIG. 16A

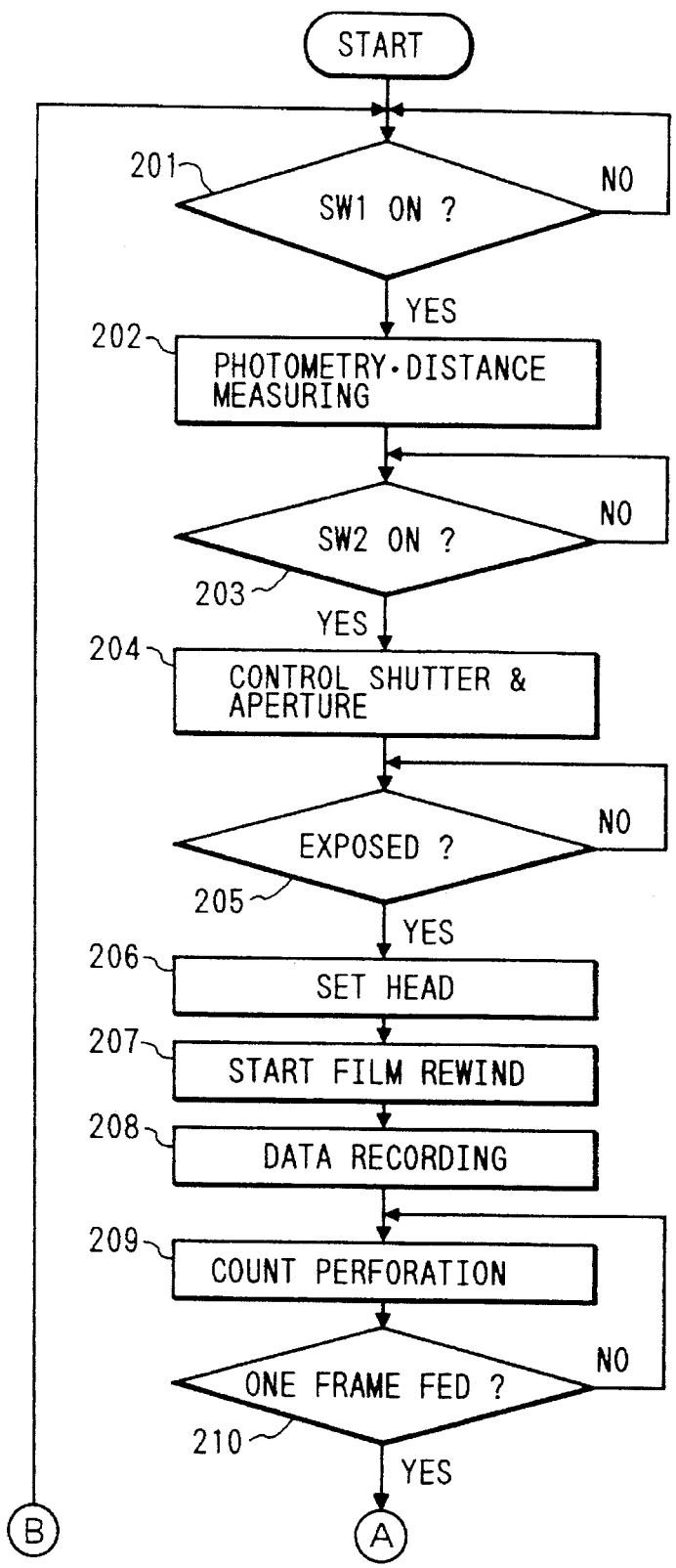

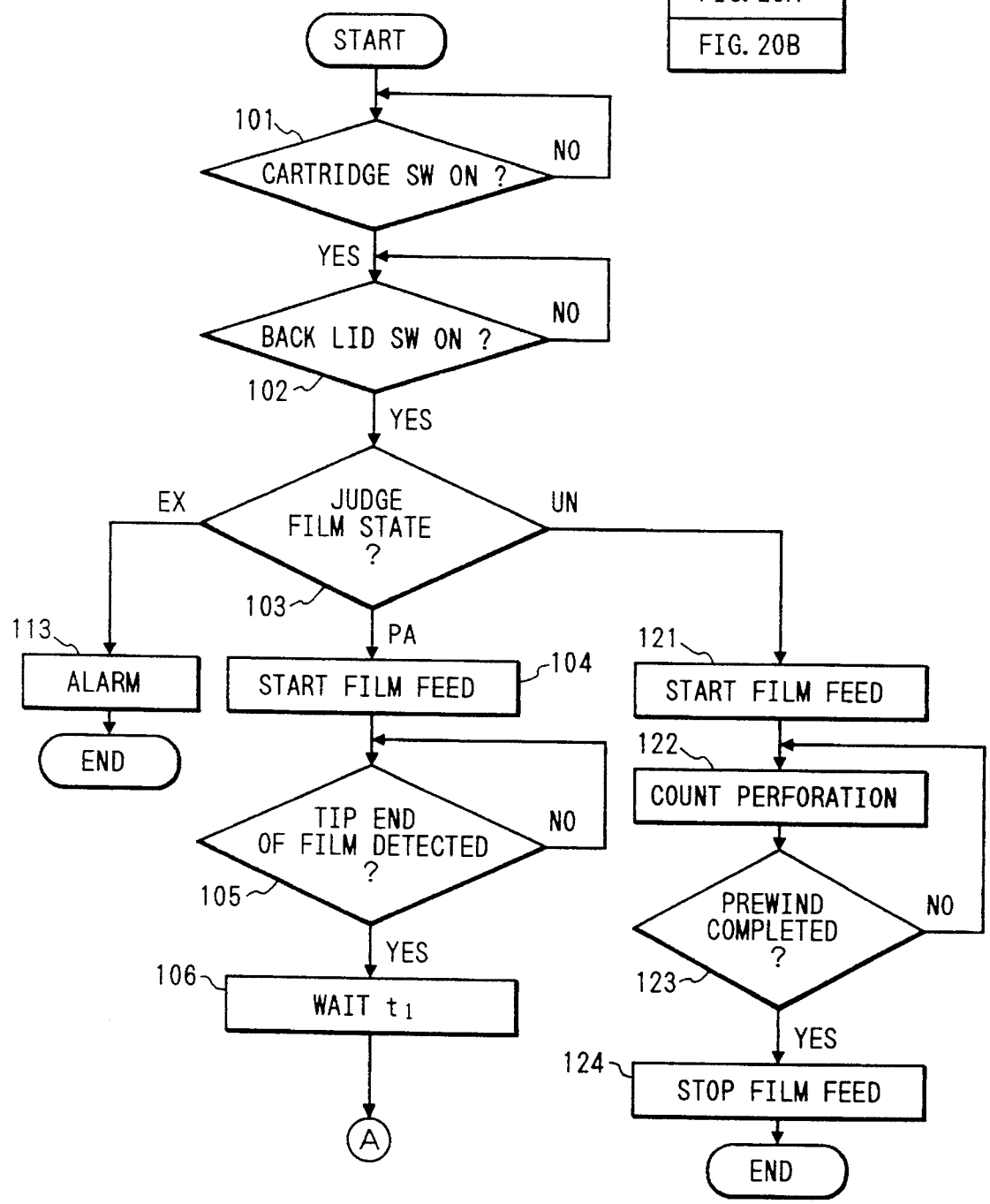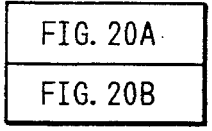

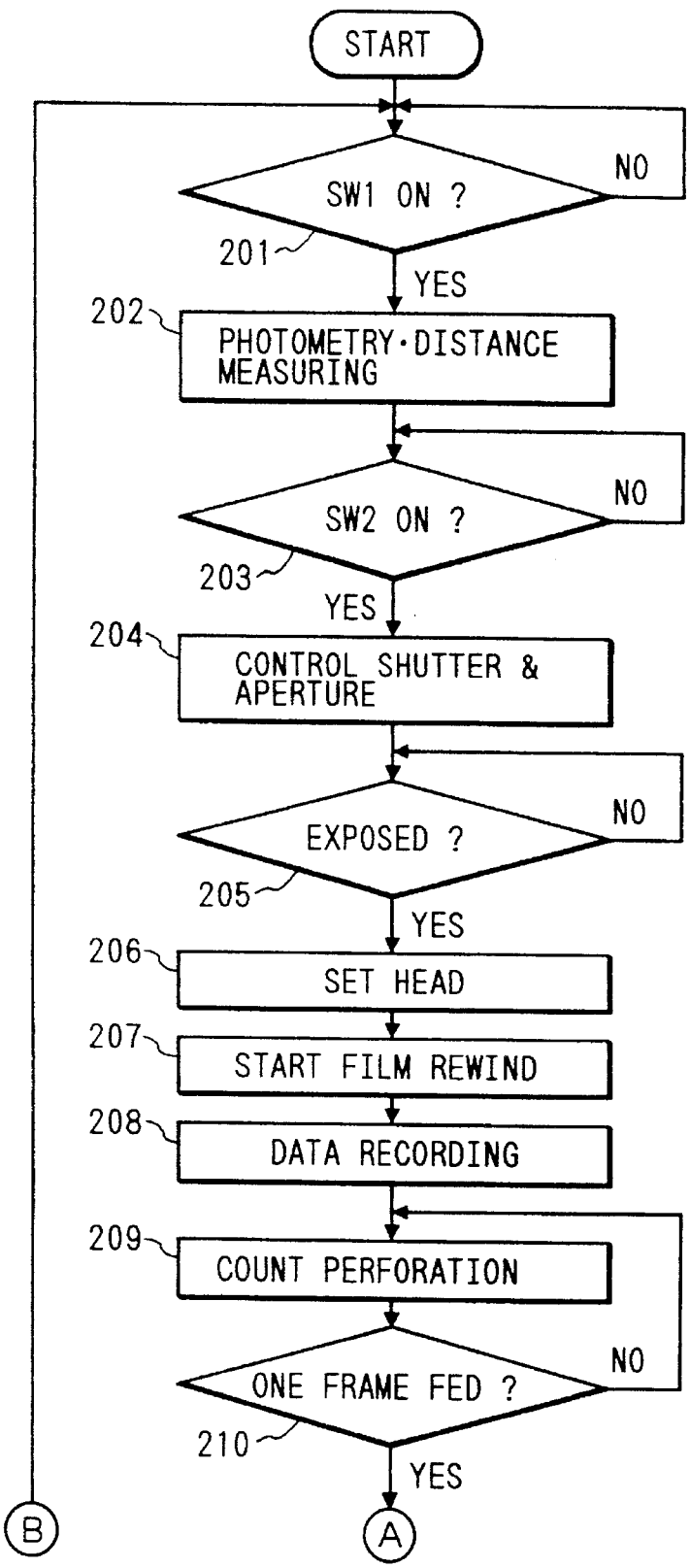

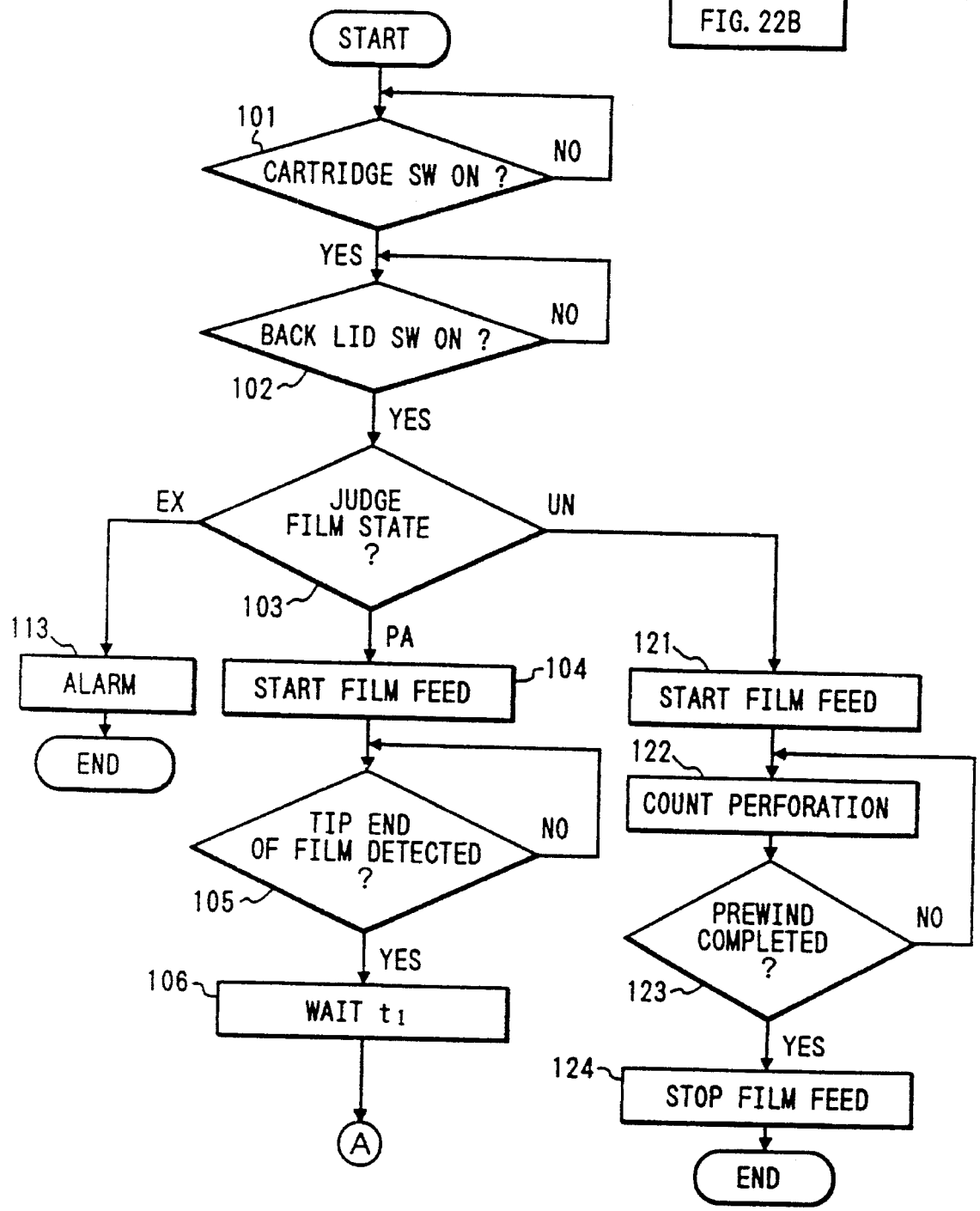

| FIG. 23A |
| FIG. 23B |

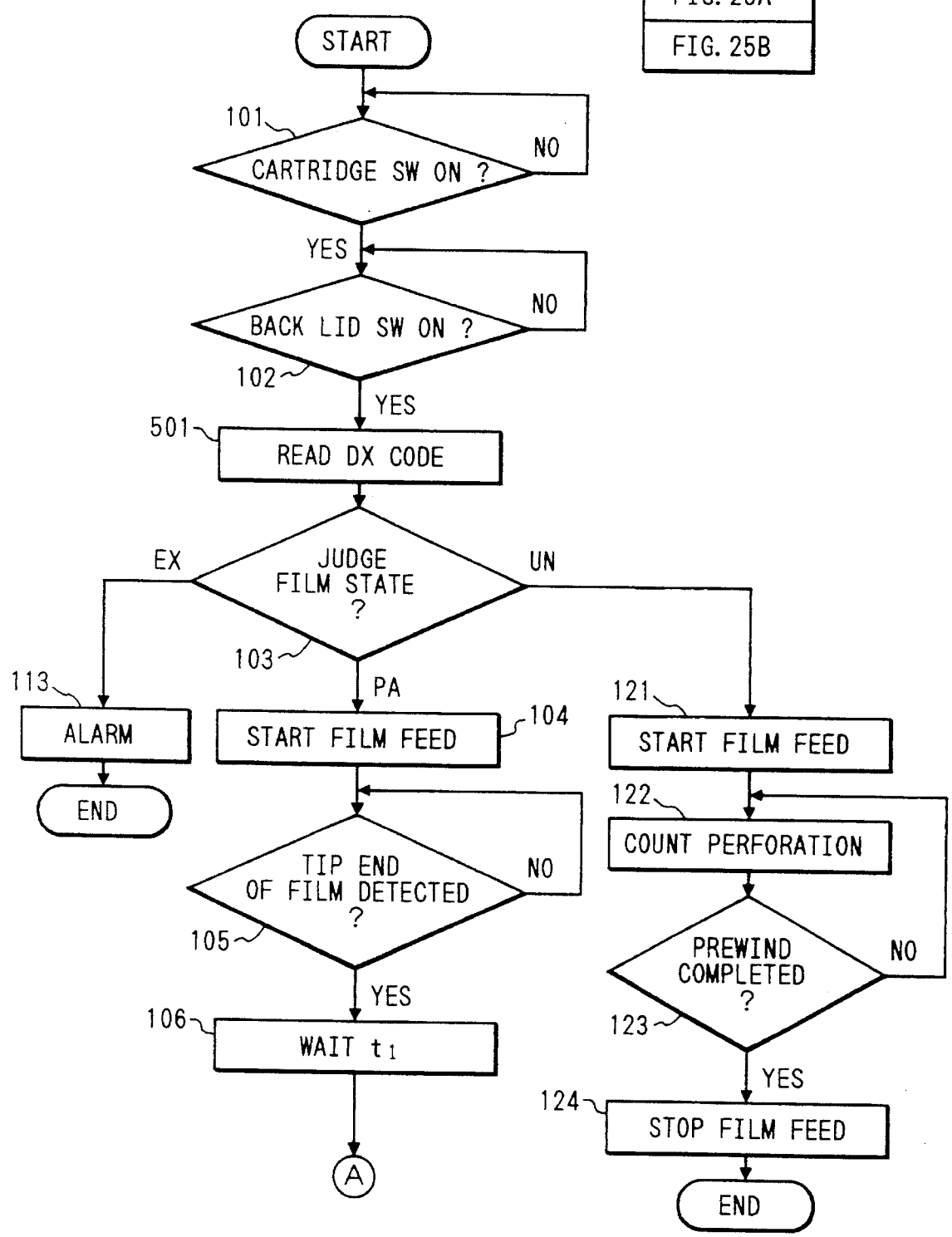

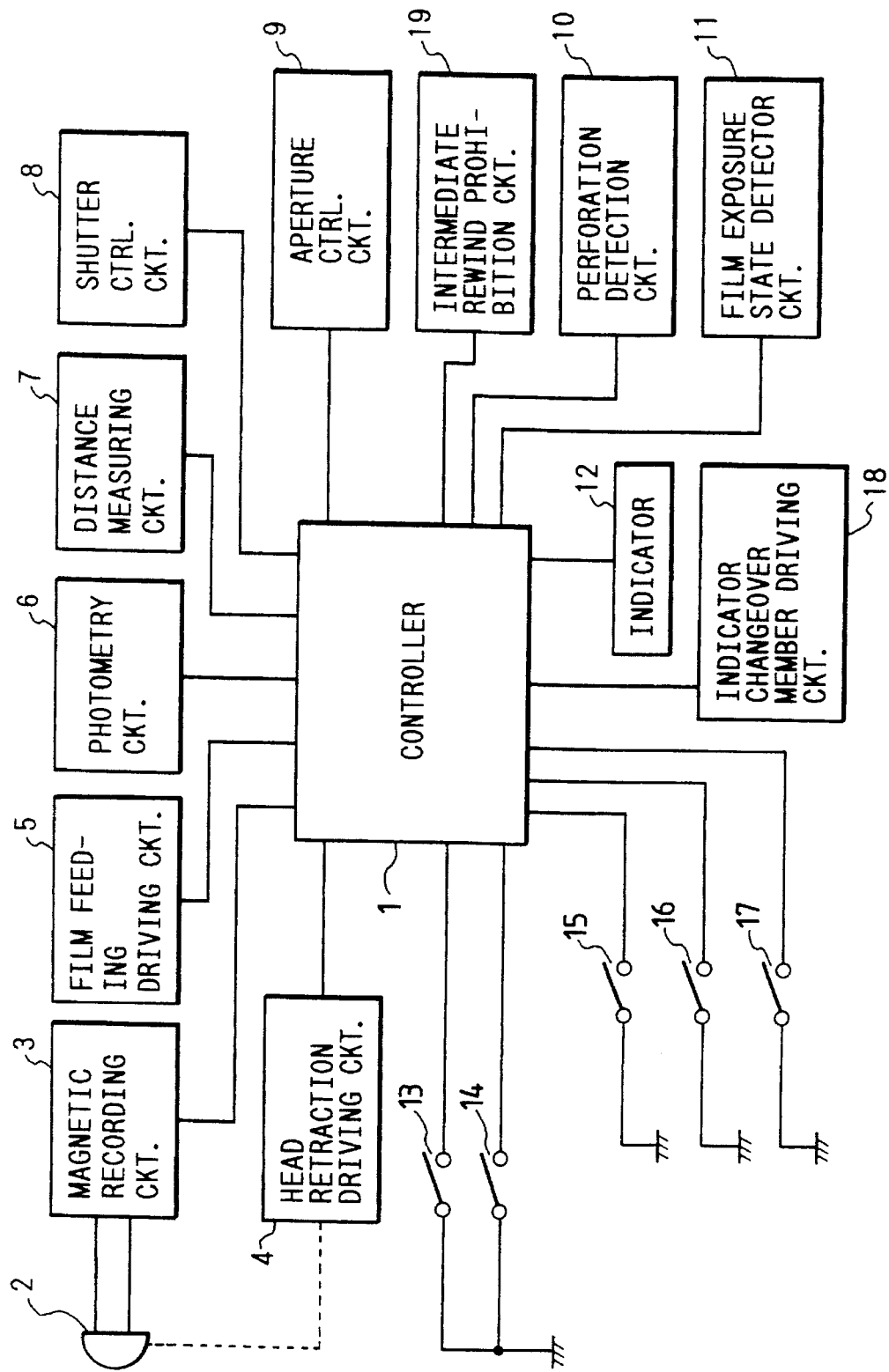

| FIG. 29A |
| FIG. 29B |

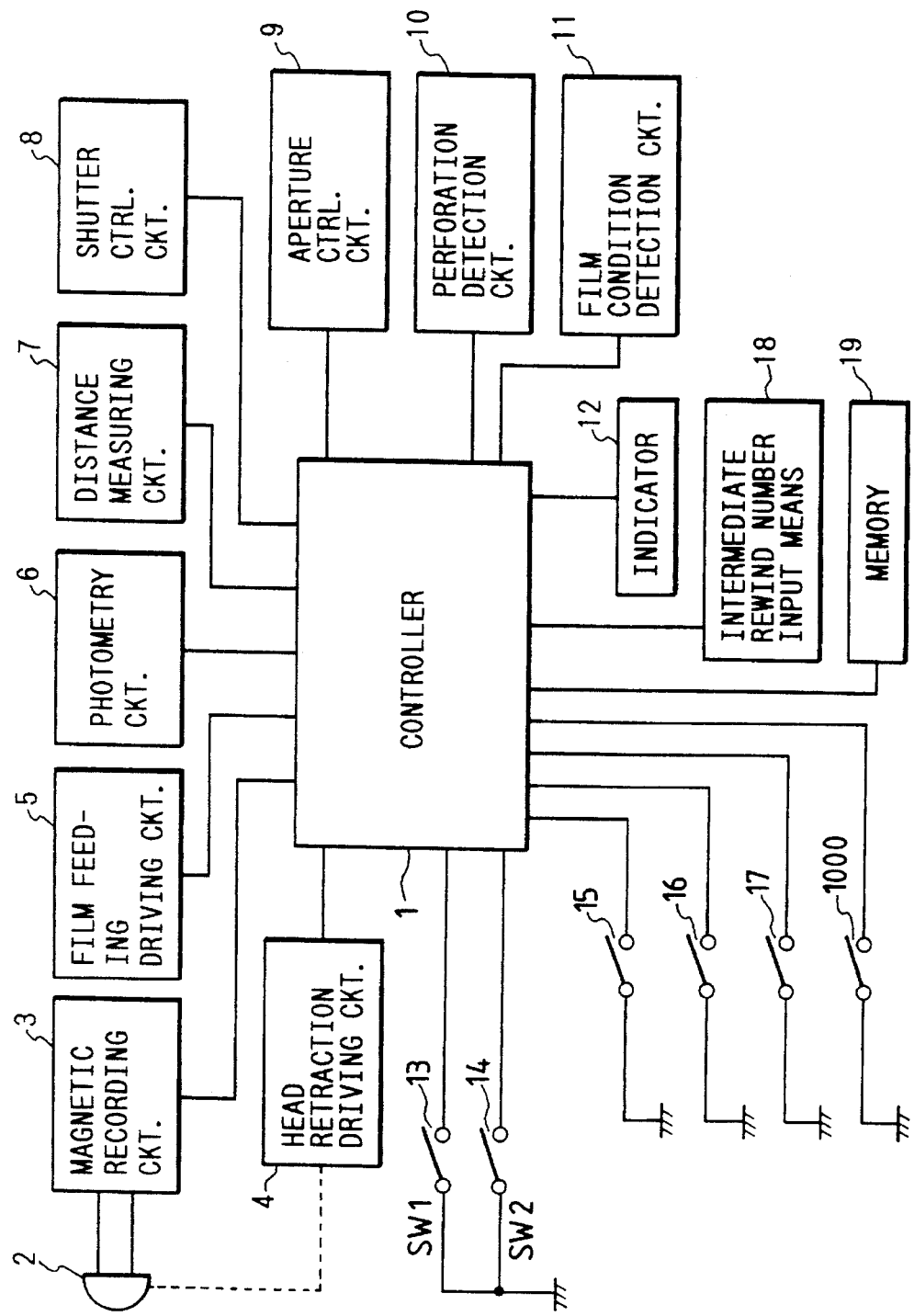

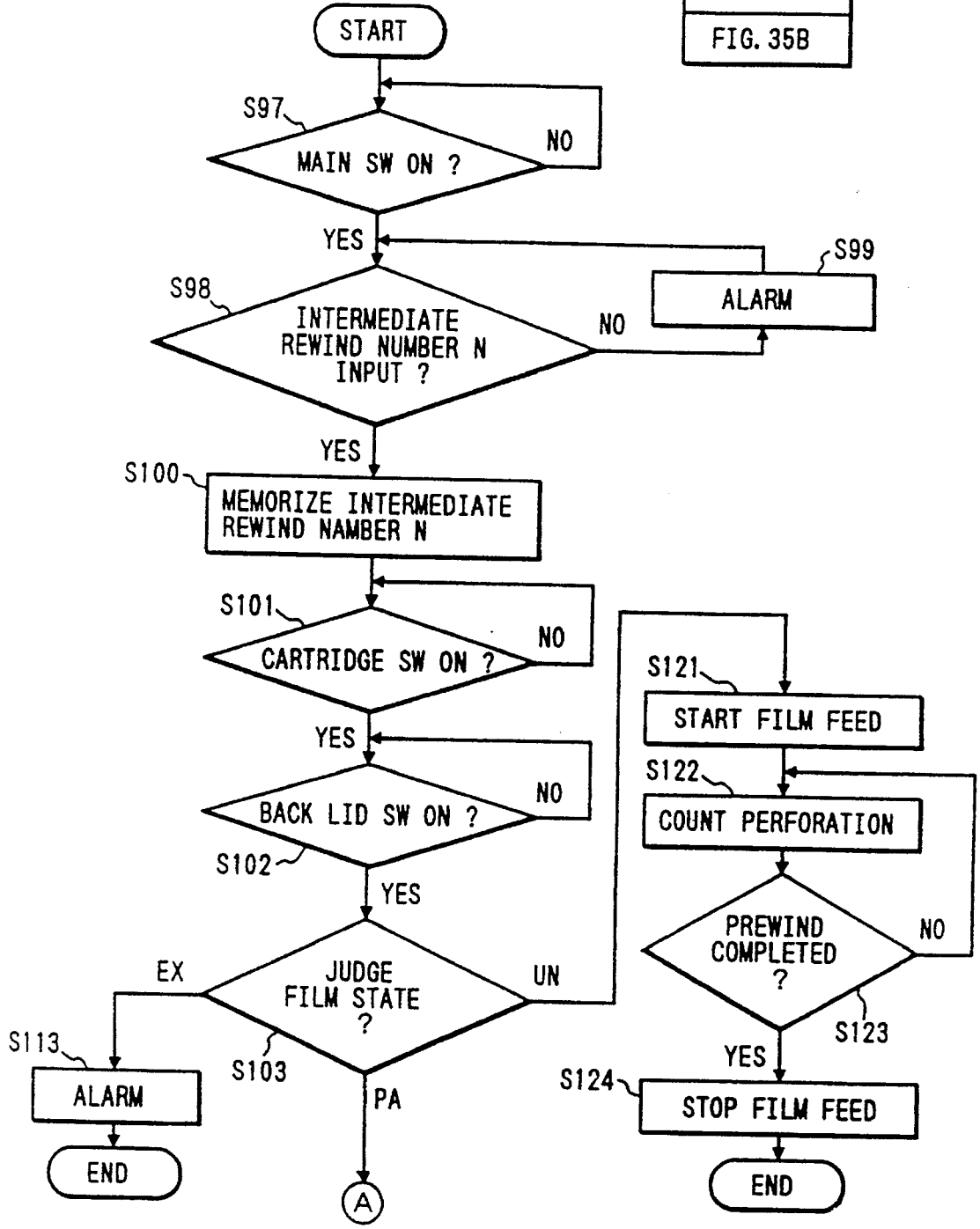

| FIG. 38A |
| FIG. 38B |

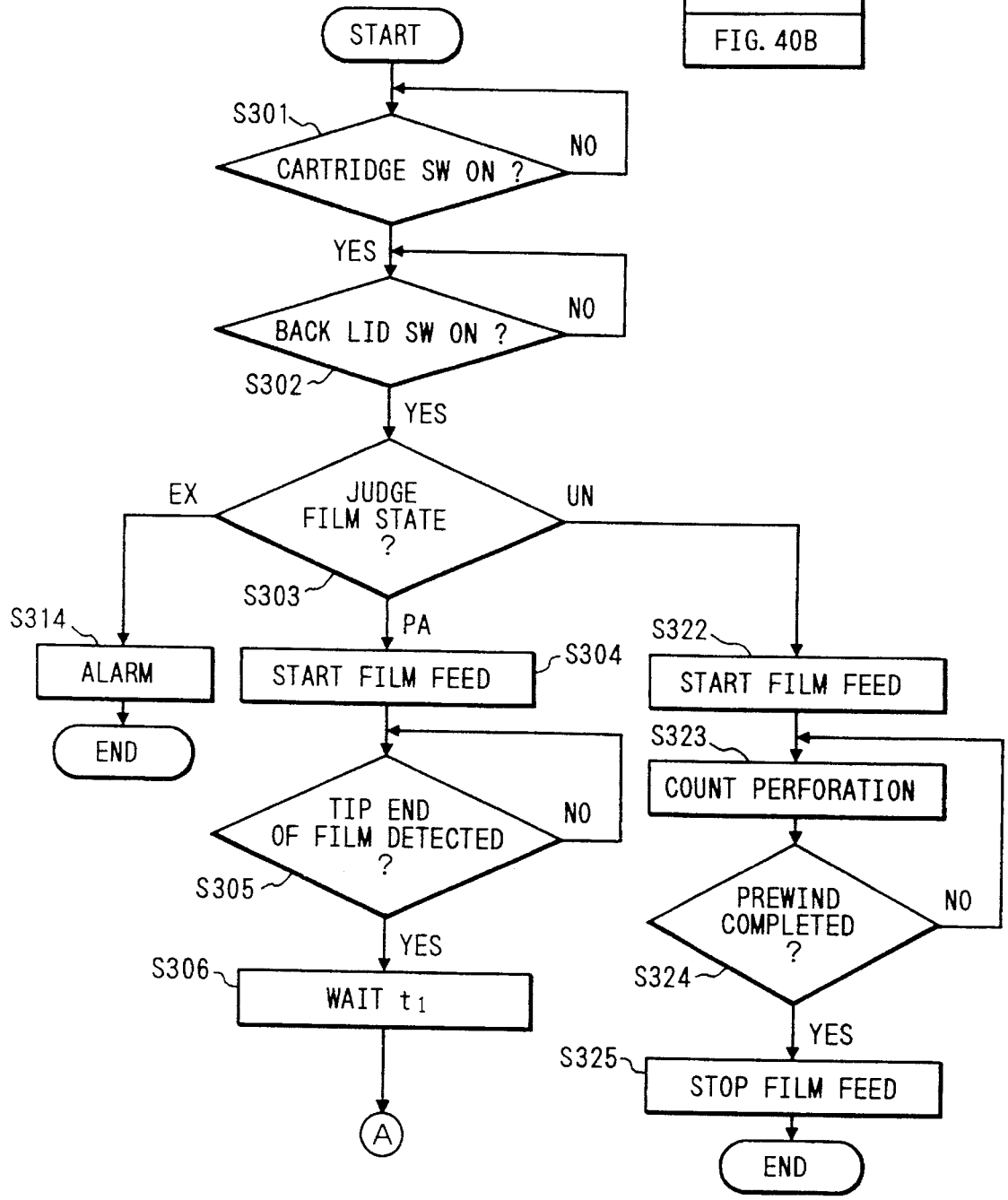

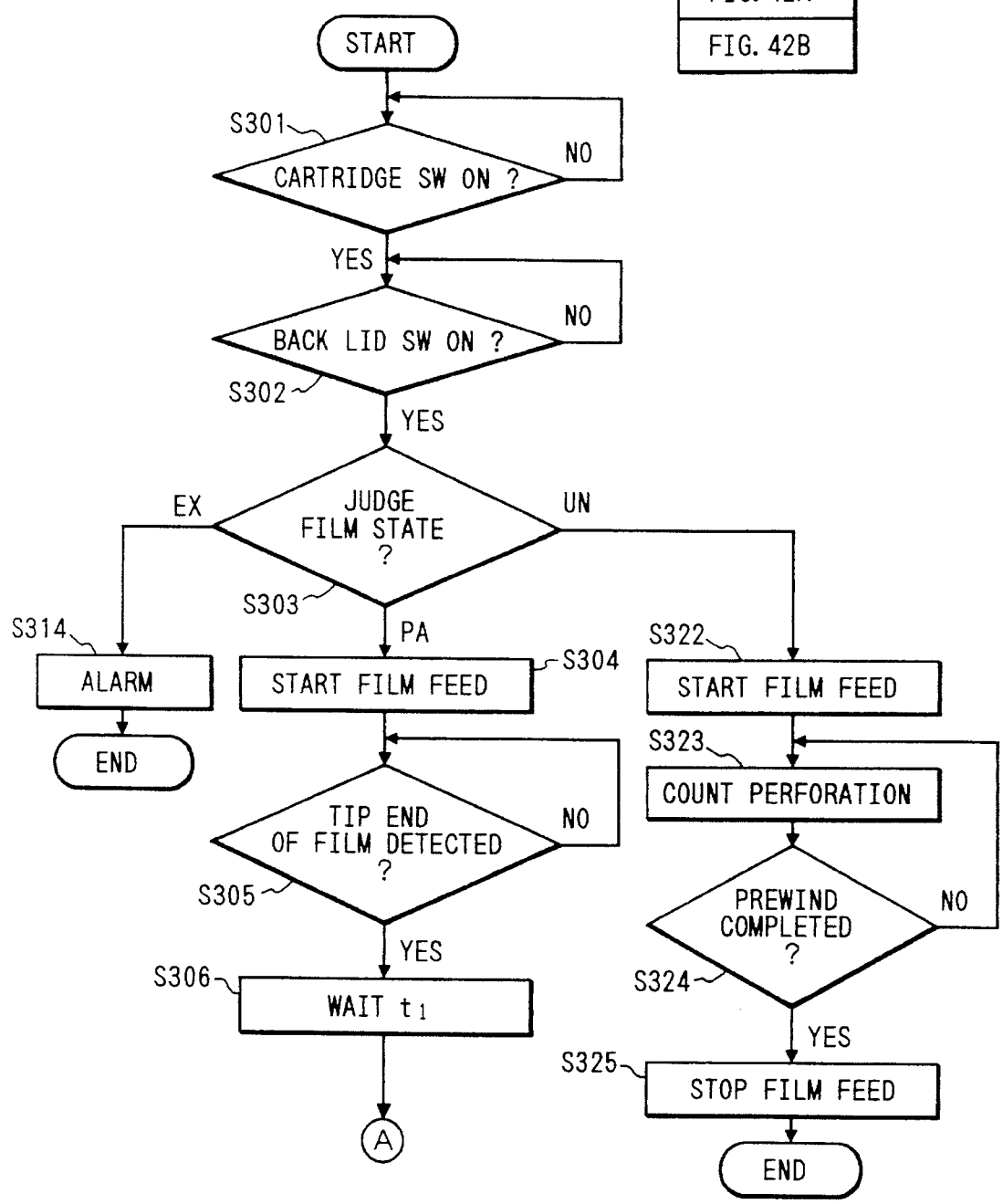

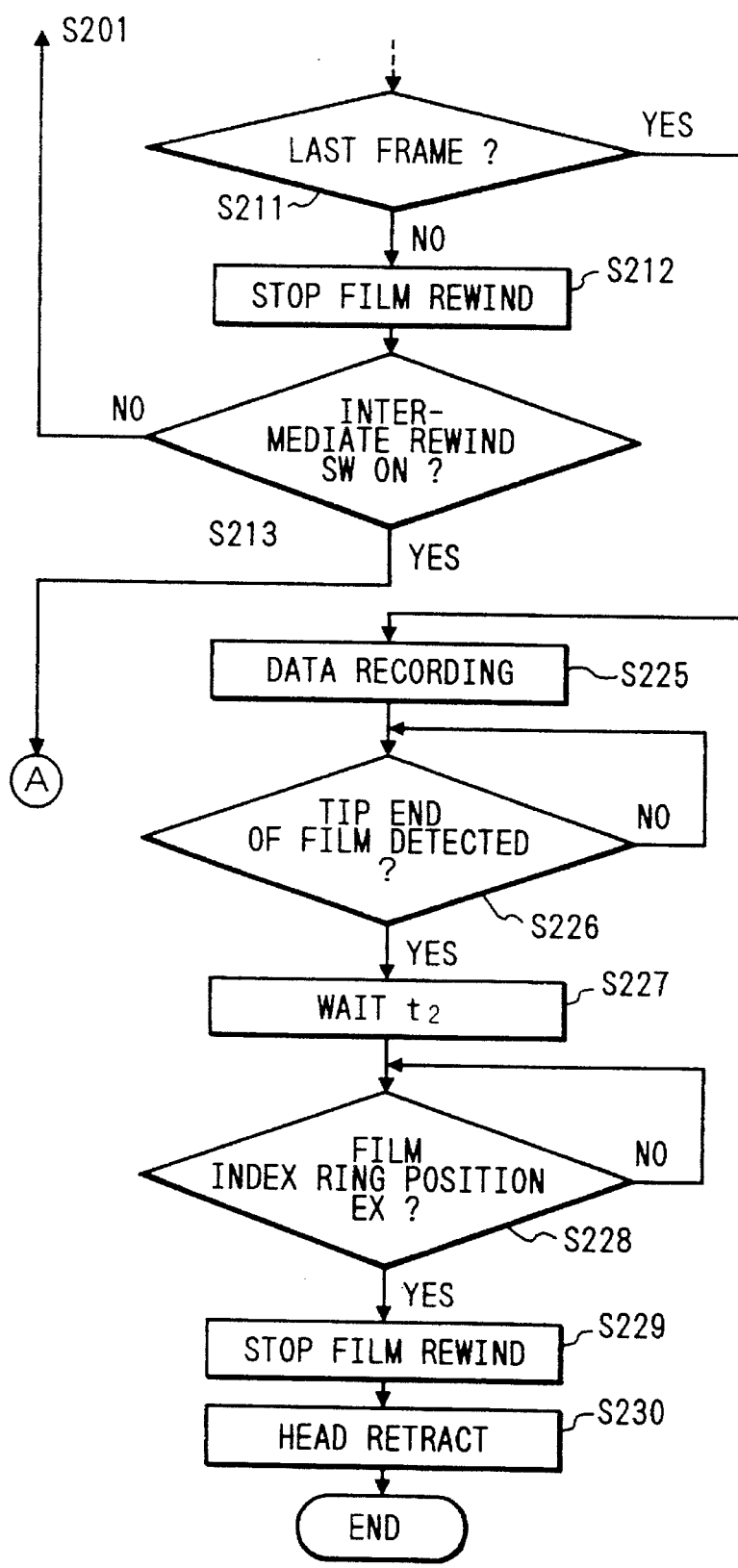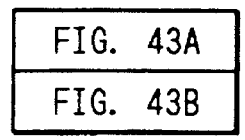

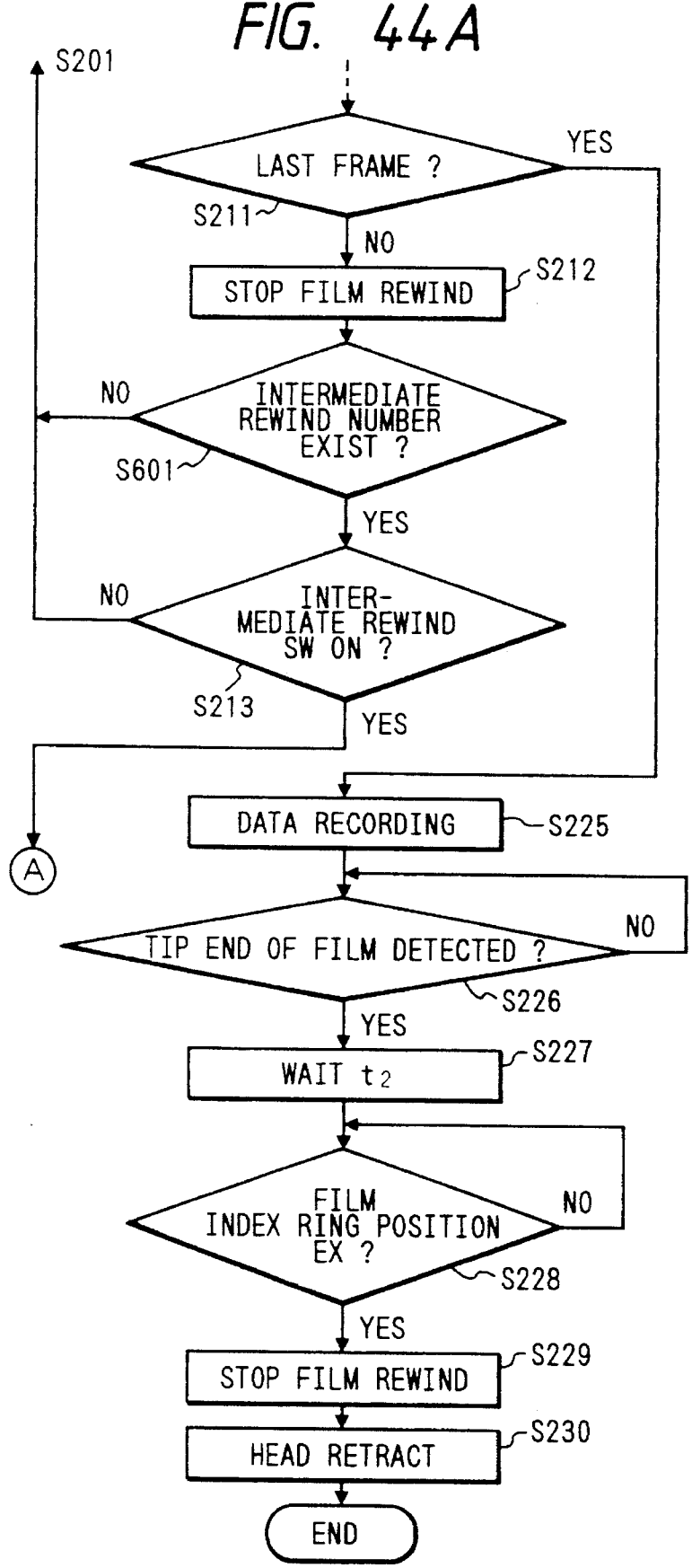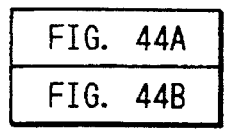

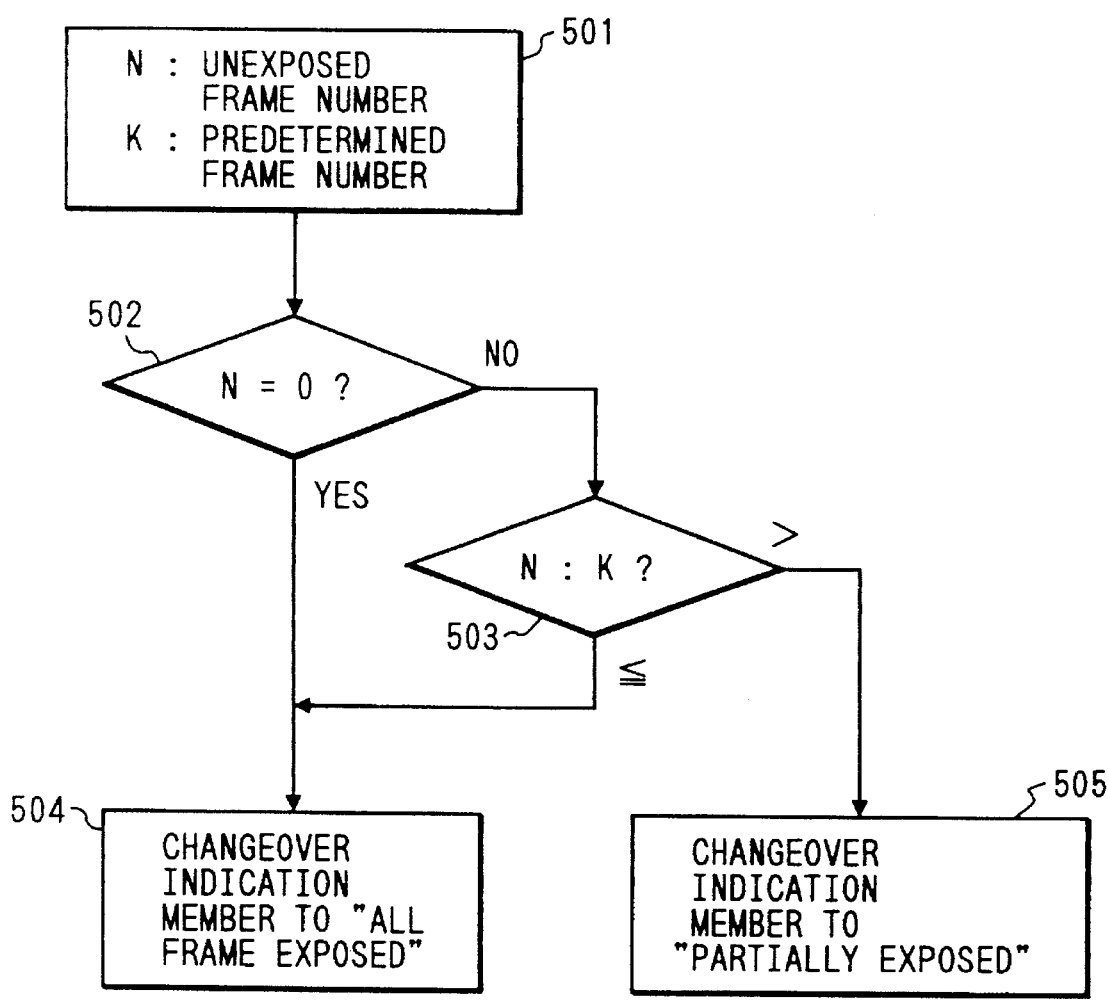

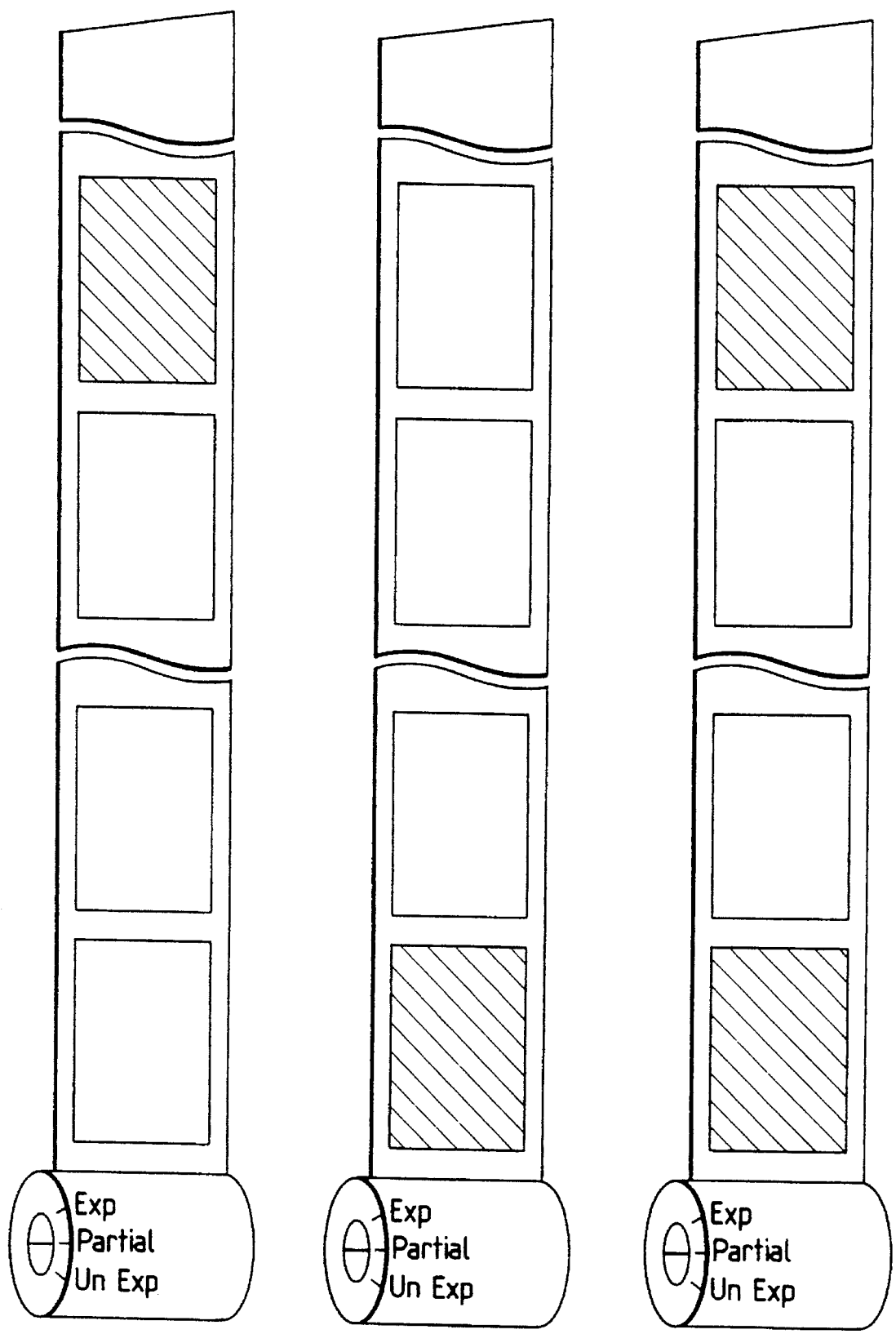

CAMERA IN WHICH THE NUMBER OF FILM REWINDING OPERATIONS MAY BE RESTRICTED

This application is a continuation of application Ser. No. 07/865,041 filed Apr. 1, 1992, now abandoned.

BACKGROUND OF THE INVENTION

1. Field of the Invention

The present invention relates to a camera which uses a film having a magnetic memory and which has a magnetic head for writing/reading information to and from the magnetic memory.

2. Related Background Art

Hitherto, a camera using a film having a magnetic memory therein has been proposed. The camera has a means for intermediately rewinding the film before exposure of all frames. In a case where the intermediate rewind of the film has been performed, information concerning the frame finally exposed. When the film, which has been intermediately rewound is retained, is again loaded in the camera, the film is automatically wound till the frame which is the first unexposed frame of the film. Then, photographing becomes possible from the aforesaid first unexposed frame (refer to, for example, U.S. Pat. No. 4,864,332 and U.S. Pat. No. 4,965,600).

In a camera of the above described type capable of intermediately rewinding the film, the film can be loaded in the camera and it can be intermediately rewound so far as there is any remaining unexposed frame. When the loaded film is fed, the film moves forward while being rubbed by the inlet/outlet port of the cartridge and with a portion between the pressure plate and the rails. Furthermore, since strong frictional force acts on the film by a pressing roller of the spool, the surface of the film is damaged with thin scratches and the number of scratches increases in proportion to the number of such rewind operations. Therefore, the scratches become distinctive in a case where the film is developed, printed and especially enlarged, and the quality of the picture thus photographed becomes defective.

The film cartridge for use in the aforesaid camera has an indication means for indicating the condition of the film. The aforesaid disclosure made in U.S. Pat. No. 4,965,600 has an indication changeover means for changing over the indication means of the film cartridge. After the film has been rewound, the indication changeover means causes the indication means to indicate "all frames are unexposed frames" in a case where none of the frames has been exposed, to indicate "all frames have been exposed," in a case where all frames have exposed and to indicate "only partial frames have been exposed" in a case where only some of the frames have been exposed and there remain unexposed frames.

The structure according to U.S. Pat. No. 4,947,197 is arranged in such a manner that the indication "only partial frames have been exposed" is not made but the two indications "all frames are unexposed frames" and "all frames have been exposed" are made in order to simplify the indication changeover means.

However, in the latter conventional structure, the indication means of the film cartridge indicates ""all frames have been exposed" even if only one frame has been exposed. Therefore, a distinction from the film cartridge indicating "all frames have been exposed" cannot be made. As a result, a problem arises in that a user cannot again load the film cartridge having frames the major portion of which have not been exposed, and therefore all of the residual unexposed frames cannot be used.

According to the former conventional structure, the indication means of the film cartridge indicates "only partial frames have been exposed" even if only one unexposed frame remains. Therefore, a user again loads the aforesaid film cartridge to use the unexposed frame. However, the film must be fed until the unexposed frame of the film faces the aperture of the camera in order to expose the unexposed frame. Accordingly, it takes a long time to photograph only one frame or several frames, which causes a fear of a loss of a precise shutter chance. Besides, if a film cartridge having only one or several unexposed frames and having the indication means which indicates "only partial frames have been exposed" is loaded in the camera, what is even worse, all of the unexposed frames are undesirably exhausted although the desired number of frames has not yet been photographed. In this case, the user must rewind the aforesaid film cartridge and again load a new film cartridge, which causes an excessively complicated operation.

SUMMARY OF THE INVENTION

One aspect of the present invention is to provide a camera in which, in a case where a film is rewound an excessive number of times with such as to cause scratches in the film the film is prohibited from being used again.

One aspect of the present invention is to provide a camera in which the number of intermittent rewinds of a film is recorded in a magnetic memory of the film, and when the recorded intermediate rewind number becomes larger than a predetermined number (within which generation of scratch is permitted), the film is forcibly rewound, or, a camera having alarm means as the case may be.

One aspect of the present invention is to provide a camera which uses a film cartridge having film exposure state indication means for indicating the exposure state of a film in the film cartridge to perform a photographing operation, wherein the camera comprises, detection means for detecting the film exposure state; indication changeover means for changing over the indication made by the film exposure state indication means; and intermediate rewind means capable of forcibly rewinding the film during exposure, and wherein, even if the detection means detects that the exposure state of the film in the loaded film cartridge is in a state representing only partial frames having been exposed, the indication changeover means causes the film exposure state indication means of the film cartridge to indicate that all frames have been exposed.

One aspect of the present invention is to provide a camera in which the allowable predetermined intermediate rewind number is altered according to the type of the film in order to efficiently use the film.

One aspect of the present invention is to provide a camera having means for discriminating the type of a film, means for writing the film intermediate rewind number to a magnetic memory of the film when the film has been intermediately rewound and means for reading the intermediate rewind number memorized by the film at the time of automatic loading and forcibly rewinding the film in a case where the read intermediate rewind number is larger than a predetermined number previously set according to the type of the film.

One aspect of the present invention is to provide a camera having intermediate rewind inhibition means for inhibiting the film from being intermediately rewound by a rewind means in a case where the exposure state of the loaded film is, by a detection means, detected to be a state in which only partial frames have been exposed.

One aspect of the present invention which achieves the aforesaid object is to provide a camera in which the allowable rewind number can be set arbitrarily.

One aspect of the present invention which achieves the aforesaid object is to provide a camera in which the indication made by an indication means of a film cartridge is shifted to an indication mode that all frames have been exposed in a case where the number of unexposed frames is one or more or smaller than a predetermined number.

Other and further objects, features and advantages of the invention will become apparent from the following description.

BRIEF DESCRIPTION OF THE DRAWINGS

FIG. 6, 6A and 6B is a flow chart which illustrates a flow according to the first embodiment of the present invention from a moment at which a cartridge is loaded to a moment at which a preparation for a photographing operation is made;

FIG. 7, 7A and 7B is a flow chart which illustrates a flow according to the first embodiment of the present invention from a moment at which the photographing operation is performed to a moment at which the film is rewound;

FIG. 11, 11A and 11B is flow chart which illustrates a flow according to the third embodiment of the present invention from a moment at which a cartridge is loaded to a moment at which a preparation for a photographing operation is made;

FIG. 15 is flow chart which illustrates a flow according to the embodiment of the present invention from a moment at which a cartridge is loaded to a moment at which a preparation for a photographing operation is made;

FIG. 16, 16A and 16B is a flow chart which illustrates a flow according to an embodiment of the present invention from a moment at which the photographing operation is performed to a moment at which the film is rewound;

FIG. 19, 19A and 19B is a flow chart which illustrates a flow according to the embodiment shown in FIG. 17 from a moment at which the photographing operation is performed to a moment at which the film is rewound;

FIG. 20, 20A and 20B is flow chart which illustrates a flow according to another embodiment of the present invention from a moment at which a cartridge is loaded to a moment at which a preparation for a photographing operation is made;

FIG. 21, 21A and 21B is a flow chart which illustrates a flow according to another embodiment of the present invention from a moment at which the photographing operation is performed to a moment at which the film is rewound;

FIG. 22, 22A and 22B is flow chart which illustrates a flow according to another embodiment of the present invention from a moment at which a cartridge is loaded to a moment at which a preparation for a photographing operation is made;

FIG. 25, 25A and 25B is flow chart which illustrates a flow according to the embodiment shown in FIG. 24 from a moment at which a cartridge is loaded to a moment at which a preparation for a photographing operation is made;

FIG. 26 is a block diagram which illustrates an electric circuit for use in another embodiment of the present invention;

FIG. 34 is a block diagram which illustrates an electric circuit for use in another embodiment of the present invention;

FIG. 35, 35A and 35B is flow chart which illustrates a flow, realized by a pre-winding method according to the embodiment shown in FIG. 34, from a moment at which a cartridge is loaded to a moment at which a preparation for a photographing operation is made;

FIG. 40, 40A and 40B is flow chart which illustrates a flow according to another embodiment of the present invention from a moment at which a cartridge is loaded to a moment at which a preparation for a photographing operation is made;

FIG. 42, 42A and 42B is flow chart which illustrates a flow according to another embodiment of the present invention from a moment at which a cartridge is loaded to a moment at which a preparation for a photographing operation is made;

FIG. 43, 43A and 43B is a flow chart which illustrates a flow according to another embodiment of the present invention from a moment at which the photographing operation is performed to a moment at which the film is rewound;

FIG. 44, 44A and 44B is a flow chart which illustrates a flow according to another embodiment of the present invention from a moment at which the photographing operation is performed to a moment at which the film is rewound;

FIG. 49 is a flow chart which illustrates an operation of changing over an indication member serving as a indication means for indicating the condition of the film;

FIGS. 51A to 51C illustrate films which have been partially exposed;

DETAILED DESCRIPTION OF THE PREFERRED EMBODIMENTS

Figure 1:
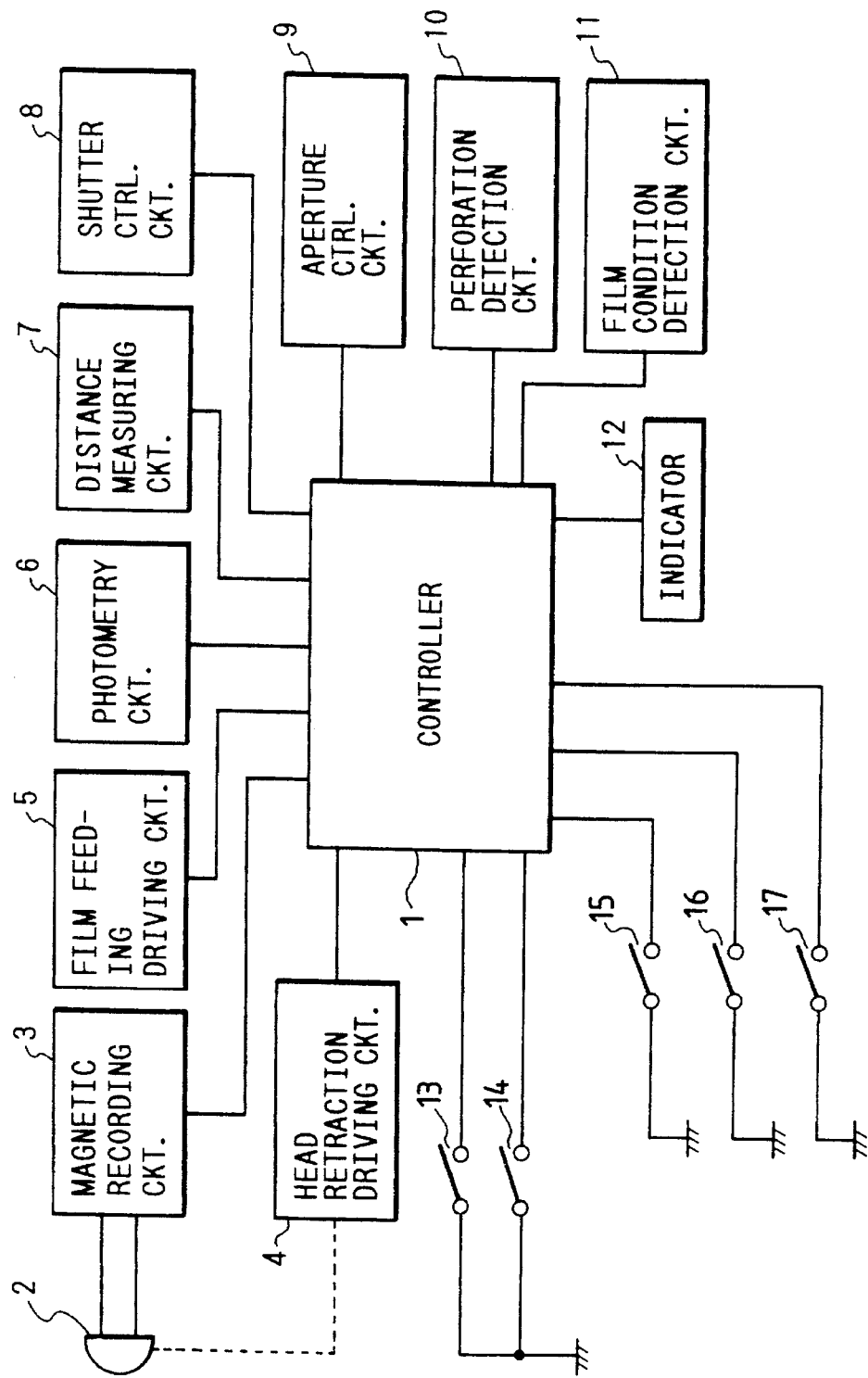
FIG. 1 is a block diagram which illustrates an electric circuit for use in an embodiment of the present invention.

FIGS. 1 to 7 illustrate a first embodiment of the present invention. FIG. 1 is a block diagram which illustrates an electric circuit for use in this embodiment. Referring to FIG. 1, reference numeral 1 represents a controller for controlling the overall operation of the camera and comprising a microcomputer or the like. Reference numeral 2 represents a magnetic head for writing/reading information to and from a magnetic memory located in a film. Reference numeral 3 represents a magnetic recording circuit for controlling the magnetic head 2. Reference numeral 4 represents a head retraction driver circuit for moving the magnetic head 2 between a position with which the magnetic head 2 is brought into contact and a position retracted from the surface of the film. The detailed structure of the head retraction driver circuit 4 has been disclosed in Japanese Patent Application No. 1-338457 by the assignee of the present invention. Reference numeral 5 represents a film feeding driver circuit for driving a feeding motor (omitted from illustration) which winds/rewinds the film. Reference numeral 6 represents a photometry circuit, 7 represents a distance measuring circuit, 8 represents a shutter control circuit and 9 represents an aperture control circuit. Reference numeral 10 represents a perforation detection circuit for counting the perforations of the film by using a photoreflector or the like. Reference numeral 11 represents a film exposure state detection circuit for detecting whether all frames of the film have been exposed, only a portion has been exposed or all frames are unexposed frames. Reference numeral 12 represents an indicator for indicating the aperture, the shutter speed of the camera and the film speed and various cautions. Reference numeral 13 represents a photometry start switch and 14 represents an exposure start switch which are arranged to be switched on at a first stroke and a second stroke of one switch member. Reference numeral 15 represents a cartridge switch for detecting a fact that the film cartridge has been loaded in the camera. Reference numeral 16 represents a back lid switch for detecting a fact that the back lid has been closed and 17 represents an intermediate rewind switch for intermediately rewinding the film.

Figure 2:
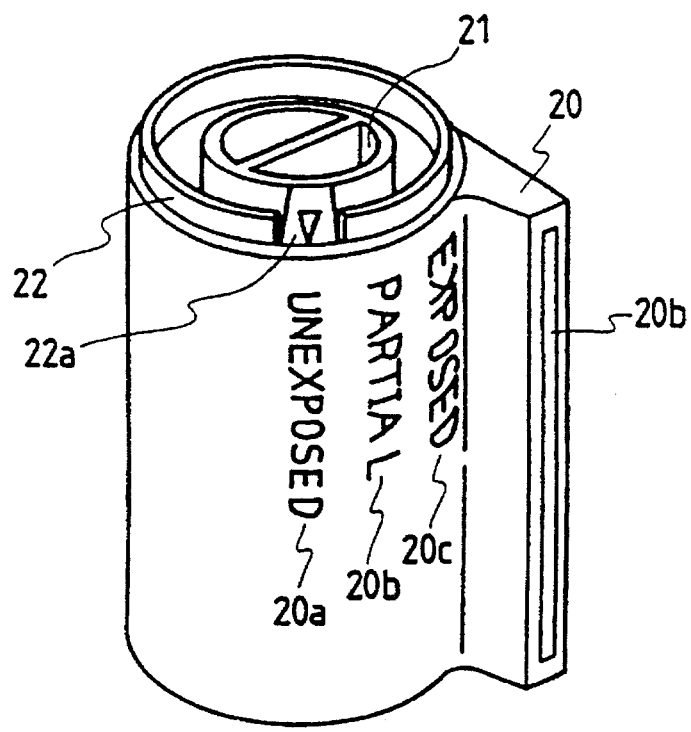
FIG. 2 is a perspective view which illustrates a conventional film cartridge.

FIG. 2 is a perspective view which illustrates a conventional film cartridge disclosed in U.S. Pat. No. 4,947,197. Referring to FIG. 2, reference numeral 20 represents a film cartridge body and 20a represents an indication of a fact that all frames of the subject film are unexposed (hereinafter abbreviated to "UN"). Reference numeral 20b represents an indication of a fact that only a portion of the frame has been exposed (hereinafter abbreviated to "PA"). Reference numeral 20c represents an indication of a fact that all frames have been exposed (hereinafter abbreviated to "EX"). Reference numeral 20d represents an ejection port for ejecting the film and 21 represents a fork engagement portion which is integrally formed with a film spool in the cartridge and which is engaged to a fork of the camera so as to enable the film to be thrusted out/rewound. Reference numeral 22 represents an index ring including a tapered portion 22a having an arrow printed thereto. The fork engagement portion 21 and the index ring 22 are able to respectively independently rotate in relation to the film cartridge body 20.

Figures 3A, 3B, 3C:
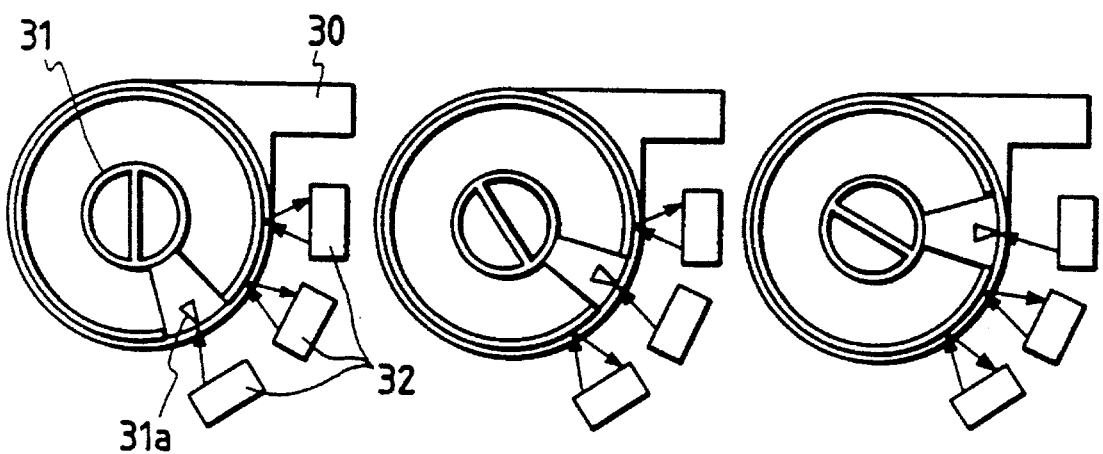
FIGS. 3A to 3C are top views which illustrate the film cartridge shown in FIG. 2.

FIG. 3 is a top view which illustrates the film cartridge according to this embodiment which is formed by improving the aforesaid film cartridge body 20. A film cartridge 30 has a fork engagement portion 31 and an index ring 31a which are formed integrally with each other. Therefore, the indication can be changed over according to a position at which the fork of the camera is stopped. Referring to FIG. 3, reference numeral 32 represents a photoreflector disposed in the cartridge chamber of the camera. By inputting a signal transmitted from the photoreflectors 32 into the film exposure state detection circuit 11, the condition of the film can be discriminated.

Figure 4:
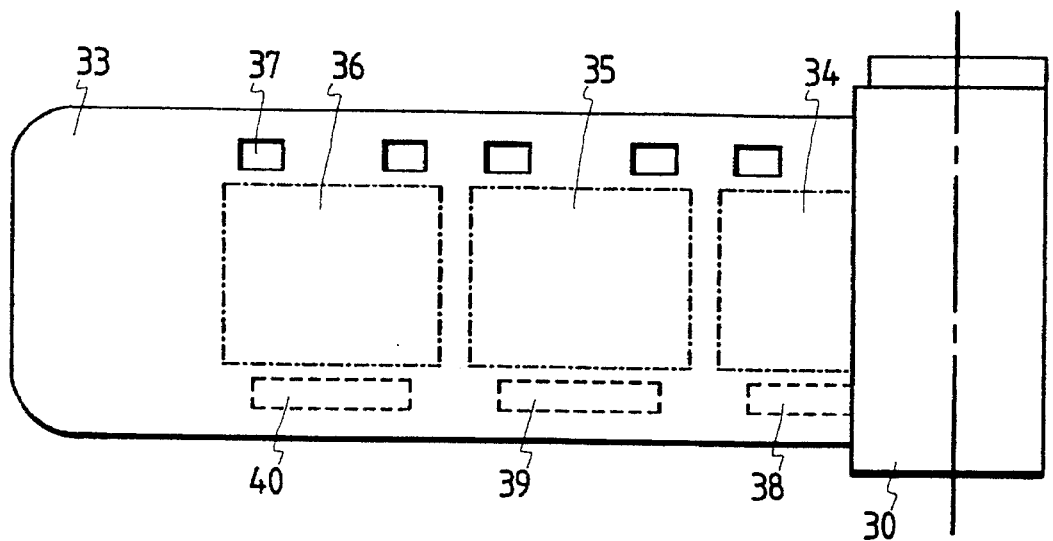
FIG. 4 illustrates a state where a film is ejected from the film cartridge shown in FIG. 3.

FIG. 4 illustrates a state where a film 33 is being ejected from the film cartridge 30 shown in FIG. 3. Referring to FIG. 4, reference numerals 34 and 35 represent frames to be exposed and 38 and 39 represent magnetic recording regions to which information about the corresponding frames to be exposed are magnetically recorded. Reference numeral 36 represents a data frame which is not exposed actually and 40 represents a magnetic recording region to which the following information about status of the film is recorded: the identification of the subject film, or information denoting unexposed frames if the film has been intermediately rewound, or the number of the intermediate rewind operations according to this embodiment. Reference numeral 37 represents perforations formed in the film 33.

Figure 5:
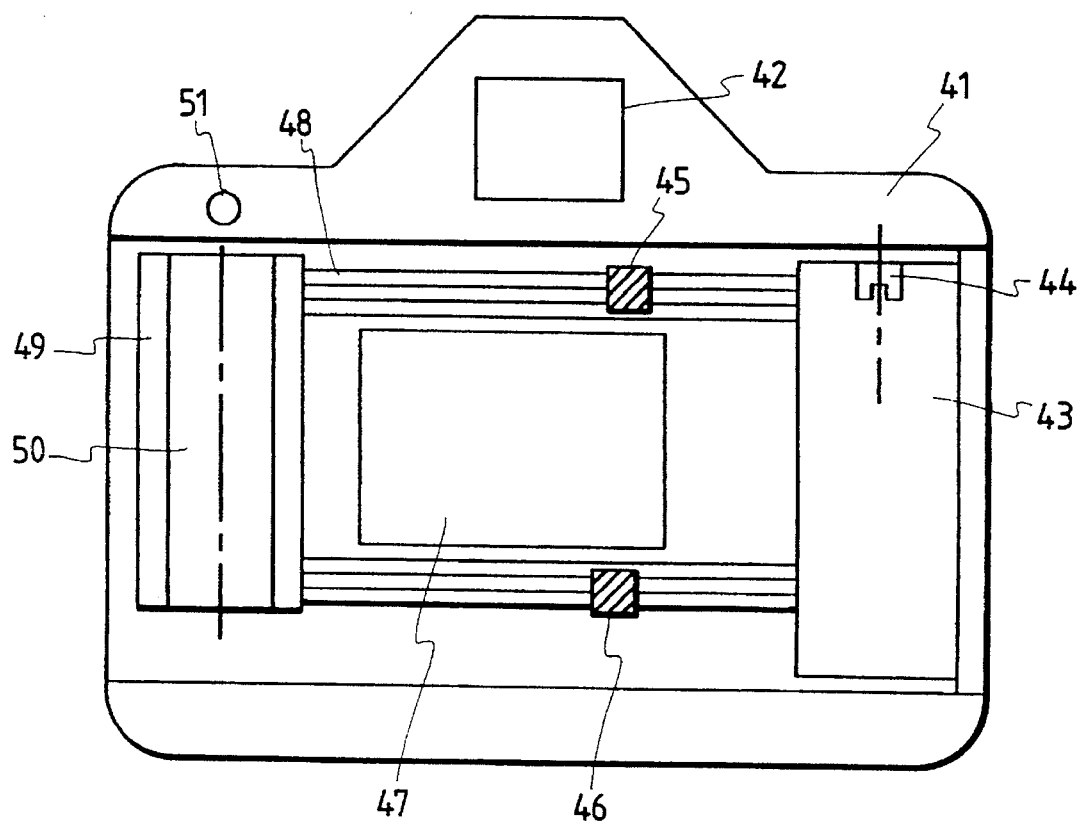
FIG. 5 is a back view which illustrates a camera according to a first embodiment of the present invention.

FIG. 5 is a back view which illustrates the camera according to this embodiment in a state where its back lid is removed. Referring to FIG. 5, reference numeral 41 represents a body of the camera, 42 represents a finder, 43 represents a cartridge chamber for accommodating the film cartridge 30, 44 represents a fork to be engaged to the fork engagement portion 31 of the film cartridge 30 so as to wind/rewind the film 33, 45 represents a photoreflector for detecting the perforation 37 of the film 33, and 46 represents a position at which the magnetic head 2 is forcibly brought into contact with the surface of the film 33. Reference numeral 47 represents an aperture, 48 represents a rail for guiding the film 33, 49 represents a spool chamber, 50 represents a spool for winding the film 33, and 51 represents an intermediate rewind button with which the intermediate rewind switch 17 is switched on when it is depressed.

Figure 6B:
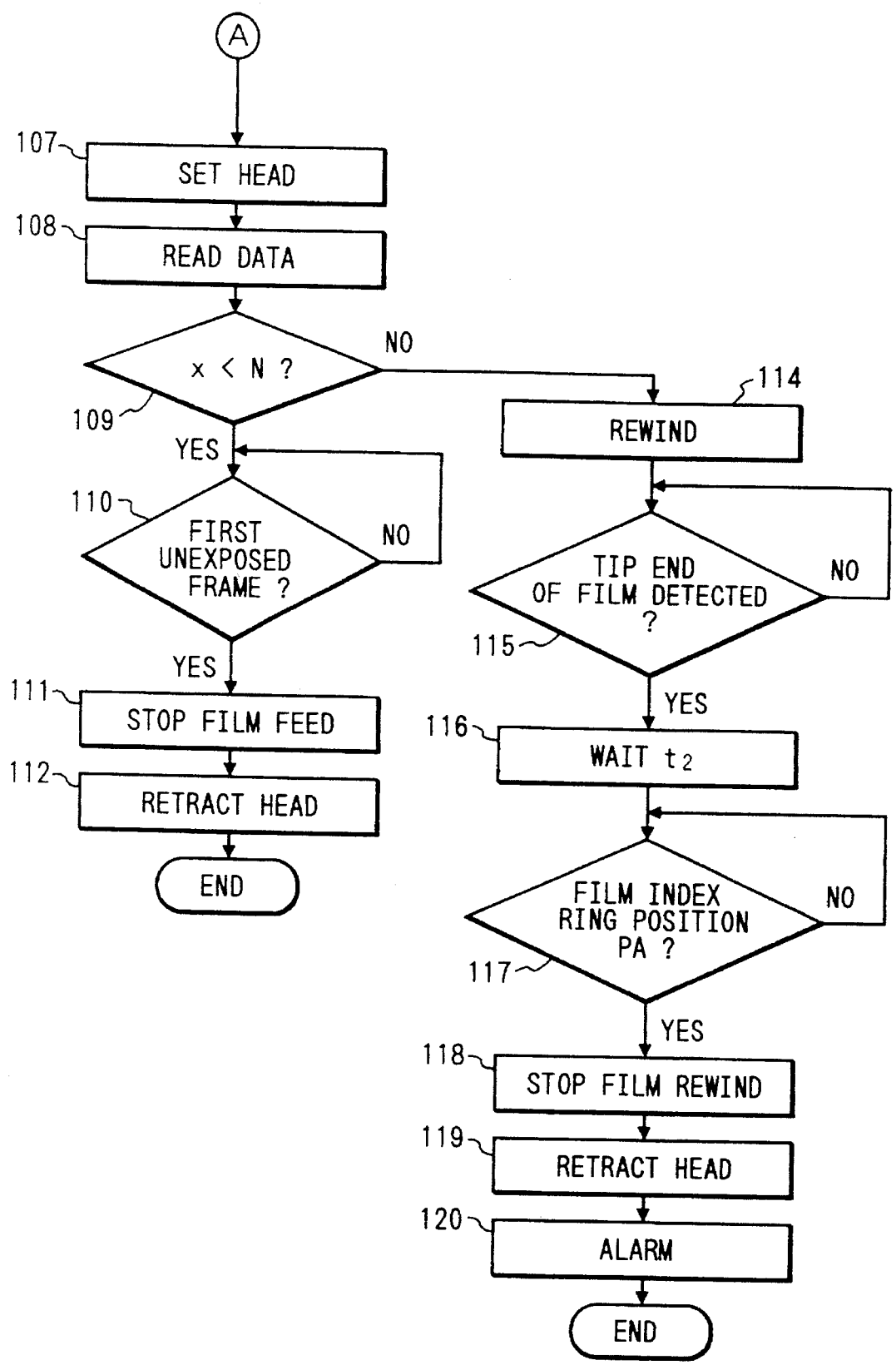

Then, the operation of this embodiment will now be described with reference to flow charts shown in FIGS. 6 and 7 which illustrate the operation of the control circuit shown in FIG. 1. FIG. 6 illustrates the operation to be performed by a camera of a pre-winding type, the operation being illustrated from a moment at which the film cartridge is loaded to a moment at which the preparation for the photographing operation has been completed. When the film cartridge 30 has been loaded in the cartridge chamber 43 of the camera, the cartridge switch 15 is switched on (step 101). When the back lid is then closed, the back lid switch 16 is switched on (step 102). In step 103, the condition of the film 33 is discriminated by the detection method shown in FIG. 3. If a discrimination that the condition is EX (all frames have been exposed) is made, the flow proceeds to step 113 in which the indicator 12 issues a warning that the film cannot be used. If a discrimination is made that the condition of the film is UN (all frames are not exposed), the flow proceeds to step 121 in which the film feeding motor is rotated by the film feeding driver circuit 5 to start the prewinding operation. The flow then proceeds to step 122 in which the number of the perforations of the film is counted by the perforation detection circuit 10. In step 123, whether or not a predetermined number of the perforations has been counted and therefore the prewinding operation has been completed is discriminated. If the same has not been completed, the flow returns to step 122. If the same has been completed, the flow proceeds to step 124 in which the rotation of the film feeding motor is stopped by the film feeding driving circuit 5.

If a discrimination is made in step 103 that the condition of the film is PA (only partial frames have been exposed), the flow proceeds to step 104 in which the film feeding motor is rotated by the film feeding driver circuit 5 to start the prewinding operation. In next step 105, the leading portion of the film is detected by the perforation detection circuit 10. If it has been detected, timer time $t_1$ is passed in step 106, and then the magnetic head 2 is brought into contact with the surface of the film by the magnetic head retraction driver circuit 4 in step 107. In next step 108, data in the magnetic recording region of the film 33 is read by the magnetic recording circuit 3. According to read data, whether or not intermediate rewind number x is smaller than a predetermined number N is determined (step 109). If an affirmative discrimination is made, the flow proceeds to step 110 in which a discrimination is made whether or not the number of the unexposed frames coincides with the number of frames detected by the perforation detection circuit 10, the discrimination being made according to data read in step 108. As a result, whether or not the film has been fed to the leading frame of the unexposed frames is discriminated. If the film has been fed as described above, the flow proceeds to step 111 in which the rotation of the film feeding motor is stopped by the film feeding driver circuit 5. In next step 112, the magnetic head retraction driver circuit 4 is actuated to retract the magnetic head 2 from the surface of the film 33.

If the intermediate rewind number x is larger than the predetermined number N, the flow proceeds to step 114 in which the film feeding driver circuit 5 is actuated to reversely rotate the film feeding motor. As a result, an operation of rewinding the film 33 is started. In next step 115, the leading portion of the film 33 is detected by the perforation detection circuit 10. If it has been detected, timer time $t_2$ is passed in step 116. In step 117, the film exposure state detection circuit 11 is actuated to detect the position of the indicator 31a of the indication ring of the film 33. If PA is indicated, the flow proceeds to step 118 in which the rotation of the film feeding motor is stopped by the film feeding driver circuit 5. Thus, the rewind operation is completed. The timer time $t_2$ is a time required to completely wind up the film 33 into the cartridge. In next step 119, the magnetic head 2 is retracted from the surface of the film 33. In next step 120, the indicator 12 warns that the film cannot be used.

Figure 7B:
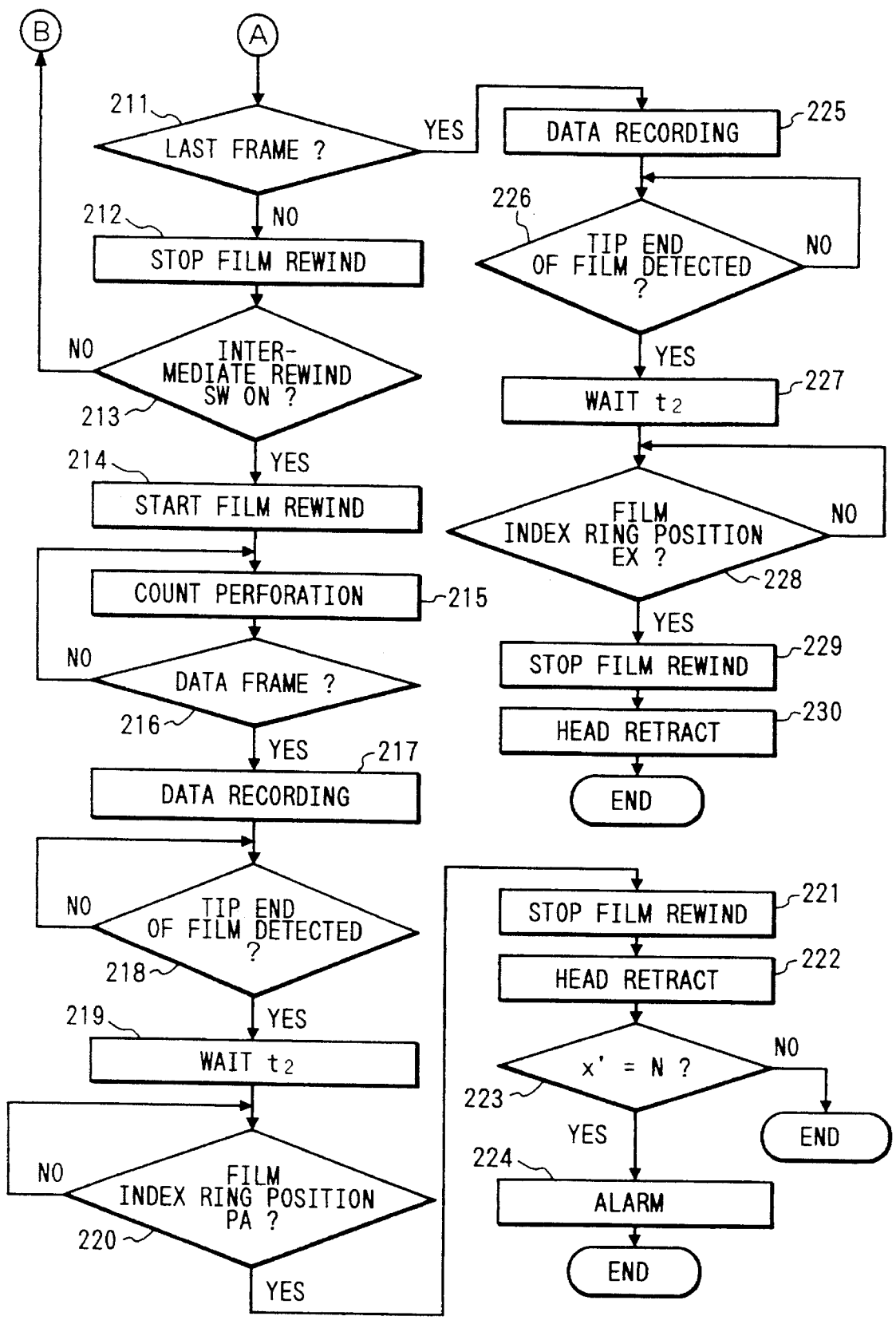

FIG. 7 illustrates the operation to be executed from a moment at which the photographing operation is performed to a moment at which the film is rewound. In step 201, whether or not the photometry switch 13 has been switched on is examined. If it has been switched on, the flow proceeds to step 202 in which the photometry circuit 6 and the distance measuring circuit 7 are actuated. According to information obtained from the circuits 6 and 7, the photomerry and the distance measurement are performed. In next step 203, whether or not the exposure switch 14 has been switched on is examined. If it has been switched on, the flow proceeds to step 204 in which the shutter control circuit 8 and the aperture control circuit 9 are actuated. As a result, the exposure operation is started. In next step 205, whether or not the exposure operation has been completed is examined. If it has been completed, the flow proceeds to step 206 in which the head retraction driver circuit 4 is actuated to bring the magnetic head 2 into contact with the surface of the film 33. Whether or not the exposure operation has been completed is detected by a known method, for example, a method which uses a signal denoting the completion of running of the rear curtain of the shutter. In next step 207, the film feeding driver circuit 5 is actuated to start rewinding the film 33. In step 208, the magnetic recording circuit 3 is actuated to record data about the exposure condition and an arbitrary comment or the like to the film 33. In step 209, the number of the perforations is counted by the perforation detection circuit 10 so as to examine whether or not the perforations for one frame have been counted (step 210). If one frame has been completed, the flow proceeds to step 211 in which whether or not the exposed frame is the last frame is examined by discriminating whether or not the number of frames which can be exposed and which is recorded in the magnetic recording region 40 of the film 33 coincides with the number of the frames detected by the perforation detection circuit 10. If it is negated, the flow proceeds to step 212 in which the film feeding driver circuit 5 is actuated so as to stop rewinding the film. In step 213, whether or not the intermediate rewind switch 17 has been switched on is detected. If it is negated, the flow returns to step 201 in which the photographing operations in steps 201 to 213 are repeated.

If the fact that the exposed frame is the last frame has been detected in step 211, the flow proceeds to step 225 in which data is recorded in the magnetic recording region 40 of the data frame 36 shown in FIG. 4 by the magnetic recording circuit 3. In next step 226, whether or not the leading portion of the film has passed is examined by the perforation detection circuit. If the fact that the leading portion has passed is detected, the timer time $t_2$ is passed in step 227. In next step 228, the position of the indicator 31a of the index ring of the film is detected by the film exposure state detection circuit 11. If the index ring 31a indicates EX, the flow proceeds to step 229 in which the film feeding driver circuit 5 is actuated to stop the rotation of the film feeding motor. Thus, the rewind operation is completed. In next step 230, the magnetic head 2 is retracted from the surface of the film 33.

If a fact that the intermediate rewind switch 17 has been switched on is detected in step 213, the flow proceeds to step 214 in which the film feeding motor is rotated by the film feeding driver circuit 5. Thus, the operation of rewinding the film 33 is started. In next step 215, the number of the perforations is counted by the perforation detection circuit 10 so as to examine whether or not the data frame 36 faces the aperture 47 (step 216). If an affirmative discrimination is made, the flow proceeds to step 217 in which intermediate rewind number x'=x+1 is recorded in the magnetic recording region 40 of the data frame 36. Then, the flow proceeds to step 218 in which whether or not the leading portion of the film 33 has passed is detected by the perforation detection circuit. If passing has been detected, timer time $t_2$ is passed in step 219. Then, in step 220, the indication position of the index ring 31a of the film 33 is detected by the film exposure state detection circuit 11. If the index ring 31a indicates PA, the flow proceeds to step 221 in which the rotation of the film feeding motor is stopped by the film feeding driver circuit 51. Thus, the rewind operation is compiLeted. In next step 222, the magnetic head 2 is retracted from the surface of the film 33. In step 223, whether or not the intermediate rewind number x' recorded in step 217 is the same as the predetermined number N is discriminated. If a negative discrimination is made, the operation is completed here. If an affirmative discrimination is made, the flow proceeds to step 224 in which a fact that the film cannot be again used is indicated by the indicator 12.

Figure 8:
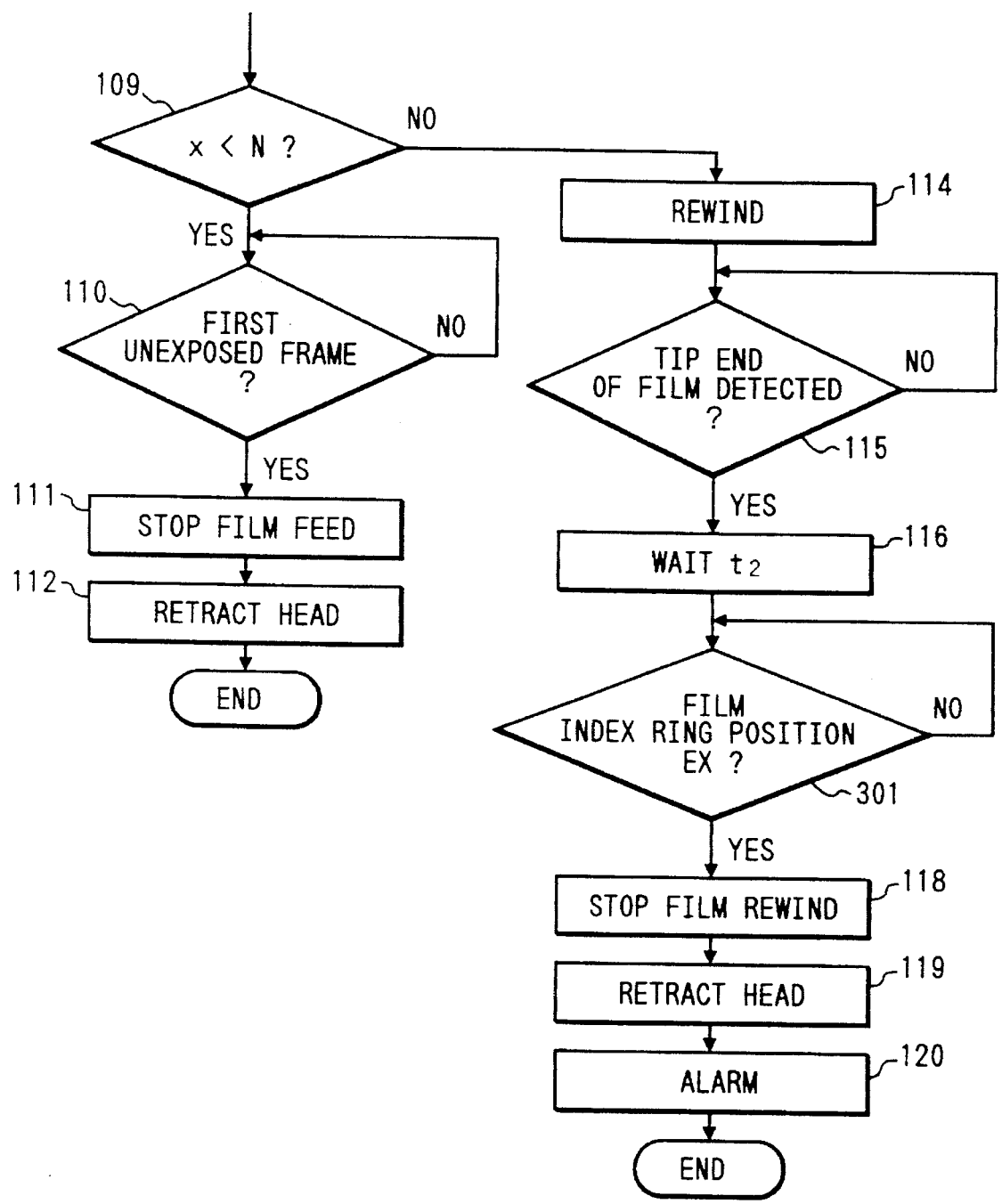
FIG. 8 is a flow chart which illustrates a flow according to a second embodiment of the present invention from a moment at which a cartridge is loaded to a moment at which a preparation for a photographing operation is made.

Then, another operation of this embodiment will now be described with reference to a flow chart which illustrates the operation of the controller 1 shown in FIG. 1. FIG. 8 is a flow chart which illustrates the operations to be performed from a moment at which the film cartridge is loaded to a moment at which the preparation for the photographing operation is completed. Since the difference from FIG. 6 lies in step 301 and the other operations are the same as those shown in FIG. 6, the same operations are given the same step numbers and their descriptions are omitted here. Referring to FIG. 8, in step 301, the fact that the index ring 31a indicates EX is detected and the operation of rewinding the film 33 is stopped (step 118).

Figure 9B:
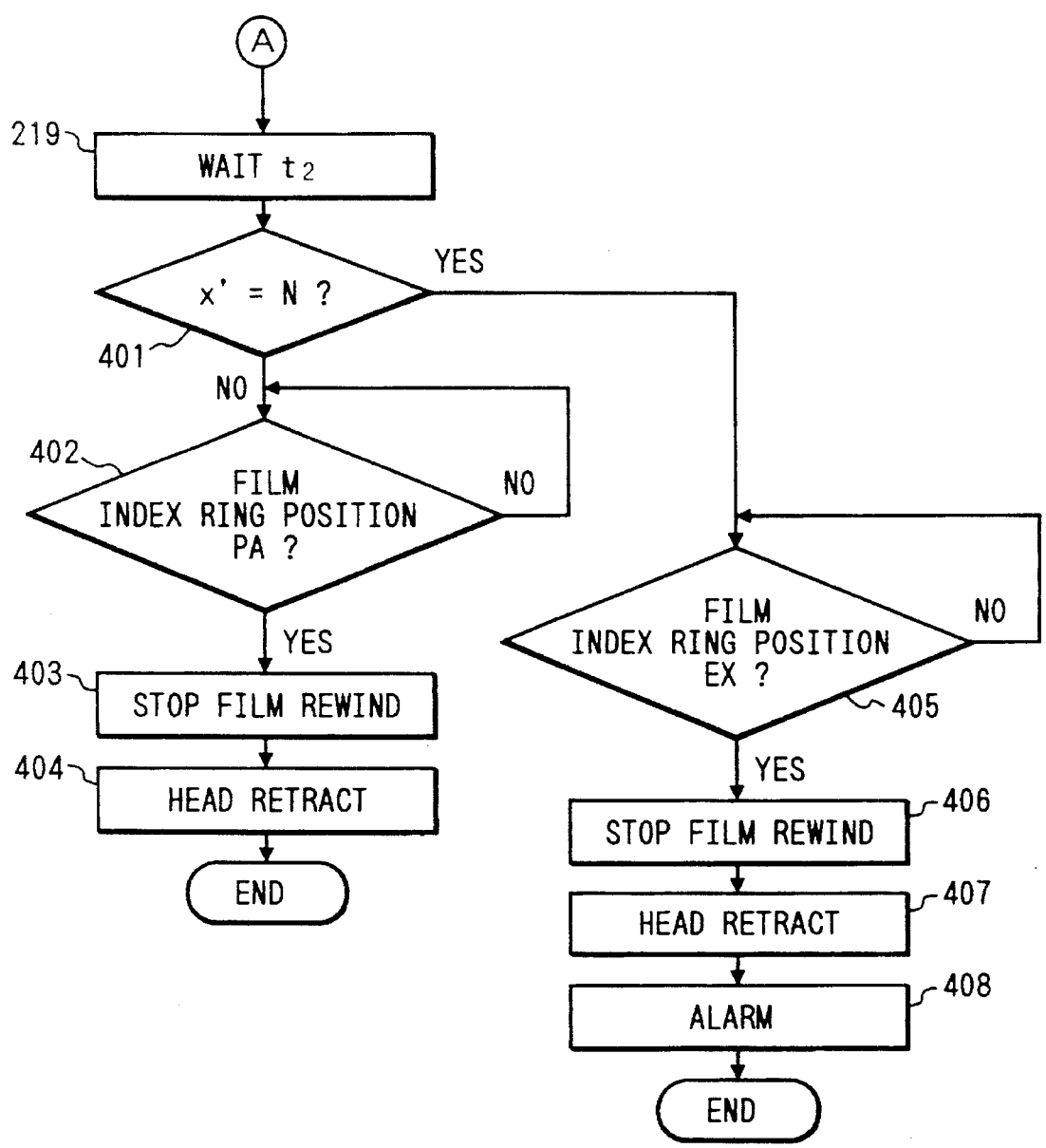
FIG. 9, 9A abd 9B is a flow chart which illustrates a flow according to the second embodiment of the present invention from a moment at which the photographing operation is performed to a moment at which the film is rewound.

FIG. 9 illustrates the operation to be performed from the moment at which the photographing operation is performed to a moment at which the film is rewound. The same operations as those shown in FIG. 7 are given the same step numbers and their descriptions are omitted here. Referring to FIG. 9, in step 401, whether or not the recorded intermediate rewind number x' is the same as the predetermined number N is discriminated. If it is negated, the flow proceeds to step 402 in which a discrimination is made whether or not the index ring 31a of the film cartridge indicates PA. If an affirmative discrimination is made, the operation of rewinding the film 33 is stopped in step 403. In next step 404, the head is retracted. If an affirmative discrimination is made in step 401, the flow proceeds to step 405 in which whether or not the indicator 31a of the index ring indicates EX is examined. If an affirmative discrimination is made, the operation of rewinding the film 33 is stopped in step 406. In step 407, the magnetic head 2 is retracted from the surface of the film 33. Furthermore, a fact that the subject film cannot be used again is indicated by the indicator 12 (step 408).

Figure 10:
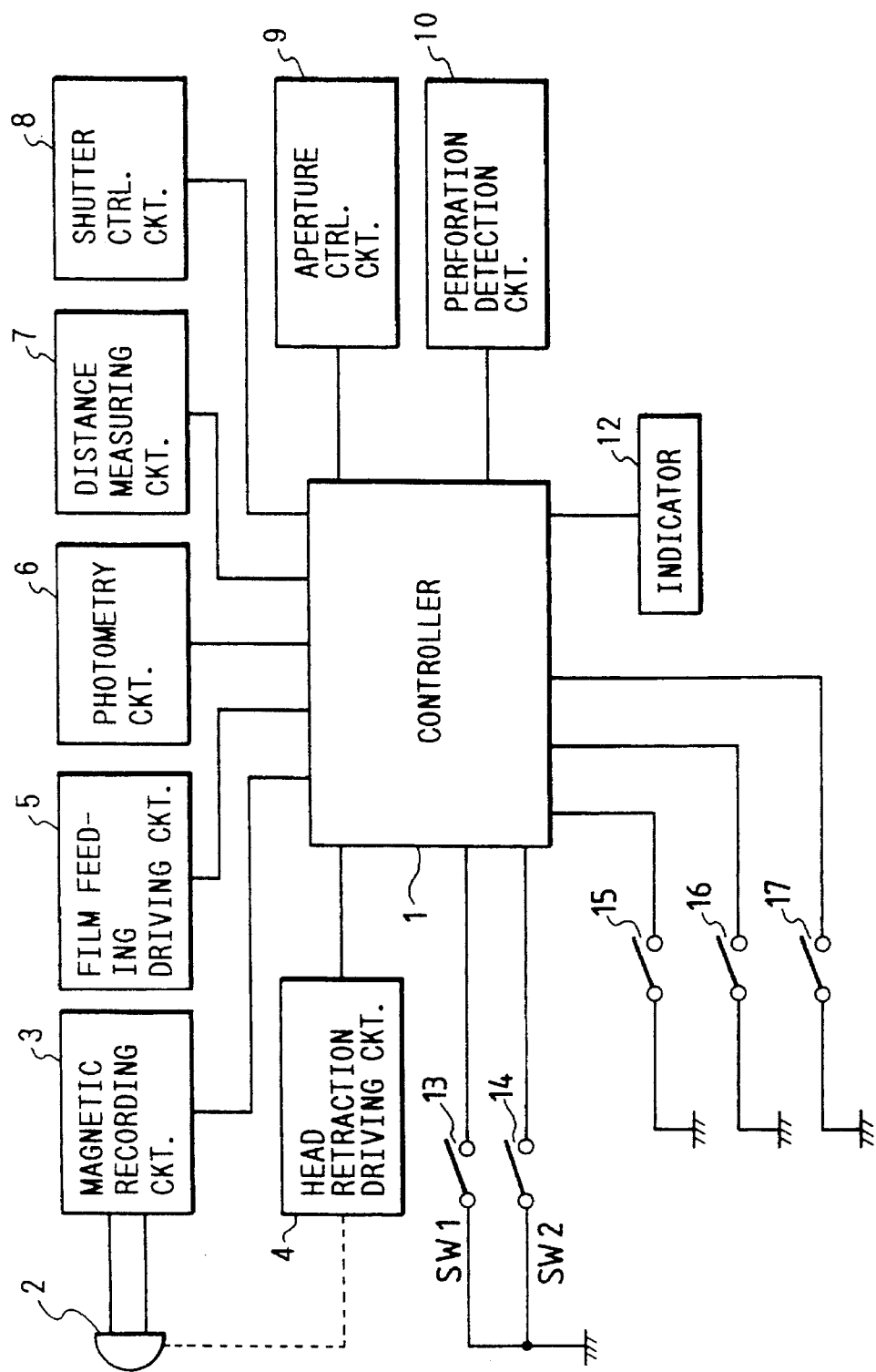
FIG. 10 is a block diagram which illustrates an electric circuit for use in a third embodiment of the present invention.
Figure 11B:
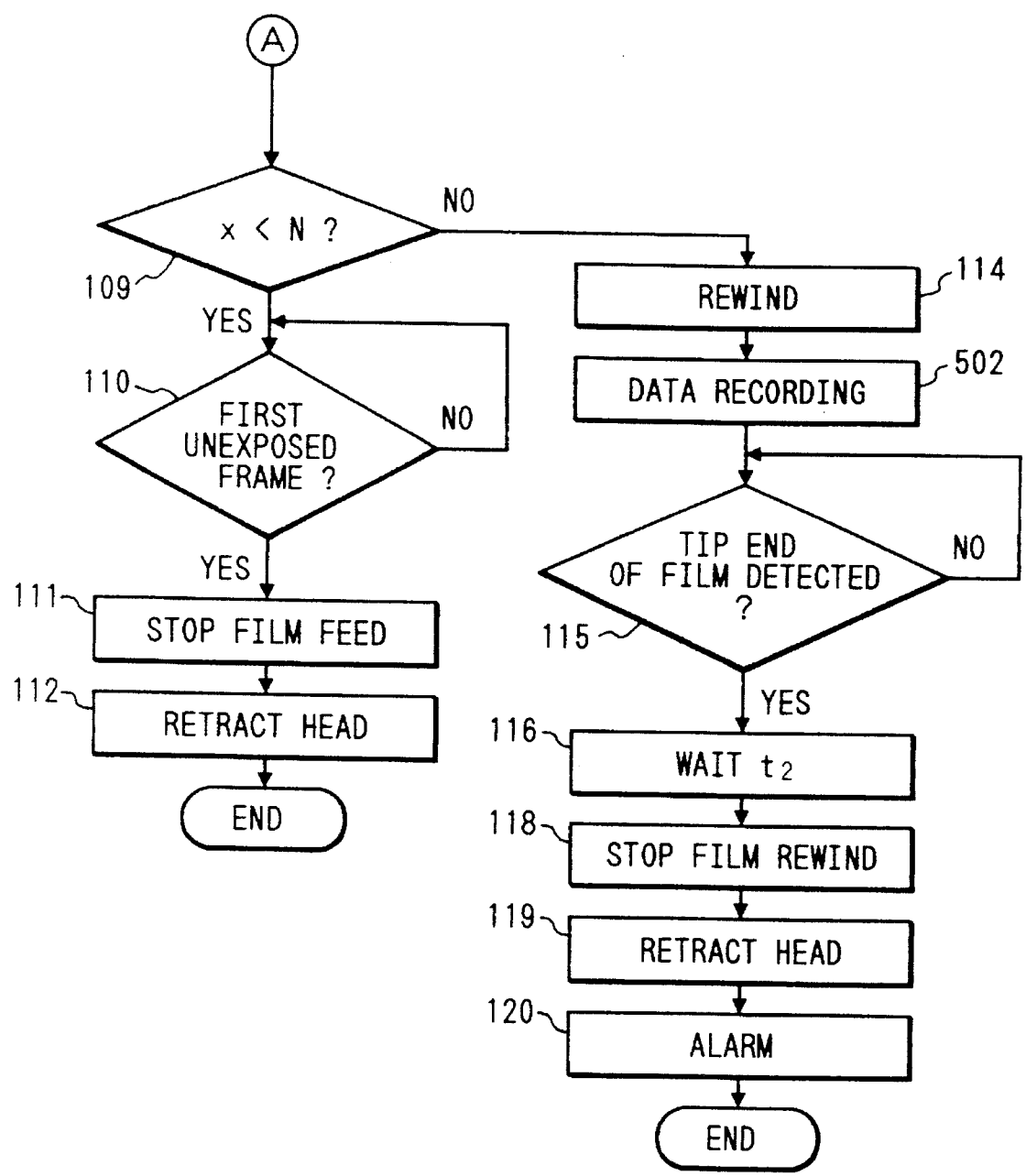
Figure 12:
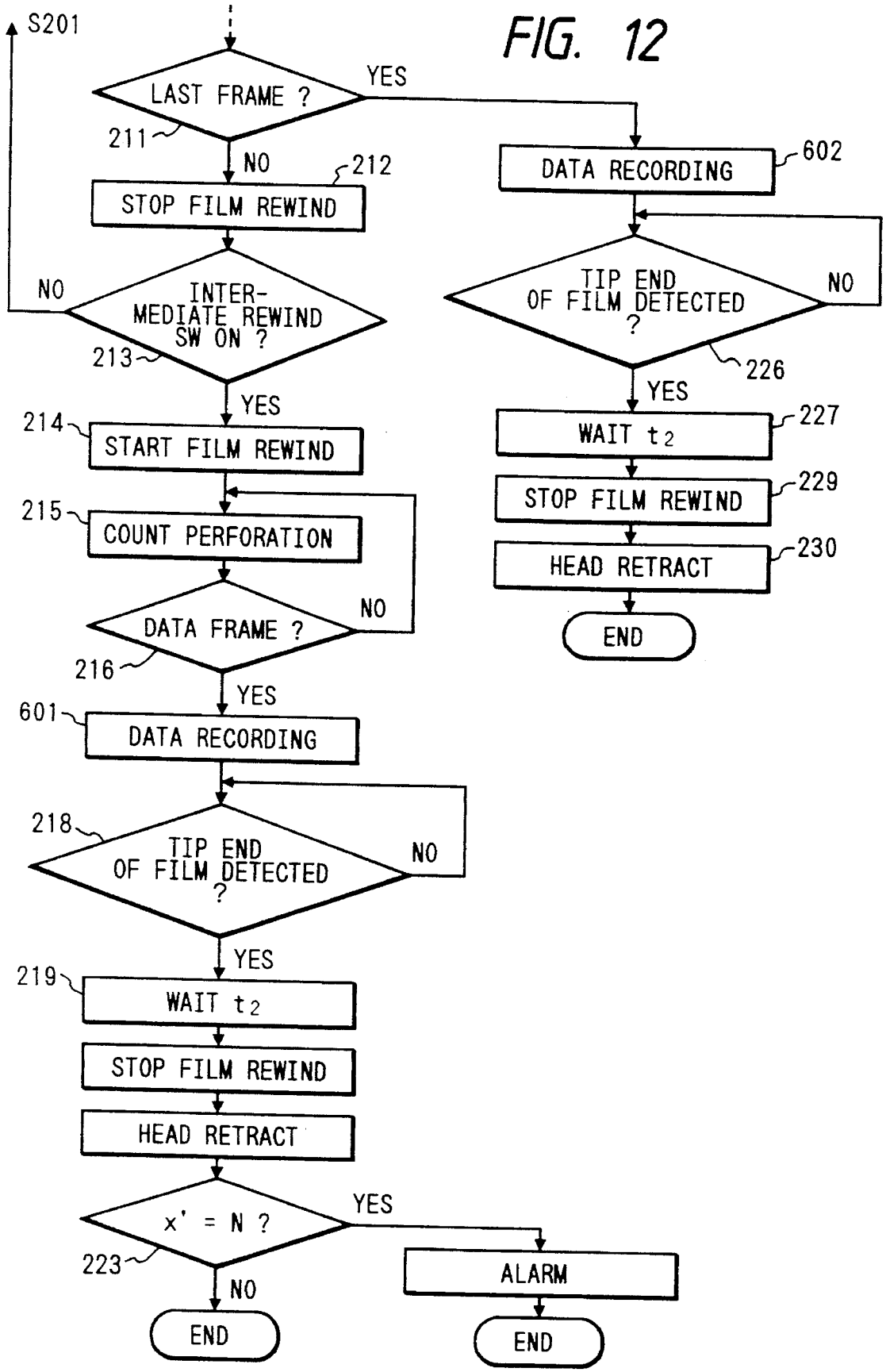
FIG. 12 is a flow chart which illustrates a flow according to the third embodiment of the present invention from a moment at which the photographing operation is performed to a moment at which the film is rewound.

FIGS. 10 to 12 illustrate another embodiment of the present invention. This embodiment is arranged in such a manner that a camera which has not the film exposure state detection circuit 11 according to the aforesaid embodiment is enabled to discriminate the film exposure state according to data recorded on the film. Referring to FIG. 10, since the structure is the same as that shown in FIG. 5 except for an arrangement in which the film condition detection circuit i1 is excluded, the same elements as those shown in FIG. 5 are given the same reference numerals and their descriptions are omitted here.

Then, the operation of this embodiment will now be described with reference to a flow chart of the control circuit 1 shown in FIG. 10. FIG. 11 illustrates the operation to be performed from a moment at which the film cartridge is loaded to a moment at which a preparation for the photographing operation is completed. The same operations as those shown in FIG. 6 are given the same step numbers and their descriptions are omitted here. The difference from FIG. 6 lies in step 501 in which the condition of the film 33 recorded in the magnetic recording region 40 of the data frame 36 of the film 33 is read so as to discriminate the condition. In step 502, film exposure state EX is recorded to the magnetic recording region 40.

FIG. 12 illustrates the operation to be performed from a moment at which photographing is performed to a moment at which film 33 is rewound. The same operations as those shown in FIG. 7 are given the same reference numerals and their descriptions are omitted here. The flow chart shown in FIG. 12 is different from that shown in FIG. 7 in step 601 in which intermediate rewind number x'=x+1 and a fact that the film exposure state is PA are recorded. In step 602, a fact that the film exposure state is EX is recorded.

In the above described embodiments, the descriptions are made about the pre-winding type camera. The present invention may, of course, be embodied in a normal winding type camera. Although the aforesaid embodiments are arranged in such a manner that the intermediate rewind number is recorded to the data frame 36 in the reader portion of the film, the present invention is not limited to the aforesaid recording portion. It may be recorded to, for example, the magnetic recording region of each frame.

As described above, according to this embodiment, the number of intermediate rewindings the film is recorded to the magnetic recording portion of the film having the magnetic recording portion. Furthermore, the structure comprises a means of forcibly rewinding the film and issuing an alarm if the recorded intermediate rewind number is read and also this number is larger than a predetermined number which will generate flaws. Therefore, the flaws in the film can be satisfactorily prevented.

Figure 13:
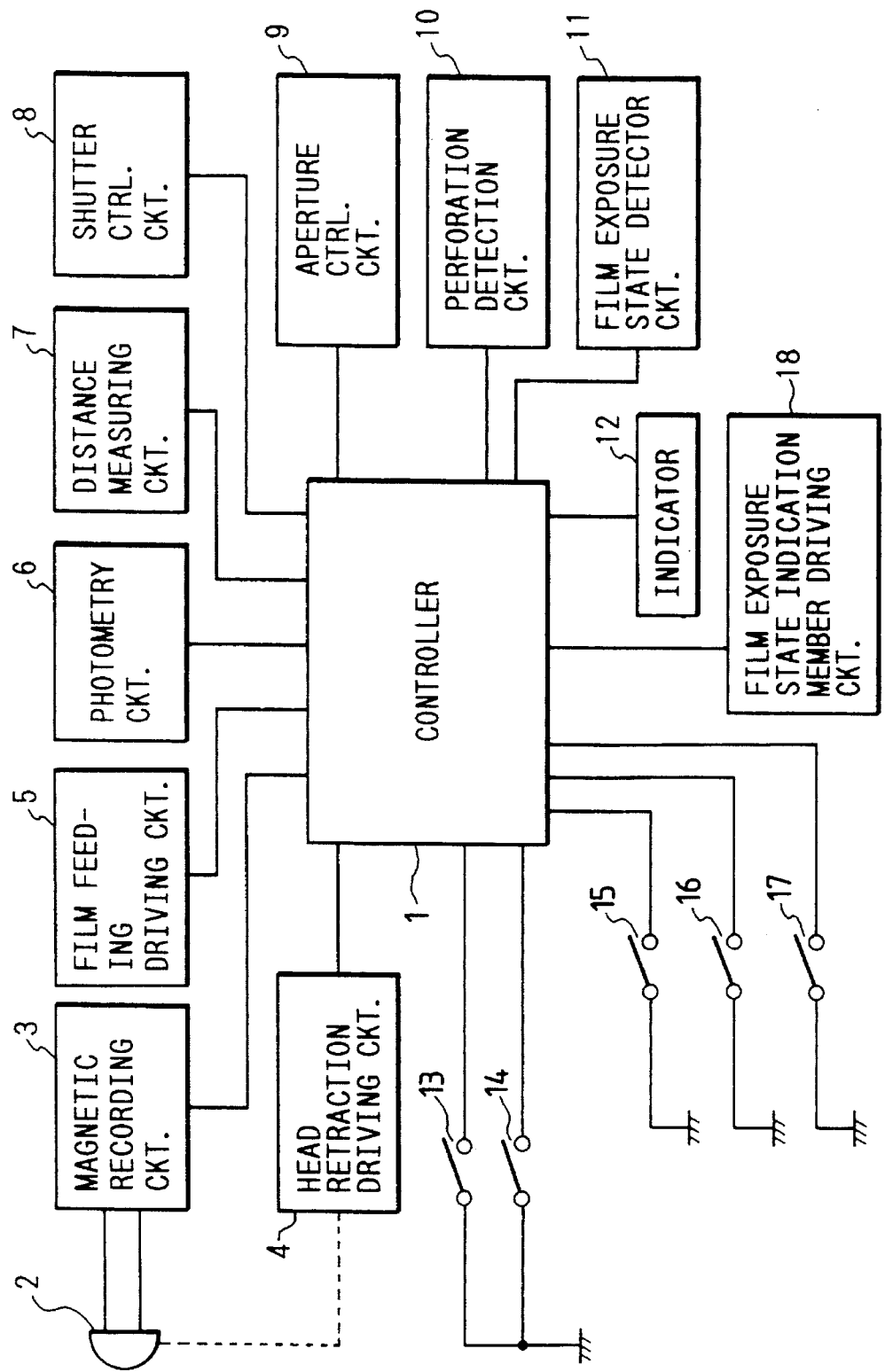
FIG. 13 is a block diagram which illustrates an electric circuit for use in another embodiment of the present invention.

FIGS. 13 to 16 illustrate another embodiment of the present invention. FIG. 13 is a block diagram which illustrates a circuit for use in this embodiment. The same elements as those shown in FIG. 1 are given the same reference numerals. Referring to FIG. 13, reference numeral 18 represents a condition indication changeover driver circuit for starting a changeover means for changing over the indication made by the means for indicating the condition of the film in the film cartridge. Since the changeover means is formed into a known structure as disclosed in U.S. Pat. No. 4,947,197 and the like, its description is omitted here.

Figures 14A, 14B, 14C:
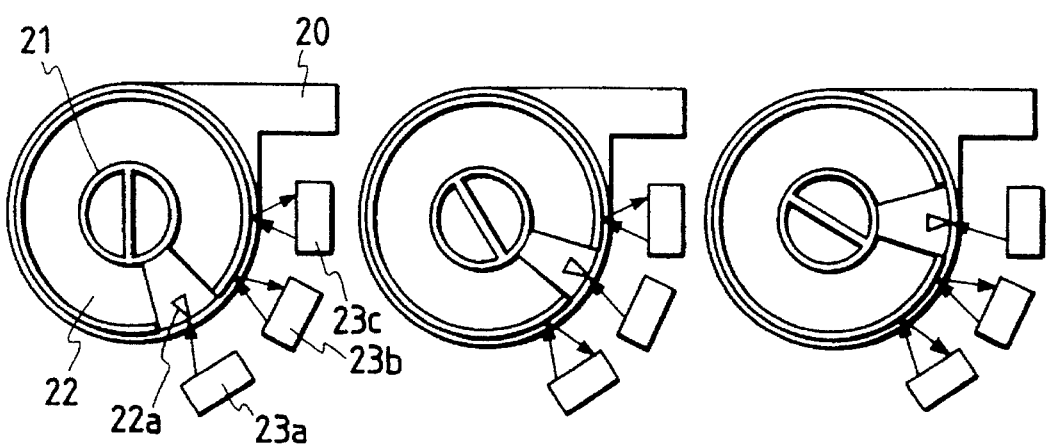
FIGS. 14A to 14C are top views which illustrate a cartridge according to the embodiment of the present invention.

FIG. 14 is a top view which illustrates the film cartridge shown in FIG. 2. Referring to FIG. 14, reference numeral 20 represents a film cartridge body and 21 represents a fork engagement portion which is integrally formed with a film spool in the cartridge and which is engaged to a fork of the camera so as to enable the film to be thrusted out/rewound. Reference numeral 22 represents an index ring including an indicator 22a. The fork engagement portion 21 and the index ring 22 are able to respectively independently rotate in relation to the film cartridge 20. The index ring 22 is rotated by the film exposure state indication changeover driver circuit 18 by the known method disclosed in U.S. Pat. No. 4,965,600. Reference numerals 23a, 23b and 23c represent photoreflectors disposed in the cartridge chamber of the body of the camera. By inputting signals from the photoreflectors to the film exposure state detection circuit 11, the condition of the film can be discriminated. FIG. 14A illustrates a state where all frames of the film are unexposed (hereinafter abbreviated to "UN"), FIG. 14B illustrates a state where only a portion of the frames have been exposed (hereinafter abbreviated to "PA") and FIG. 14C illustrates a state where all frames have been exposed (hereinafter abbreviated to "EX").

Figure 16B:
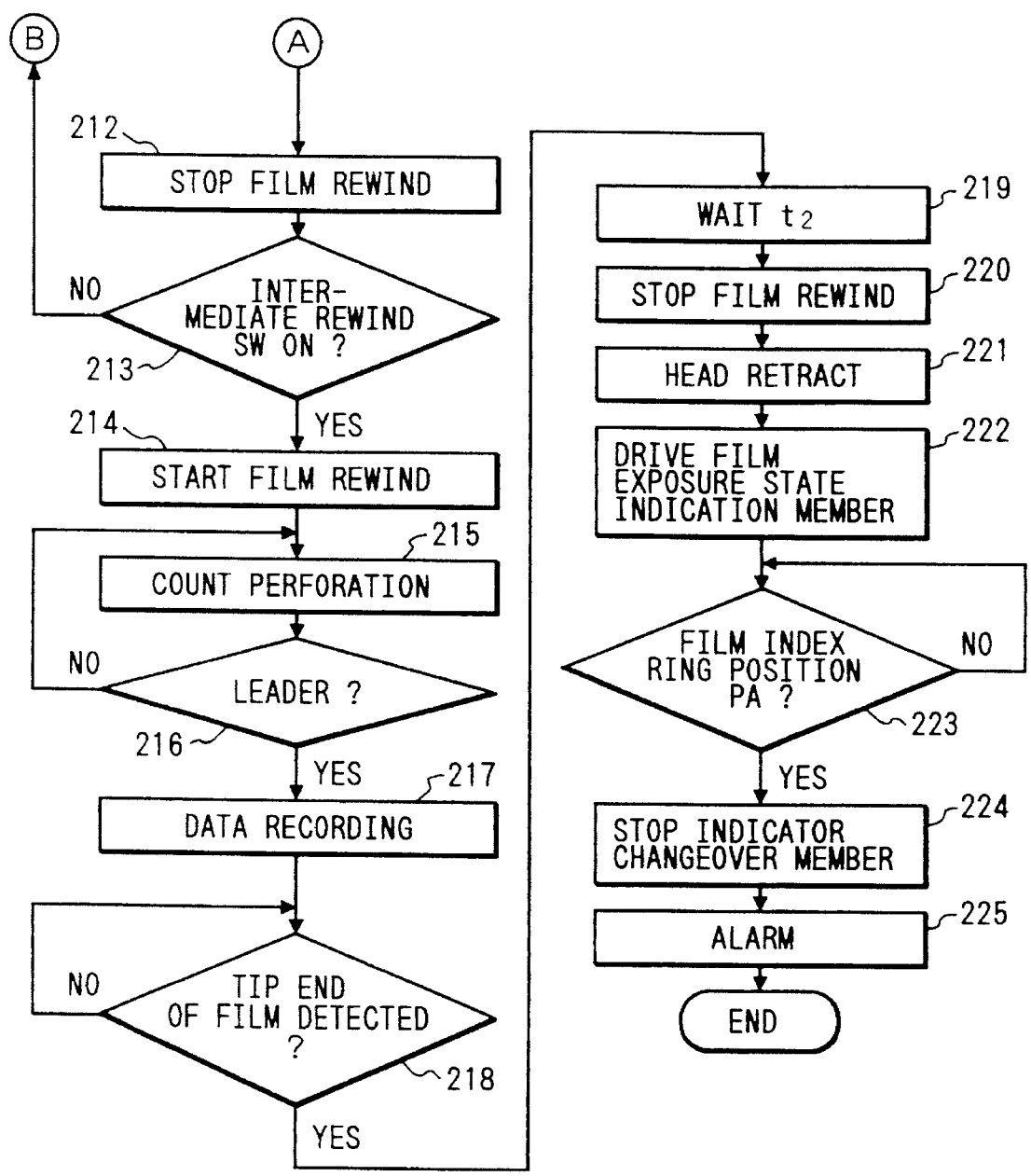

FIGS. 15 and 16 are flow charts which illustrate the operation of another embodiment of the present invention. FIG. 15 illustrates the operation to be performed by the pre-winding type camera, the operation being illustrated from a moment at which the film cartridge is loaded to a moment at which the preparation for the photographing operation has been completed. When the film cartridge has been loaded in the cartridge chamber (omitted from illustration) of the camera, the cartridge switch 15 is switched on (step 101). When the back lid (omitted from illustration) is then closed, the back lid switch 16 is switched on (step 102). In step 103, the condition of the film is discriminated by the detection method shown in FIG. 14. If a discrimination that the condition is EX (all frames have been exposed) is made, the flow proceeds to step 113 in which the indicator 12 issues a warning that the film cannot be used because all frames have been exposed. If a discrimination is made that the condition of the film is UN (all frames are not exposed), the flow proceeds to step 121 in which the film feeding motor (omitted from illustration) is rotated by the film feeding driver circuit 5 to start the prewinding operation. The flow then proceeds to step 122 in which the number of the perforations of the film is counted and whether or not the prewinding operation has been completed is discriminated. If the same has not been completed, the flow returns to step 122. If the same has been completed, the flow proceeds to step 124 in which the rotation of the film feeding motor is stopped by the film feeding driving circuit 5. If a discrimination is made in step 103 that the condition of the film is PA (only partial frames have been .exposed), the flow proceeds to step 104 in which the film feeding motor is rotated by the film feeding driver circuit 5 to start the prewinding operation. In next step 105, the leading portion of the film is detected by the perforation detection circuit 10. If it has been detected, timer time tl is passed in step 106, and then the magnetic head 2 is brought into contact with the surface of the film by the magnetic head retraction driver circuit 4 in step 107. In next step 108, data recorded to the reader portion of the film is read by the magnetic recording circuit 3. According to data about the unexposed frames among all of read data, whether or not the film has been fed to the leading portion of the unexposed frames is discriminated (step 110). If an affirmative discrimination is made, the flow proceeds to step 111 in which the film feeding motor is stopped by the film feeding driver circuit 5. In next step 112, the magnetic head retraction driver circuit 4 is actuated to retract the magnetic head 2 from the surface of the film 33.

FIG. 16 illustrates the operation to be executed from a moment at which the photographing operation is performed to a moment at which the film is rewound. In step 201, whether or not the photometry switch 13 has been switched on is examined. If it has been switched on, the flow proceeds to step 202 in which the photometry circuit 6 and the distance measuring circuit 7 are actuated. According to information obtained from the circuits 6 and 7, the photometry and the distance measurement are performed. In next step 203, whether or not the exposure switch 14 has been switched on is examined. If it has been switched on, the flow proceeds to step 204 in which the shutter control circuit 8 and the aperture control circuit 9 are actuated. As a result, the exposure operation is started. In next step 205, whether or not the exposure operation has been completed is examined. If it has been completed, the flow proceeds to step 206 in which the head retraction driver circuit 4 is actuated to bring the magnetic head 2 into contact with the surface of the film 33. Whether or not the exposure operation has been completed is detected by a known method, for example, a method which uses a signal denoting the completion of running of the rear curtain of the shutter. In next step 207, the film feeding driver circuit 5 is actuated to start rewinding the film 33. In step 208, the magnetic recording circuit 3 is actuated to record data about the exposure condition and an arbitrary comment or the like on the film 33. In step 209, the number of the perforations is counted so as to examine whether or not the perforations for one frame have been counted (step 210). If one frame has been fed, the flow proceeds to step 211 in which whether or not the exposed frame is the last frame is examined. If it is negated, the flow proceeds to step 212 in which the film feeding driver circuit 5 is actuated so as to stop rewinding the film. In step 213, whether or not the intermediate rewinding switch 17 has been switched on is detected. If it is negated, the flow returns to step 201 in which the photographing operations in steps 201 to 213 are repeated. If the fact that the exposed frame is the last frame has been detected in step 211, the flow proceeds to step.226 in which data is recorded to the reader portion of the film by the magnetic recording circuit 3. In next step 227, whether or not the leading portion of the film has passed is examined by the perforation detection circuit. If the fact that the leading portion has passed is detected, the timer time $t_2$ is passed in step 228. In next step 229, the film feeding driver circuit 5 is actuated to stop the rotation of the film feeding motor. The timer time $t_2$ is a time required to perfectly wind up the film into the cartridge. In next step 230, the magnetic head 2 is retracted from the surface of the film 33 by the magnetic head retraction. driver circuit 4. In next step 231, the film exposure state indication changeover means driver circuit 18 is actuated to drive the indication changeover means. In step 232, the film exposure state detection circuit 11 is actuated to discriminate whether or not the indicator 22a of the index ring 22 of the film cartridge indicates the fact that all frames have been exposed. If an affirmative discrimination is made, the indication changeover means is stopped (step 233). If a fact that the intermediate rewinding switch has been switched on is detected in step 213, the flow proceeds to step 214 in which the film feeding motor is rotated by the film feeding driver circuit 5. Thus, the operation of rewinding the film 33 is started. In next step 215, the number of the perforations is counted by the perforation detection circuit 10. In step 216, whether or not the data frame 36 faces the aperture 47 is discriminated (step 216). If an affirmative discrimination is made, the flow proceeds to step 217 in which data such as data about the exposed frames is recorded by the magnetic head. Then, the flow proceeds to step 218 in which whether or not the leading portion of the film 33 has passed is detected by the perforation detection circuit 10. If passing has been detected, timer time $t_2$ is passed in step 219. Then, in step 220 in which the rotation of the film feeding motor is stopped by the film feeding driver circuit 5. Thus, the rewinding operation is completed. In next step 221, the magnetic head 2 is retracted from the surface of the film 33. In step 222, the film exposure state indication changeover means driver circuit 18 is actuated to drive the indication changeover means. In step 223, the film exposure state detection circuit 11 is actuated to discriminate whether or not the indicator 22a of the index ring 22 of the film cartridge indicates the fact that all frames have been exposed. If an affirmative discrimination is made, the indication changeover means is stopped (step 224). In next step 225, a fact that the film cannot be used is indicated by means of the indicator 12 (step 225).

Figures 18A, 18B, 18C:
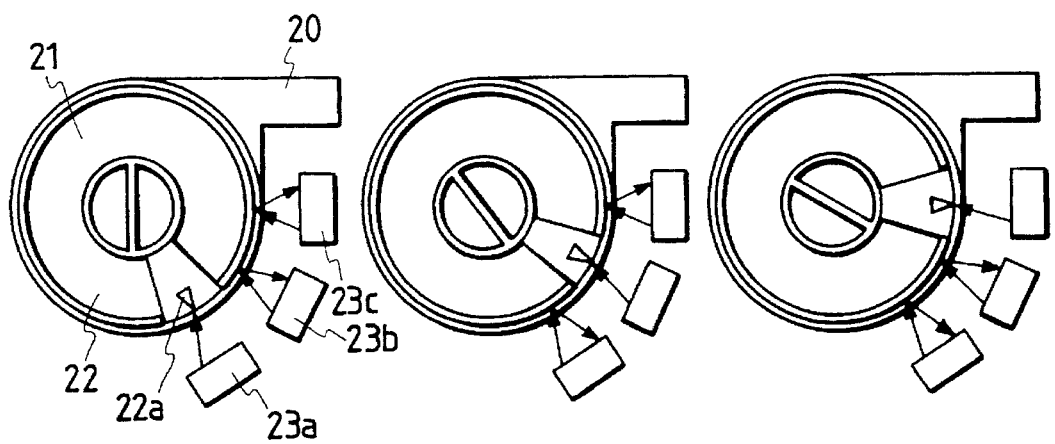
FIGS. 18A to 18C are top views which illustrate a film cartridge according to the embodiment shown in FIG. 17.
Figure 17:
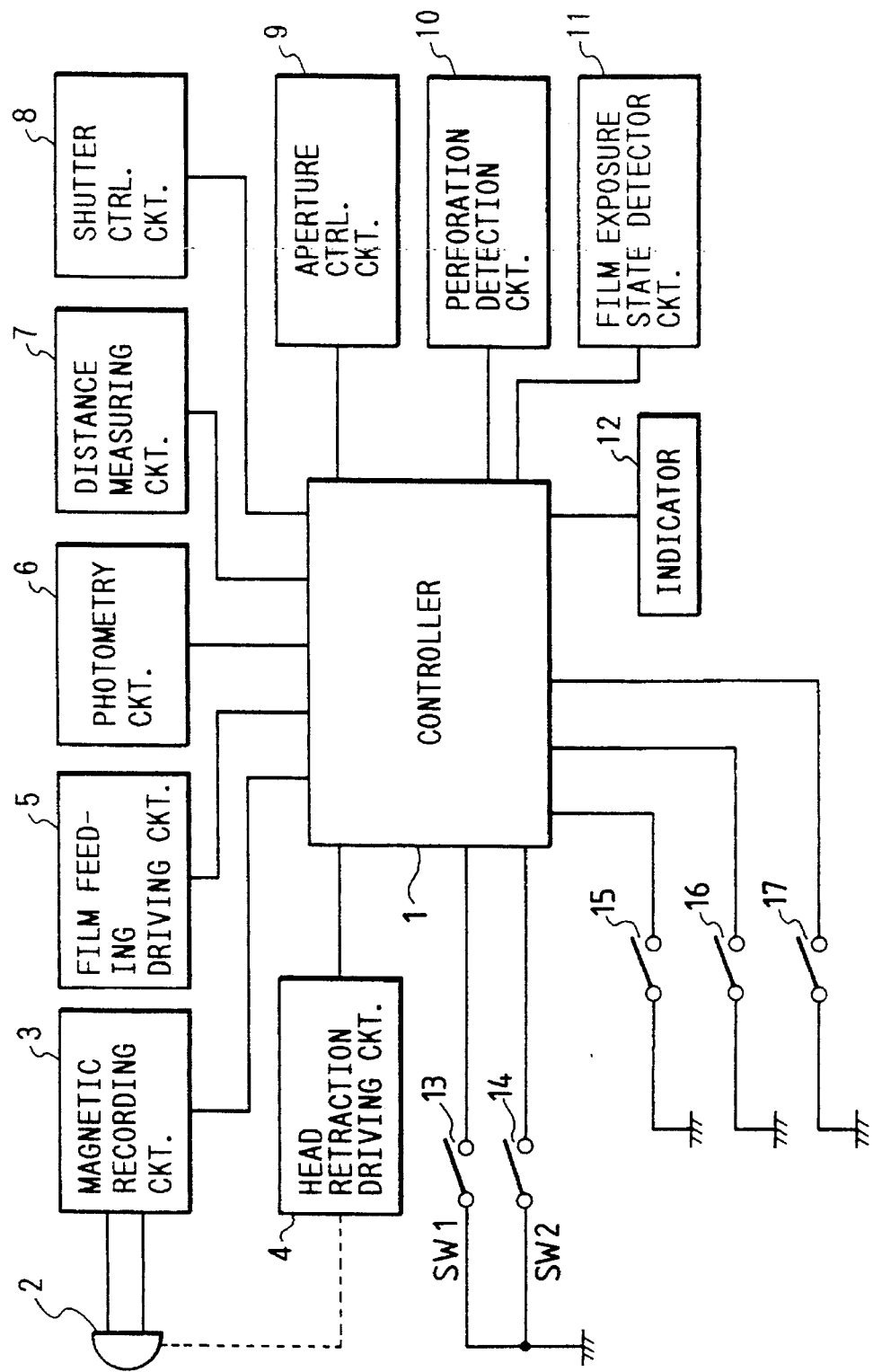
FIG. 17 is a block diagram which illustrates an electric circuit for use in another embodiment of the present invention.
Figure 19B:
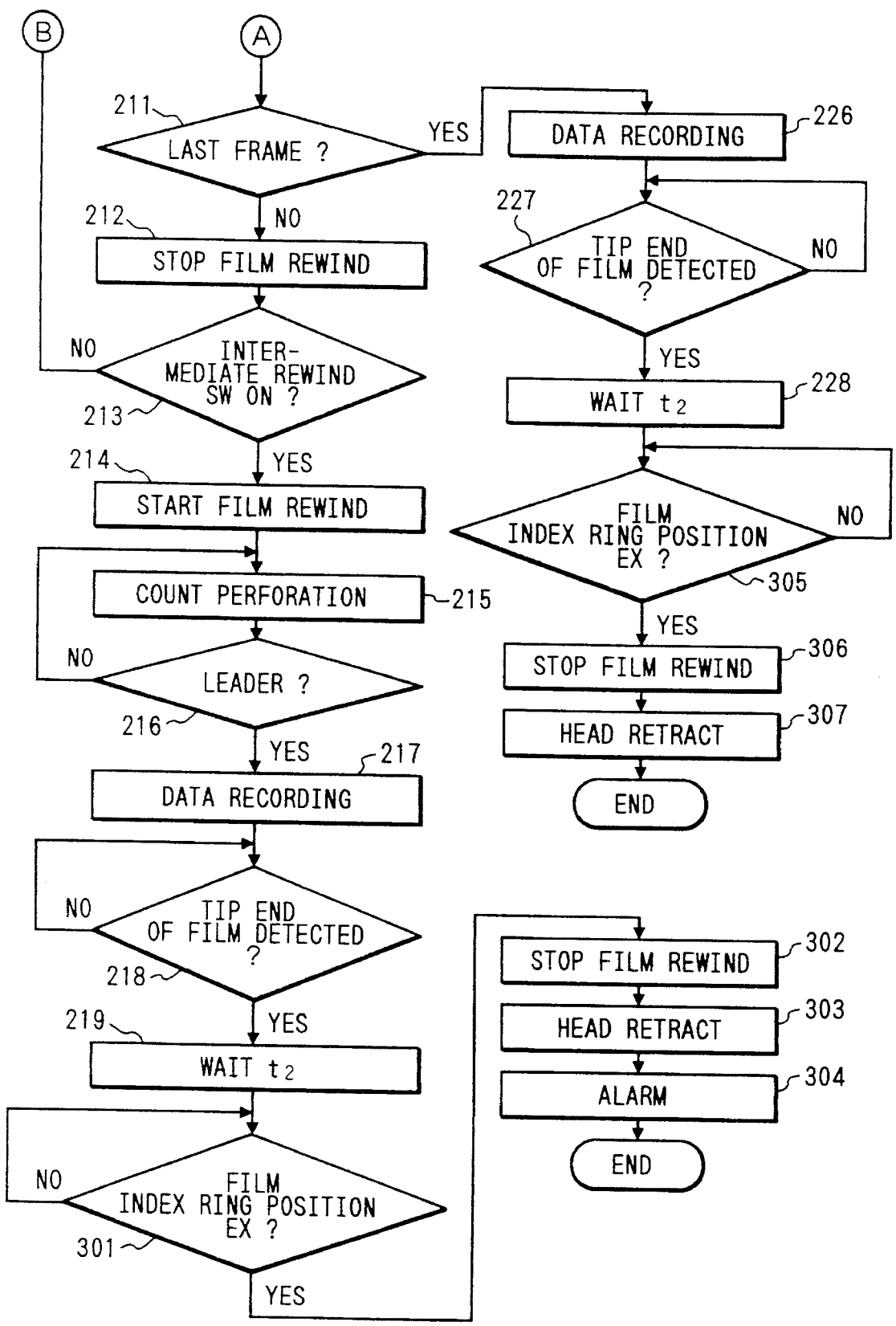

FIGS. 17 to 19 illustrate another embodiment of the present invention. FIG. 17 is a block diagram which illustrates an electric circuit for use in this embodiment. FIG. 18 is a top view which illustrate the film cartridge which is different from the known cartridge shown in FIG. 14 in a fact that the fork engagement portion 21 and the index ring 22 are formed integrally with each other. By using the film cartridge according to this embodiment, when the film is driven by the fork, the index ring 22 is simultaneously driven. Therefore, the aforesaid film exposure state indication changeover means for driving only the index ring 22 can be omitted from the structure. FIG. 19 is a flow chart which illustrates the operation to be performed in a case where the cartridge according to this embodiment is used, the operation being illustrated from a moment at which the photographing operation is performed to a moment at which the film is rewound. The same operations as those shown in FIG. 16 are given the same reference numerals and their descriptions are omitted here. In step 305, the film exposure state detection circuit 11 detects the position of the indicator of the index ring of the film. If the EX state is indicated, the flow proceeds to step 306 in which the film feeding motor is stopped by the film feeding driver circuit 5. Thus, the operation of rewinding the film is stopped. The flow further proceeds to step 307 in which the magnetic head 2 is retracted from the surface of the film. In steps 301 to 303, the same operations as those in steps 305 to 307 are performed. In step 304, a fact that the film cannot be used is indicated by the indictor 12.

Although the description according to this embodiment is made about the prewinding type camera, a similar effect can, of course, be obtained in a case where the present invention is embodied in a normal winding type camera.

Although the alarming means comprises the indicator of the body of the camera according to this embodiment, another indication method or alarming by means of sound may be employed.

Figure 20B:
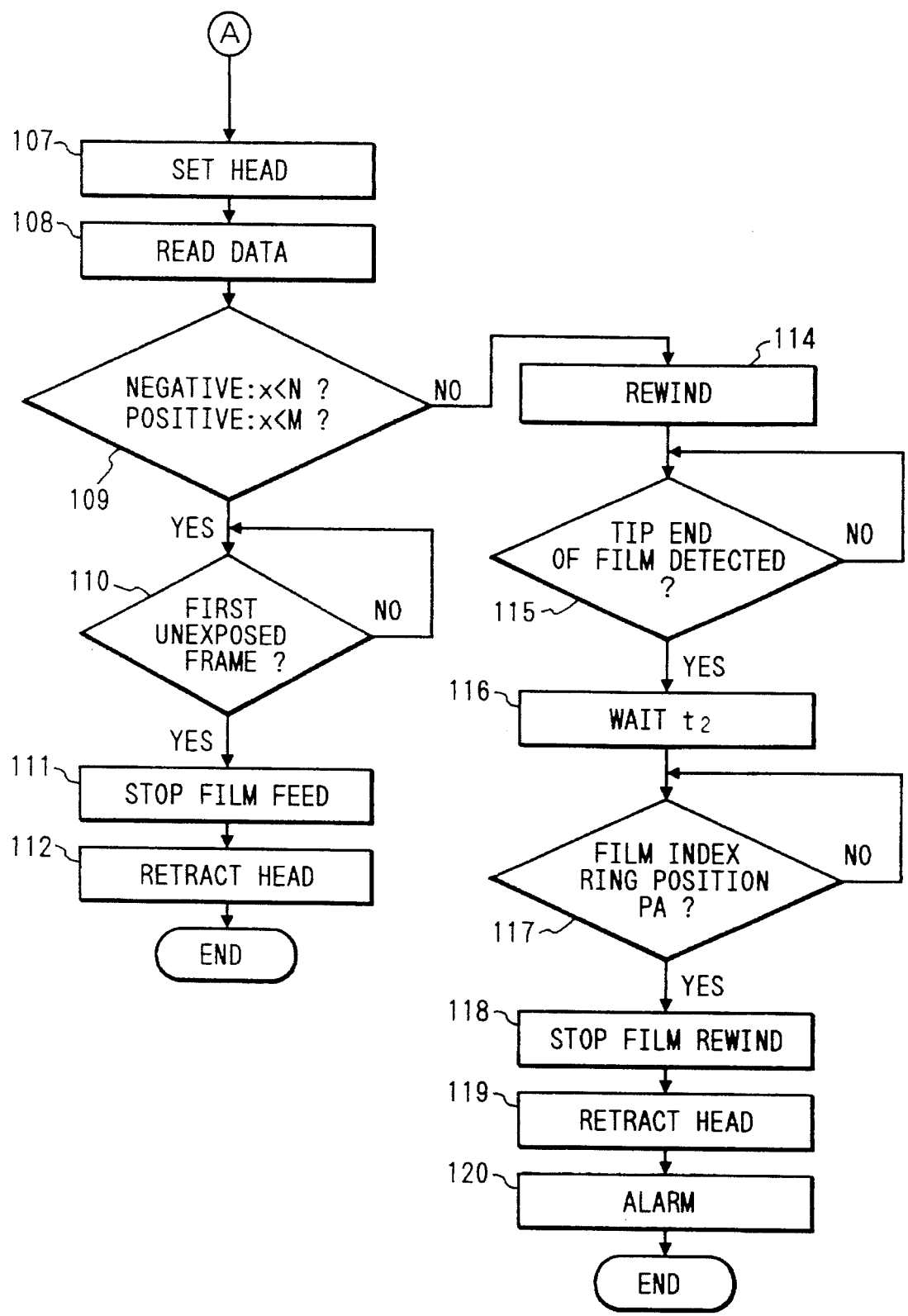

According to this embodiment, the electric circuit arranged as shown in FIG. 1, the film cartridge shown in FIG. 3 and the structure of the camera shown in FIG. 5 are used. Then, the operation of this embodiment will now be described with reference to flow charts shown in FIGS. 20 and 21. FIG. 20 illustrates the operation of the prewinding type camera to be performed from a moment at which the film cartridge is loaded to a moment at which the preparation for the photographing operation is completed. When the film cartridge 30 has been loaded in the cartridge chamber 43 of the camera, the cartridge switch 15 is switched on (step 101). When the back lid is then closed, the back lid switch 16 is switched on (step 102). In step 103, the condition of the film 33 is discriminated by the detection method shown in FIG. 3. If a discrimination that the condition is EX (all frames have been exposed) is made, the flow proceeds to step 113 in which the indicator 12 issues a warning that the film cannot be used. If a discrimination is made that the condition of the film is UN (all frames are not exposed), the flow proceeds to step 121 in which the film feeding motor is rotated by the film feeding driver circuit 5 to start the prewinding operation. The flow then proceeds to step 122 in which the number of the perforations of the film is counted by the perforation detection circuit 10. In step 123, whether or not a predetermined number of the perforations has been counted and therefore the prewinding operation has been completed is discriminated. If the same has not been completed, the flow returns to step 122. If the same has been completed, the flow proceeds to step 124 in which the rotation of the film feeding motor is stopped by the film feeding driving circuit 5.

If a discrimination is made in step 103 that the condition of the film is PA (only partial frames have been exposed), the flow proceeds to step 104 in which the film feeding motor is rotated by the film feeding driver circuit 5 to start the prewinding operation. In next step 105, the leading portion of the film is detected by the perforation detection circuit 10. If it has been detected, timer time $t_1$ is passed in step 106, and then the magnetic head 2 is brought into contact with the surface of the film by the magnetic head retraction driver circuit 4 in step 107. In next step 108, data in the magnetic recording region 40 of the film 33 is read by the magnetic recording circuit 3 so as to discriminate the intermediate rewind number and also discriminate whether or not the value denoting the film 33 corresponds to a negative film or a positive film, the intermediate rewind number and the value denoting the film 33 being recorded as data. In step 109, whether or not intermediate rewind number x is smaller than a predetermined number N in a case where the film is the negative film is determined. In a case where the film is the positive film, whether or not x is smaller than predetermined number M is discriminated. If an affirmative discrimination is made, the flow proceeds to step 110 in which a discrimination is made whether or not the number of the unexposed frames coincides with the number of frames detected by the perforation detection circuit 10, the discrimination being made according to data read in step 108. As a result, whether or not the film has been fed to the leading frame of the unexposed frames is discriminated. If the film has been fed as described above, the flow proceeds to step 111 in which the rotation of the film feeding motor is stopped by the film feeding driver circuit 5. In next step 112, the magnetic head retraction driver circuit 4 is actuated to retract the magnetic head 2 from the surface of the film 33.

If the intermediate rewind number x is larger than the predetermined number N, the flow proceeds to step 114 in which the film feeding driver circuit 5 is actuated to reversely rotate the film feeding motor. As a result, an operation of rewinding the film 33 is started. In next step 115, the leading portion of the film 33 is detected by the perforation detection circuit 10. If it has been detected, timer time $t_2$ is passed in step 116. In step 117, the film exposure state detection circuit 11 is actuated to detect the position of the indicator 31a of the indication ring of the film 33. If PA is indicated, the flow proceeds to step 118 in which the rotation of the film feeding motor is stopped by the film feeding driver circuit 5. Thus, the rewinding operation is completed. The timer time $t_2$ is a time required to completely wind up the film 33 into the cartridge. In next step 119, the magnetic head 2 is retracted from the surface of the film 33. In next step 120, the indicator 12 warns that the film cannot be used.

Figure 21B:
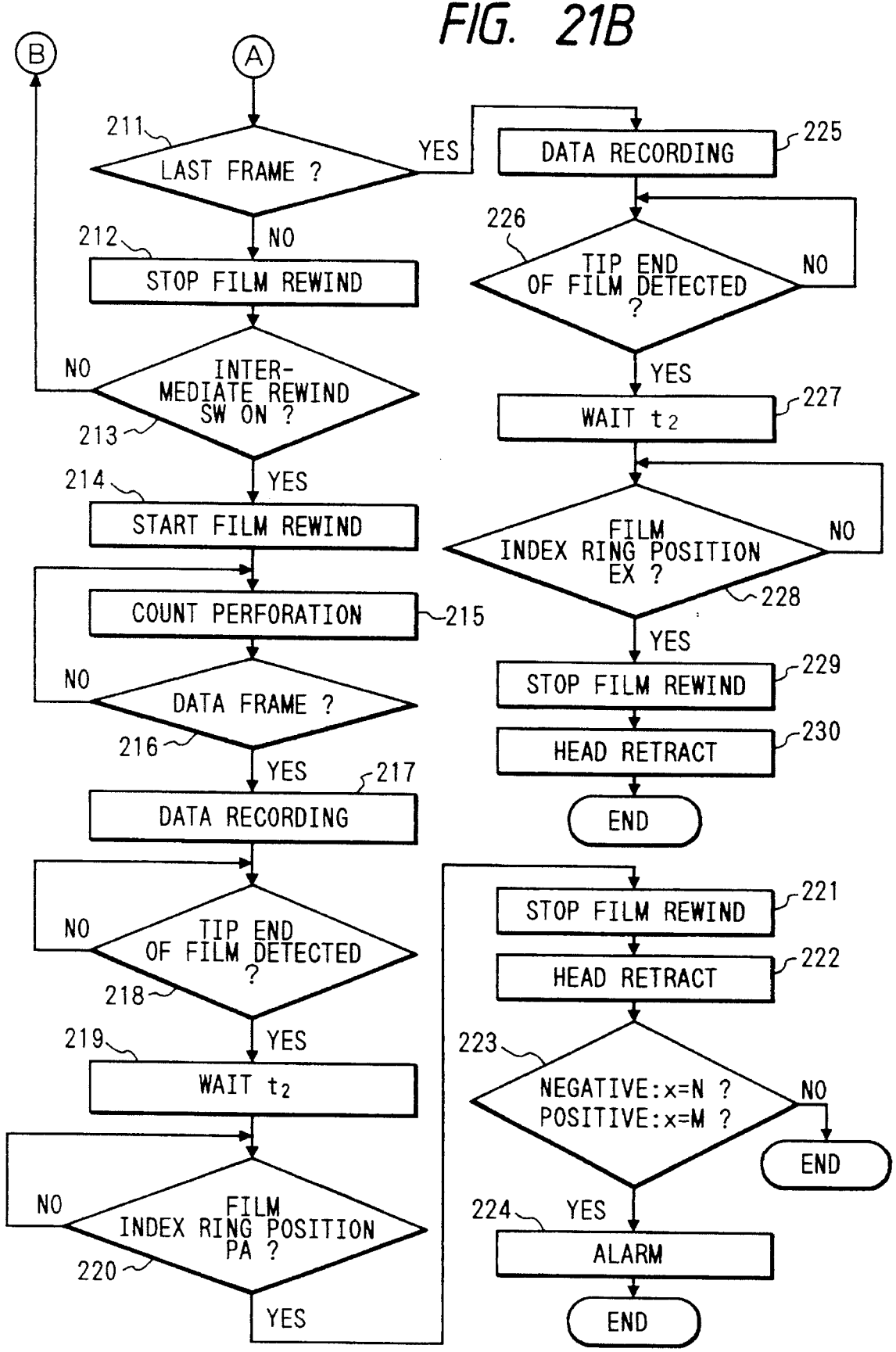

FIG. 21 illustrates the operation to be executed from a moment at which the photographing operation is performed to a moment at which the film is rewound. In step 201, whether or not the photometry switch 13 has been switched on is examined. If it has been switched on, the flow proceeds to step 202 in which the photometry circuit 6 and the distance measuring circuit 7 are actuated. According to information obtained from the circuits 6 and 7, the photometry and the distance measurement are performed. In next step 203, whether or not the exposure switch 14 has been switched on is examined. If it has been switched on, the flow proceeds to step 204 in which the shutter control circuit 8 and the aperture control circuit 9 are actuated. As a result, the exposure operation is started. In next step 205, whether or not the exposure operation has been completed is examined. If it has been completed, the flow proceeds to step 206 in which the head retraction driver circuit 4 is actuated to bring the magnetic head 2 into contact with the surface of the film 33. Whether or not the exposure operation has been completed is detected by a known method, for example, a method which uses a signal denoting the completion of running of the rear curtain of the shutter. In next step 207, the film feeding driver circuit 5 is actuated to start rewinding the film 33. In step 208, the magnetic recording circuit 3 is actuated to record data about the exposure condition and an arbitrary comment or the like to the film 33. In step 209, the number of the perforations is counted by the perforation detection circuit 10 so as to examine whether or not the perforations for one frame have been counted (step 210). If one frame has been completed, the flow proceeds to step 211 in which whether or not the exposed frame is the last frame is examined by discriminating whether or not the number of frames which can be exposed and which is recorded in the magnetic recording region 40 of the film 33 coincides with the number of the frames detected by the perforation detection circuit 10. If it is negated, the flow proceeds to step 212 in which the film feeding driver circuit 5 is actuated so as to stop rewinding the film. In step 213, whether or not the intermediate rewinding switch 17 has been switched on is detected. If it is negated, the flow returns to step 201 in which the photographing operations in steps 201 to 213 are repeated.

If the fact that the exposed frame is the last frame has been detected in step 211, the flow proceeds to step 225 in which data is recorded on the magnetic recording region 40 of the data frame 36 shown in FIG. 4 by the magnetic recording circuit 3. In next step 226, whether or not the leading portion of the film has passed is examined by the perforation detection circuit. If the fact that the leading portion has passed is detected, the timer time $t_2$ is passed in step 227. In next step 228, the position of the indicator 31a of the index ring of the film is detected by the film exposure state detection circuit 11. If the index ring 31a indicates EX, the flow proceeds to step 229 in which the film feeding driver circuit 5 is actuated to stop the rotation of the film feeding motor. Thus, the rewinding operation is completed. In next step 230, the magnetic head 2 is retracted from the surface of the film 33.

If a fact that the intermediate rewinding switch 17 has been switched on is detected in step 213, the flow proceeds to step 214 in which the film feeding motor is rotated by the film feeding driver circuit 5. Thus, the operation of rewinding the film 33 is started. In next step 215, the number of the perforations is counted by the perforation detection circuit 10 so as to examine whether or not the data frame 36 faces the aperture 47 (step 216). If an affirmative discrimination is made, the flow proceeds to step 217 in which intermediate rewind number x'=x+1 is recorded on the magnetic recording region 40 of the data frame 36. Then, the flow proceeds to step 218 in which whether or not the leading portion of the film 33 has passed is detected by the perforation detection circuit. If passing has been detected, timer time $t_2$ is passed in step 219. Then, in step 220, the indication position of the index ring 31a of the film 33 is detected by the film exposure state detection circuit 11. If the index ring 31a indicates PA, the flow proceeds to step 221 in which the rotation of the film feeding motor is stopped by the film feeding driver circuit 51. Thus, the rewinding operation is completed. In next step 222, the magnetic head 2 is retracted from the surface of the film 33. In step 223, whether or not the intermediate rewind number x' recorded in step 217 is the same as the predetermined number N is discriminated in a case where the film is the negative film. Whether or not it is the same as the predetermined number M is discriminated in a case where the film is the positive film. If a negative discrimination is made, the operation is completed here. If an affirmative discrimination is made, the flow proceeds to step 224 in which a fact that the film cannot be again used is indicated by the indicator 12.

Figure 22B:
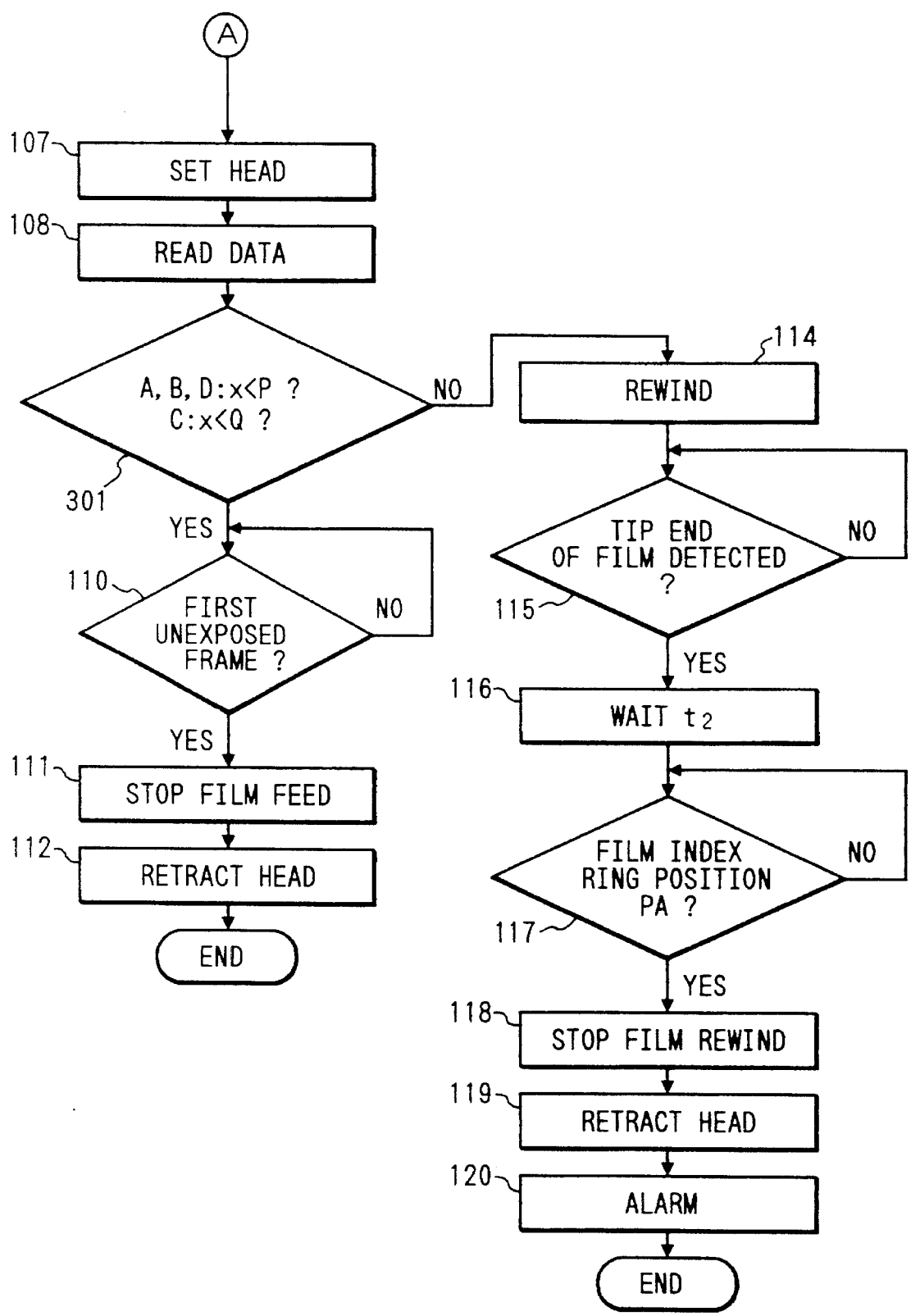
Figures 23, 23A:
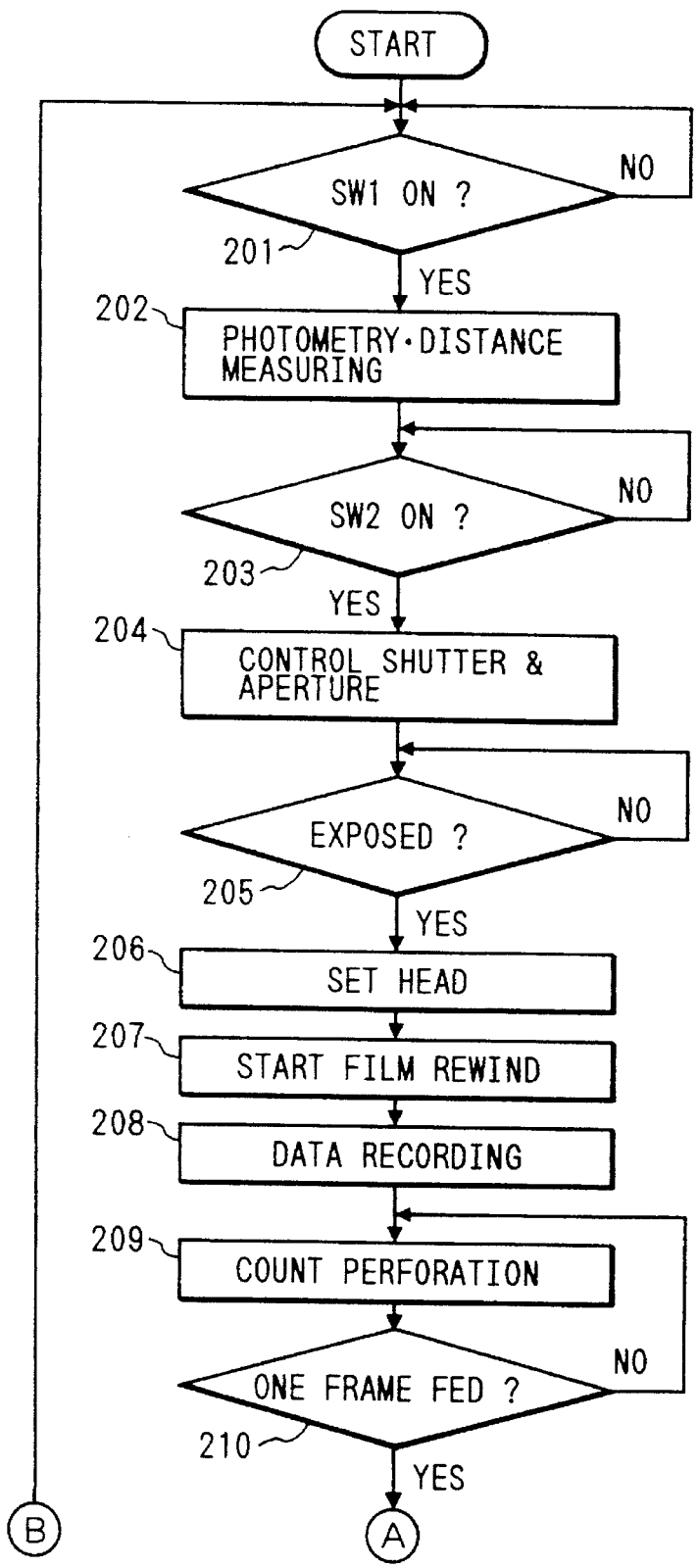
FIG. 23, 23A and 23B is a flow chart which illustrates a flow according to the embodiment shown in FIG. 22 from a moment at which the photographing operation is performed to a moment at which the film is rewound.
Figure 23B:
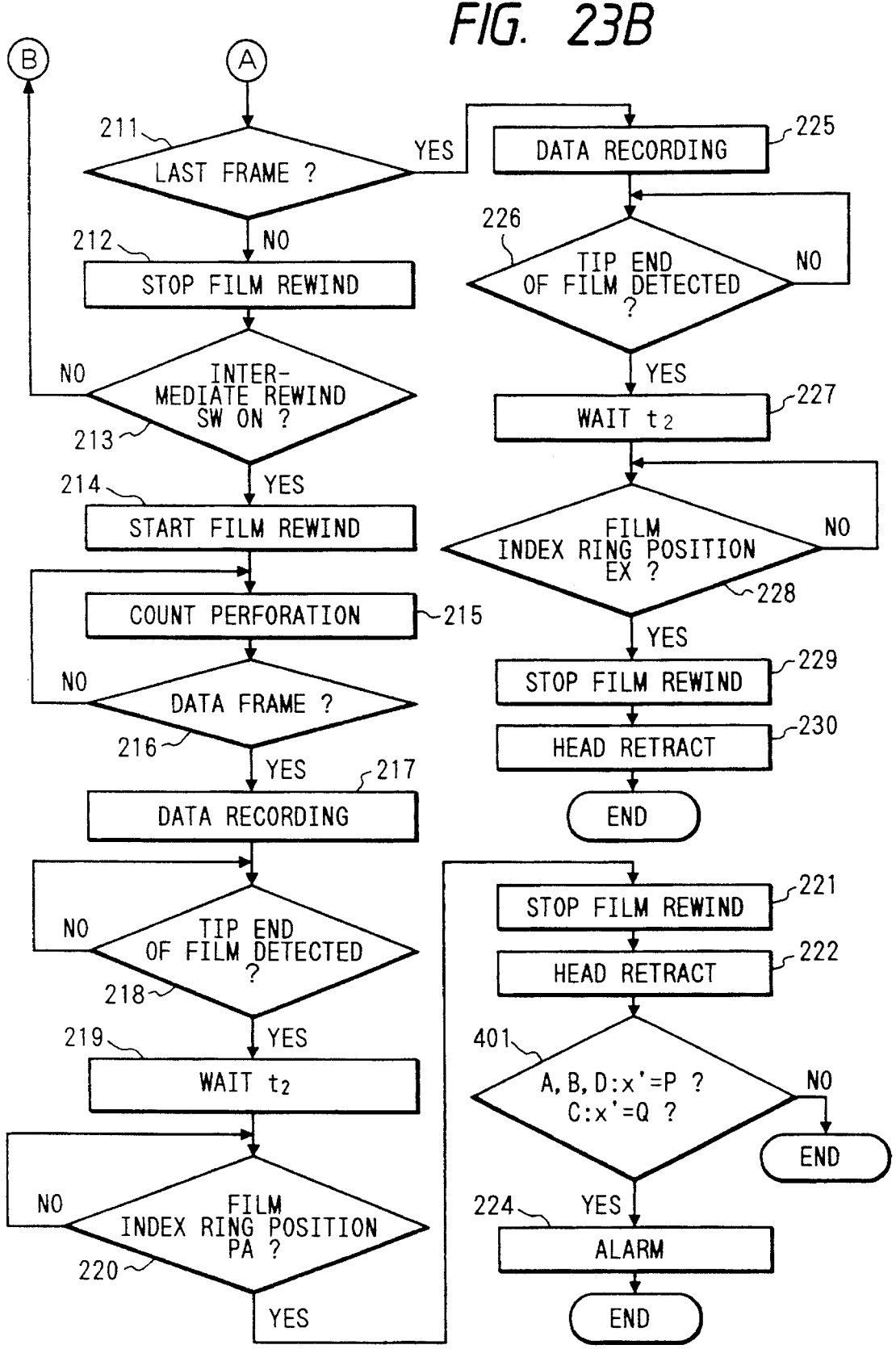

FIGS. 22 and 23 are flow charts which illustrate another operation of this embodiment. The difference from the flow chart shown in FIGS. 21 and 22 lies in a fact that intermediate rewind numbers are set depending upon the film manufacturers. FIG. 22 illustrates the operation to be performed from a moment at which the film cartridge is loaded to a moment at which the preparation for the photographing operation is completed. The difference from the operation shown in FIG. 20 lies in step 301 in which the allowable intermediate rewind number serving as a reference for a discrimination is changed depending upon the film manufacturer by using data about the film manufacturer among data read in step 108.

FIG. 23 illustrates the operation to be performed from a moment at which the photographing operation is performed to a moment at which the film is rewound. The difference from FIG. 21 lies in step 401 in which the allowable intermediate rewind number serving as a reference for a discrimination is changed depending upon the film manufacturer.

Figure 24:
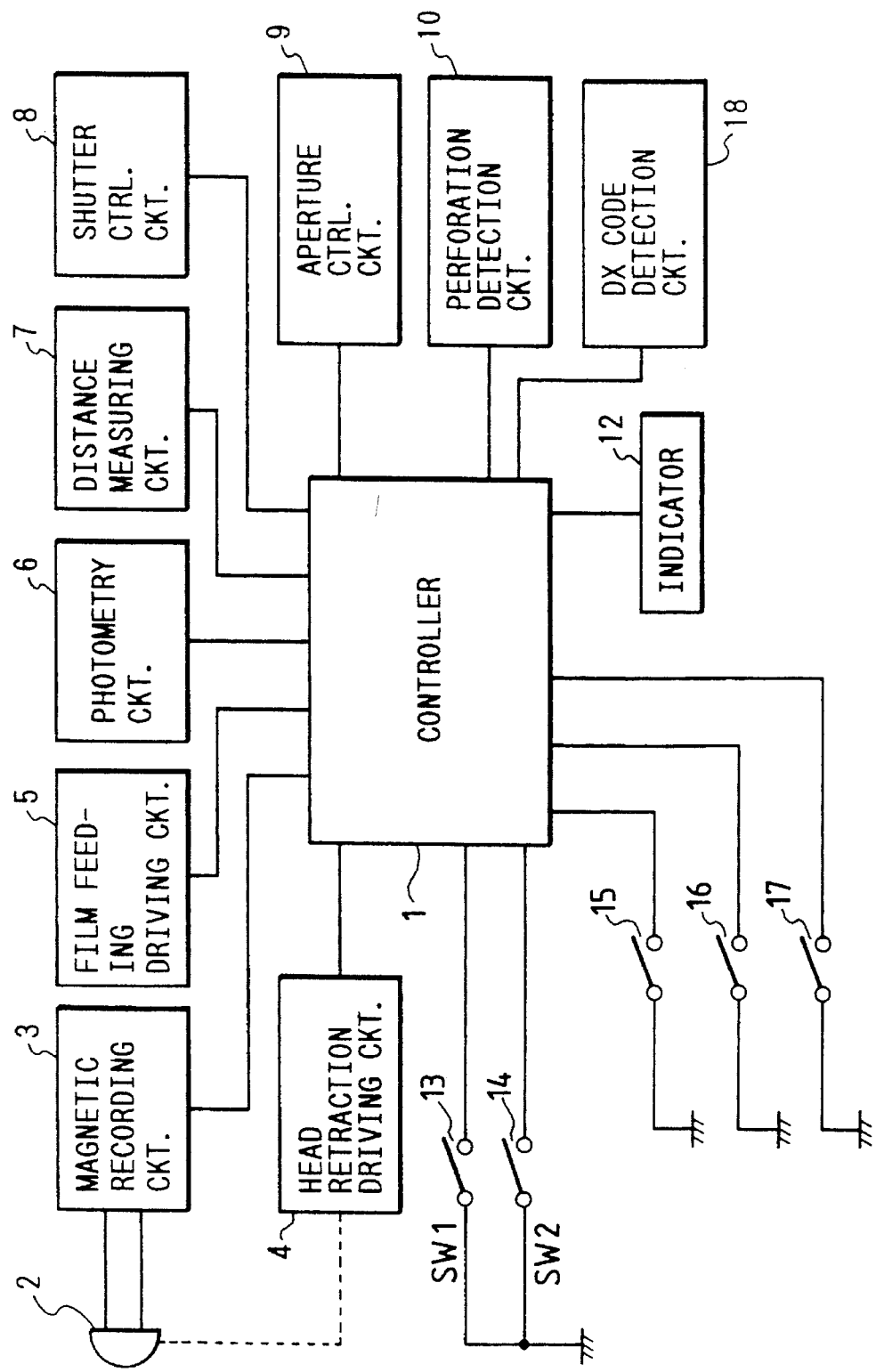
FIG. 24 is a block diagram which illustrates an electric circuit for use in another embodiment of the present invention.
Figure 25B:
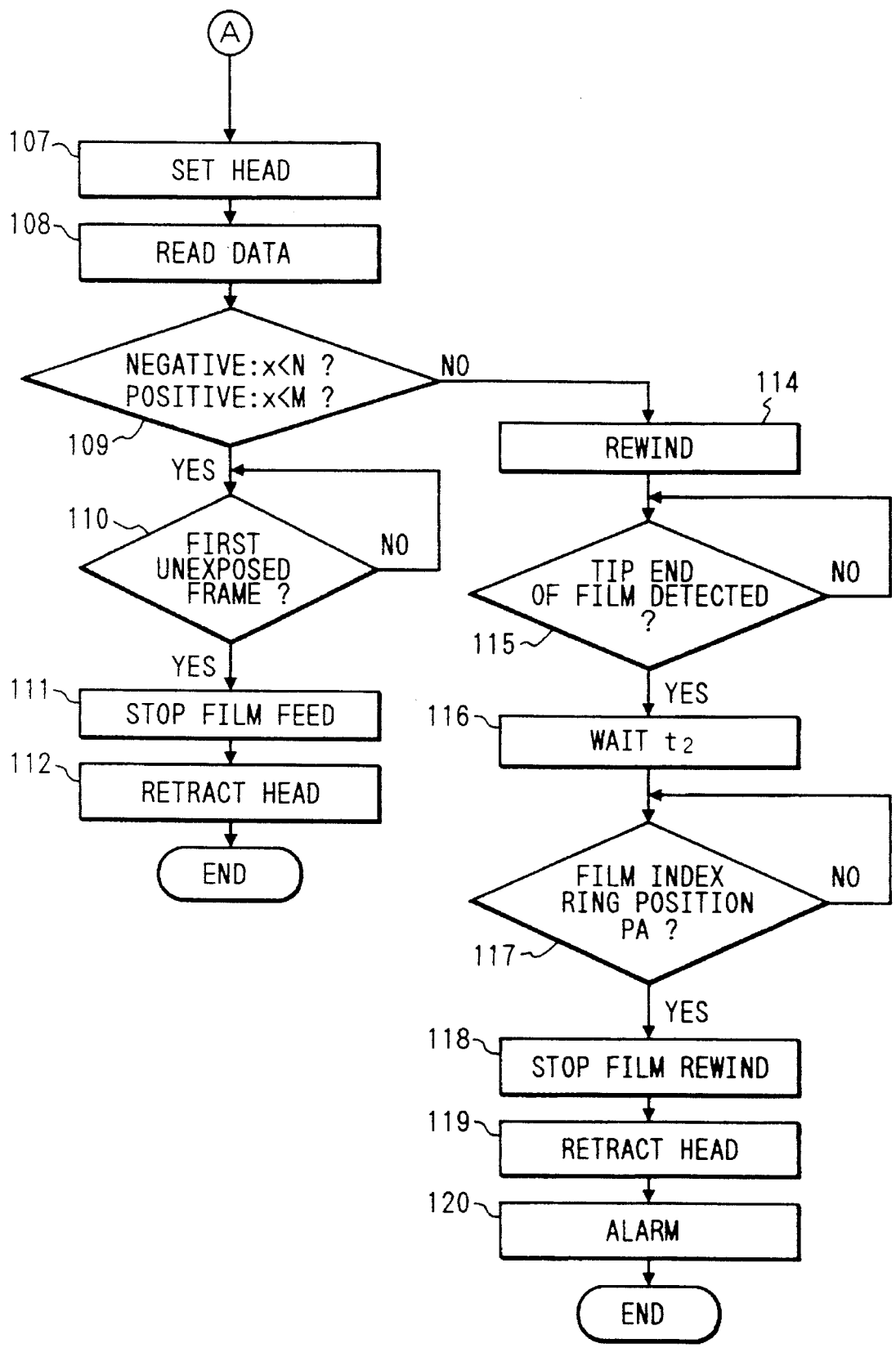

FIG. 25 is a flow chart which illustrates another embodiment. The difference from FIGS. 20 and 22 lies in a fact that the type of the film (a negative film or a positive film) is not read from data recorded on the film but is read from the DX code of the film cartridge. FIG. 24 is a block diagram which illustrates an electric circuit for use in the embodiment which uses the flow chart shown in FIG. 25. The difference from FIG. 1 lies in a fact that a DX code detection circuit 18 is added, the DX code detection circuit being arranged to read a DX code provided for the film cartridge in order to discriminate the type of the film (a negative film or a positive film). The DX code may be that provided for the conventional film cartridge, the DX code being a checkerwise pattern so as to be electrically detected. Another method may be employed in which pits and projections are formed in a portion of the film cartridge so as to be detected. FIG. 25 illustrates the operation to be performed from a moment at which the film cartridge is loaded to a moment at which the preparation for the photographing operation is completed. The difference from FIG. 20 lies in step 501 in which the DX code of the film cartridge is read so as to discriminate that the film is the negative film or the positive film.

Although the aforesaid embodiments are described for the prewinding type camera, a similar effect can, of course, be obtained in a case where the present invention is embodied in a normal winding type camera.

Figures 27A, 27B, 27C:
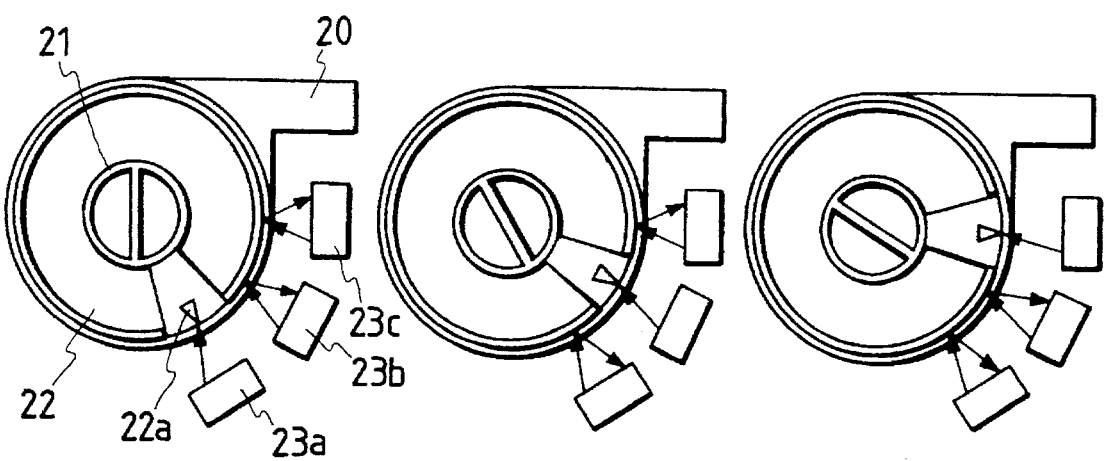
FIGS. 27A to 27C are top views which illustrate a film cartridge according to the embodiment shown in FIG. 26.

FIG. 26 is a block diagram which illustrates an electric circuit for use in another embodiment of the present invention. Referring to FIG. 26, the same elements as those according to the embodiment shown in FIG. 13 are given the same reference numerals. According to this embodiment, reference numeral 19 represents an intermediate rewinding inhibition circuit for inhibiting the intermediate rewinding operation even if the intermediate rewinding switch 17 is switched on. According to this embodiment, the cartridge shown in FIG. 27 is used. Since this cartridge is the same as that shown in FIG. 14, its description is omitted here.

Figure 28:
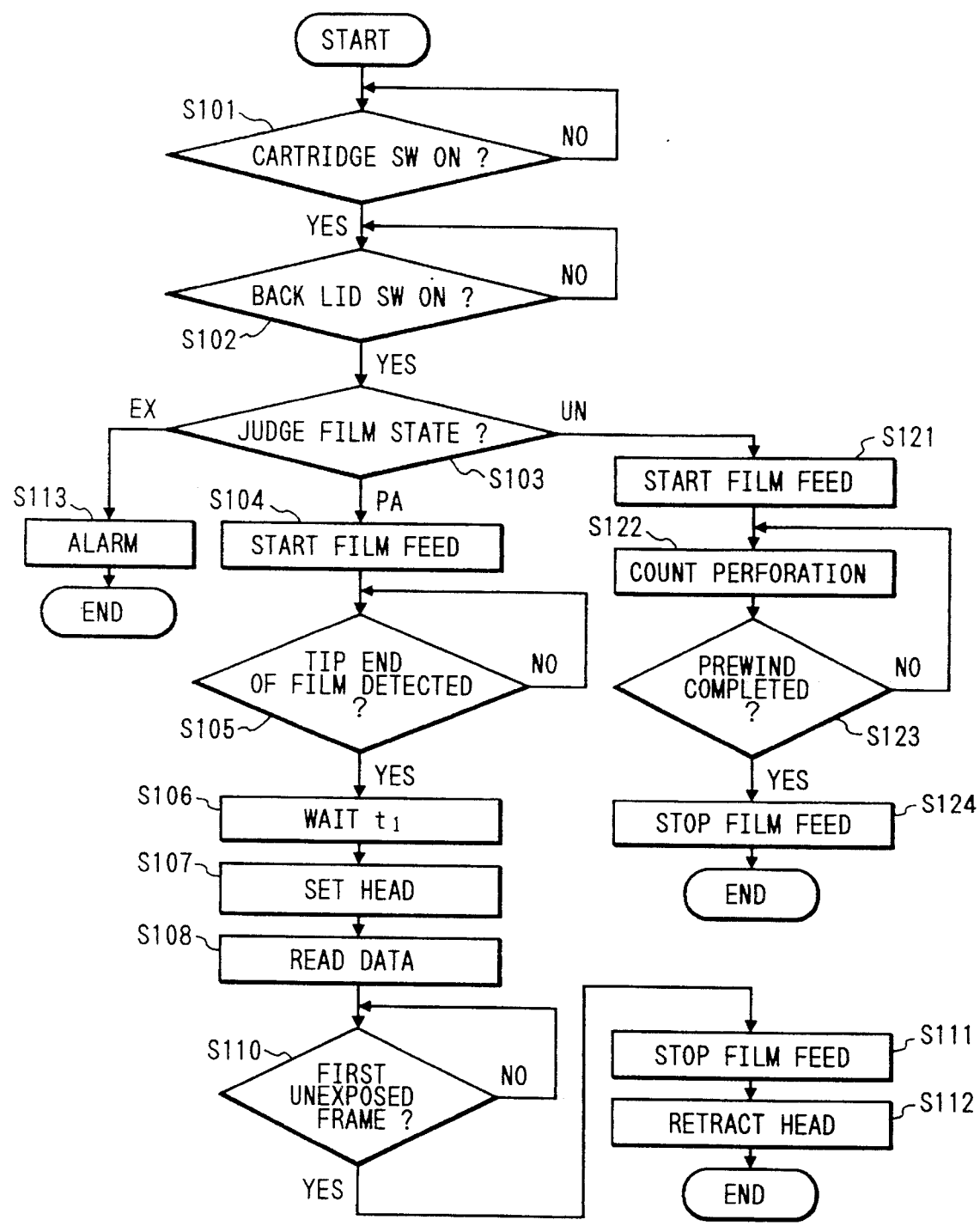
FIG. 28 is flow chart which illustrates a flow according to the embodiment shown in FIG. 26 from a moment at which a cartridge is loaded to a moment at which a preparation for a photographing operation is made.
Figure 29:
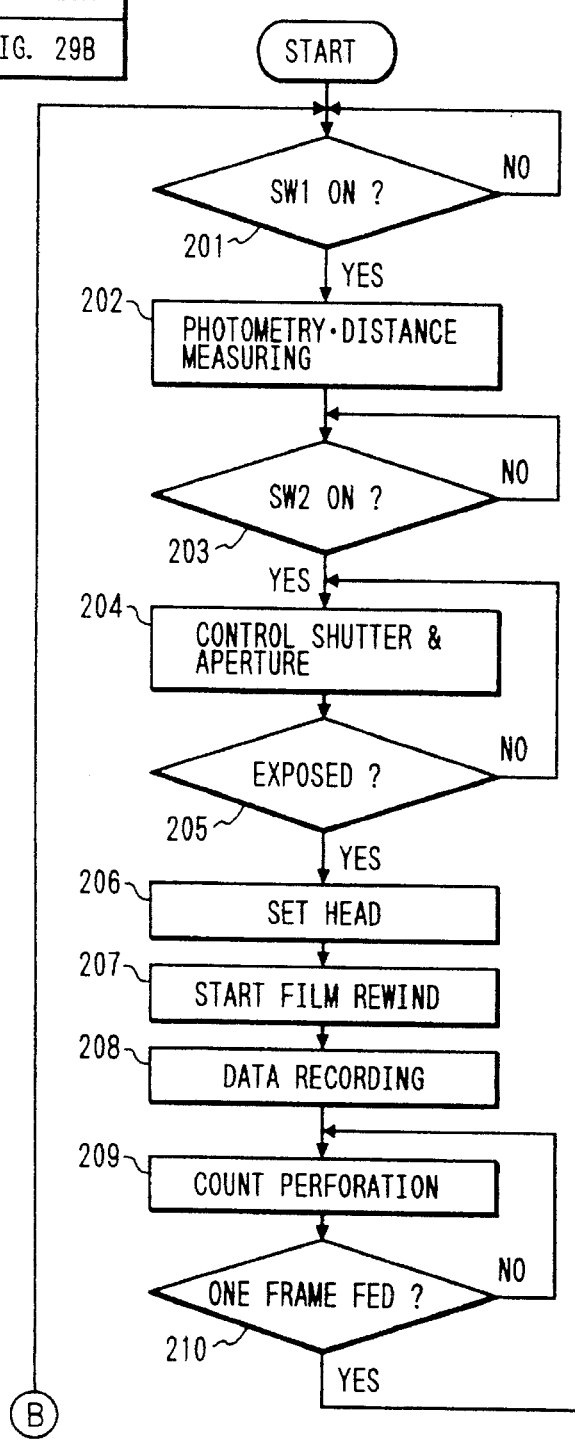
FIG. 29, 29A and 29B is a flow chart which illustrates a flow according to the embodiment shown in FIG. 26 from a moment at which the photographing operation is performed to a moment at which the film is rewound.
Figure 29A:
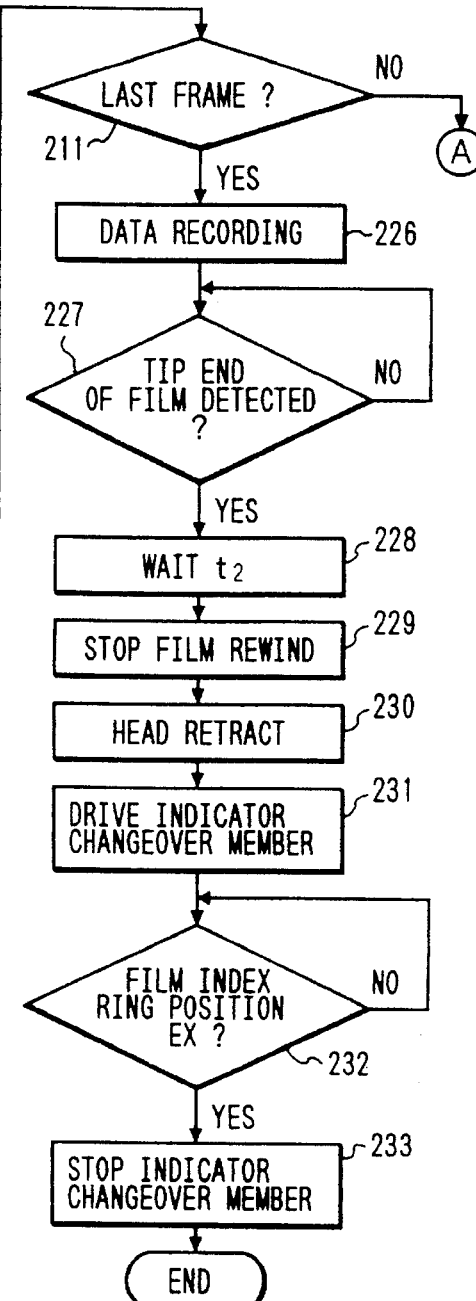
Figure 29B:
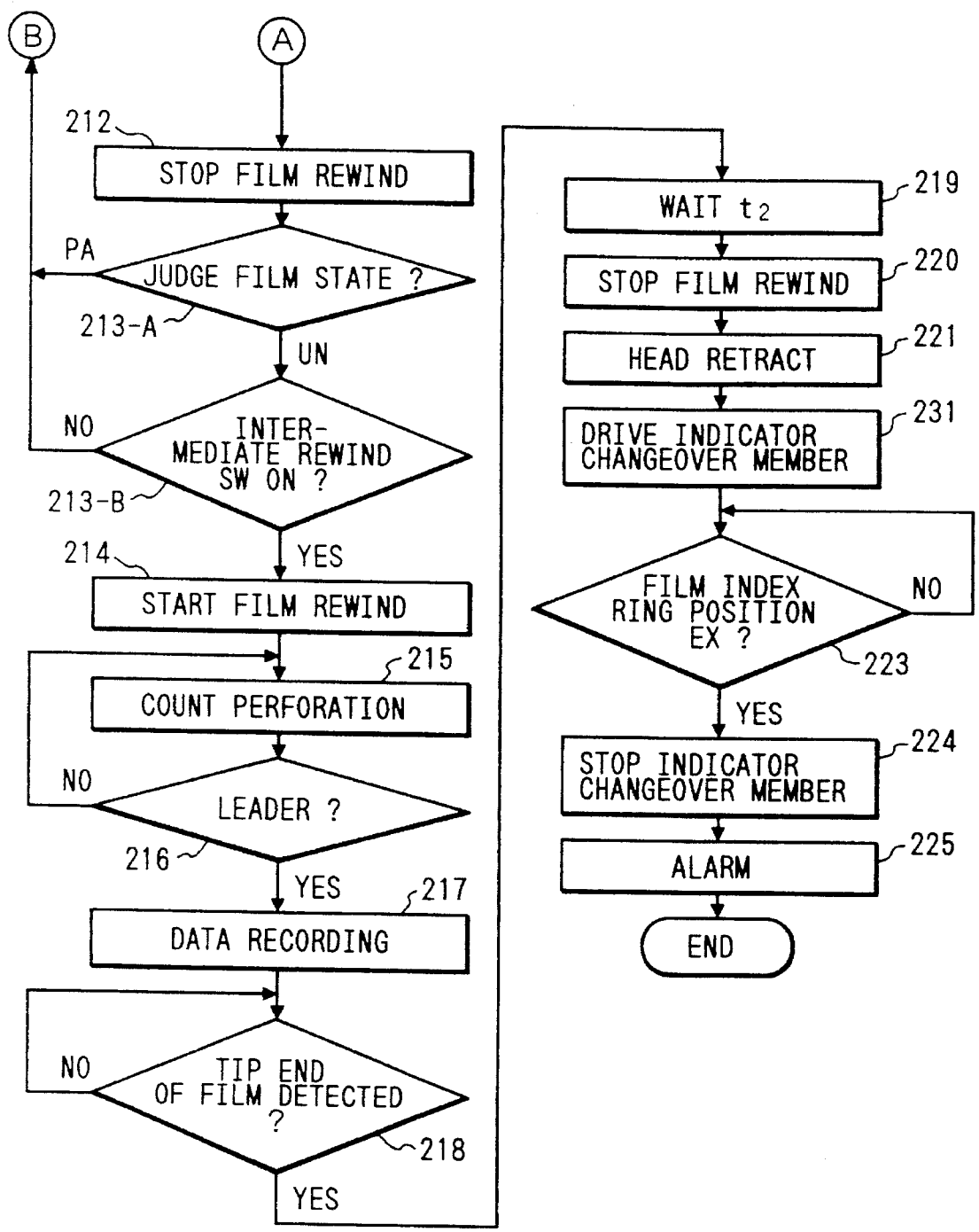

FIGS. 28 and 29 are flow charts which illustrate the operation of this embodiment. FIG. 28 illustrates the operation of the prewinding type camera to be performed from a moment at which the film cartridge is loaded to a moment at which the preparation for the photographing operation is completed. When the film cartridge is loaded into the cartridge chamber (omitted from illustration) of the camera, the cartridge switch 15 is switched on (S101). When the back lid (omitted from illustration) is then closed, the back lid switch 16 is switched on (S102). In S103, the condition of the film is discriminated by the aforesaid detection method. If a discrimination is made that the condition is EX, the indicator 12 issues a warning that the film cannot be used because all frames have been exposed (S113). If a discrimination is made in S103 that the condition of the film is UN, the film feeding motor (omitted from illustration) is rotated by the film feeding driver circuit 5 (S121) to start the prewinding operation. Then, the number of the perforations of the film is counted by the perforation detection circuit 10 to count a predetermined perforation (S122) and whether or not the prewinding operation has been completed is discriminated (S123). If the same has not been completed, the flow returns to step 122. If the same has been completed, the rotation of the film feeding motor is stopped by the film feeding driving circuit 5 (S124).

If a discrimination is made that the condition of the film is PA, the flow proceeds to step 104 in which the film feeding motor is rotated by the film feeding driver circuit 5 (S104) to start the prewinding operation. Then, the leading portion of the film is detected by the perforation detection circuit 10 (S105). If it has been detected, timer time $t_1$ is passed (S106), and then the magnetic head 2 is brought into contact with the surface of the film by the magnetic head retraction driver circuit 4 (S107). Then, data recorded to the reader portion of the film is read by the magnetic recording circuit 3 (S108). According to data about the unexposed frames among all of read data, whether or not the film has been fed to the leading portion of the unexposed frames is discriminated (S110). If an affirmative discrimination is made, the film feeding motor is stopped by the film feeding driver circuit 5 (S111). Then, the magnetic head retraction driver circuit 4 is actuated to retract the magnetic head 2 from the surface of the film 33 (S112). FIG. 29 illustrates the operation to be executed from a moment at which the photographing operation is performed to a moment at which the film is rewound. First, whether or not the photometry switch 13 has been switched on is examined (S201). If it has been switched on, the photometry circuit 6 and the distance measuring circuit 7 are actuated (S202). According to information obtained from the circuits 6 and 7, the photometry and the distance measurement are performed. Then, whether or not the exposure switch 14 has been switched on is examined (S203). If it has been switched on, the shutter control circuit 8 and the aperture control circuit 9 are actuated and the exposure operation is started (S204). Then, whether or not the exposure operation has been completed is examined (S205). If it has been completed, the head retraction driver circuit 4 is actuated to bring the magnetic head 2 into contact with the surface of the film 33 (S206). Whether or not the exposure operation has been completed is detected by, for example, a method which uses a signal denoting the completion of running of the rear curtain of the shutter. Then, the film feeding driver circuit 5 is actuated to start rewinding the film 33 (S207). Then, the magnetic recording circuit 3 is actuated to record data about the exposure condition and an arbitrary comment or the like on the film 33 (S208). Then, the number of the perforations is counted by the perforation detection circuit 10 (S209) so as to examine whether or not the perforations for one frame have been counted (S210). If one frame has been fed, whether or not the exposed frame is the last frame is examined (S211). If it is negated, the film feeding driver circuit 5 is actuated so as to stop rewinding the film (S212). In step 213-A, the flow proceeds to step S213-B or S201 according to the result of the discrimination made in S103. In S213-B, whether or not the intermediate rewinding switch 17 has been switched on is detected. If it is negated, the photographing operations in S201 to S213 are repeated. If the fact that the exposed frame is the last frame has been detected in S211, the flow proceeds to S226 in which data is recorded on the leader read portion of the film by the magnetic recording circuit 3 (S226). Then, whether or not the leading portion of the film has passed is examined by the perforation detection circuit (S227). If the fact that the leading portion has passed is detected, the timer time $t_2$ is passed (S228). Then, the film feeding driver circuit 5 is actuated to stop the rotation of the film feeding motor (S229). The timer time $t_2$ is a time required to perfectly wind up the film into the cartridge.

Then, the magnetic head 2 is retracted from the surface of the film 33 by the magnetic head retraction driver circuit 4 (S230). Then, the indication changeover means driver circuit 18 is actuated to drive the indication changeover means (S231). Then, the film exposure state detection circuit 11 is actuated to discriminate whether or not the indicator 22a of the index ring 22 of the film cartridge indicates the fact that all frames have been exposed (S232). If an affirmative discrimination is made, the indication changeover means is stopped (S233). If a fact that the intermediate rewinding switch has been switched on is detected in step 213-B, the film feeding motor is rotated by the film feeding driver circuit 5 and the operation of rewinding the film 33 is started (S214). Then, the number of the perforations is counted by the perforation detection circuit 10 (S215). Then, whether or not the reader portion of the film faces the magnetic head is discriminated (step 216). If an affirmative discrimination is made, data such as data about the exposed frames is recorded by the magnetic head (S217). Then, whether or not the leading portion of the film 33 has passed is detected by the perforation detection circuit 10 (S218). If passing has been detected, timer time $t_2$ is passed (S219). Then, the rotation of the film feeding motor is stopped by the film feeding driver circuit 5 and the rewinding operation is completed (S220). Then, the magnetic head 2 is retracted from the surface of the film 33 (S221). Then, the indication changeover means driver circuit 18 is actuated to drive the indication changeover means (S222). Then, the film exposure state detection circuit 11 is actuated to discriminate whether or not the indicator 22a of the index ring 22 of the film cartridge indicates the fact that all frames have been exposed (S223). If an affirmative discrimination is made, the indication changeover means is stopped (S224). Then, a fact that the film cannot be used is indicated by means of the indicator (S225).

Figures 30A, 30B, 30C:
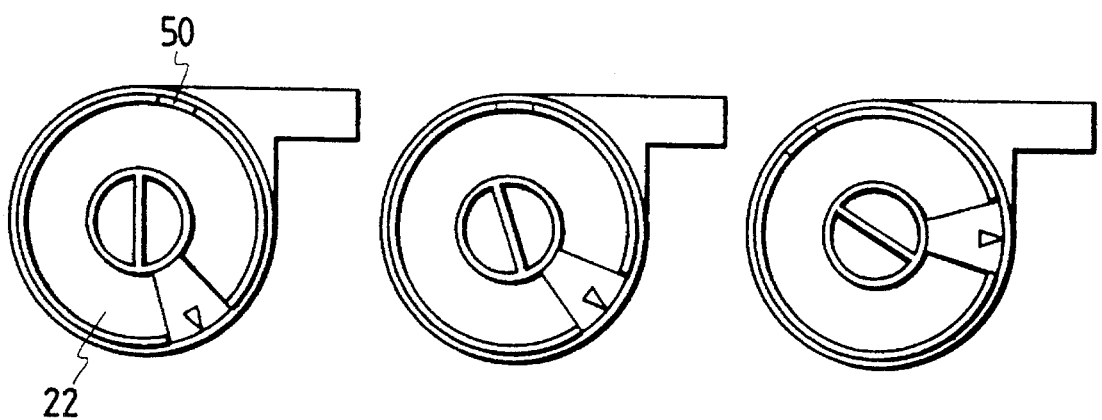
FIGS. 30A to 30C are top views which illustrate a film cartridge according to another embodiment of the present invention.
Figure 31:
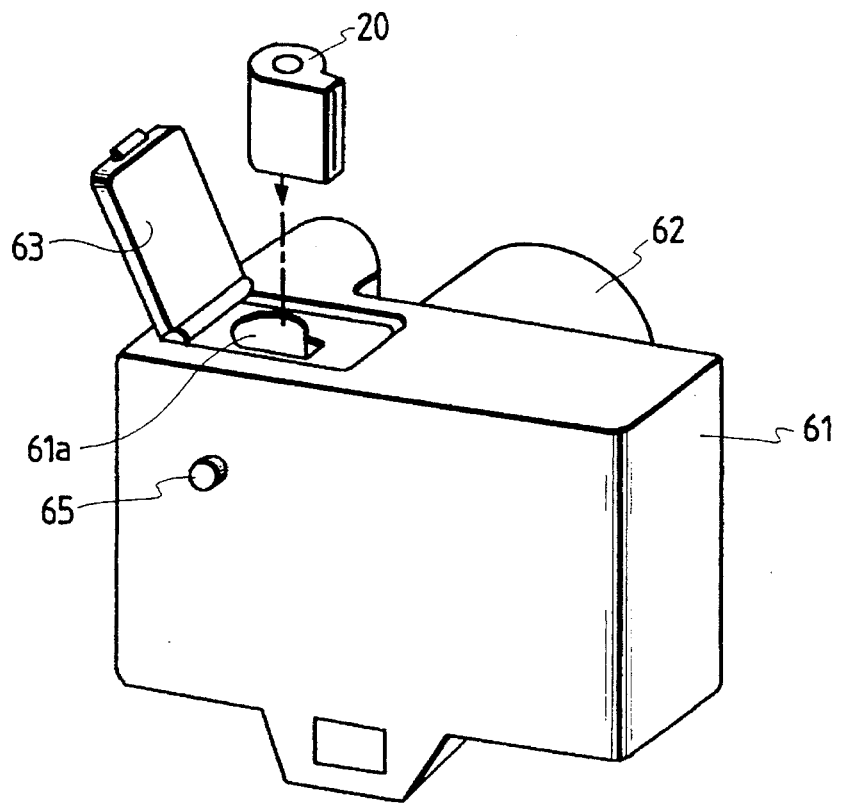
FIG. 31 is a perspective view which illustrates the camera according to the embodiment of the present invention shown in FIG. 30.

FIGS. 30 to 32 illustrate another embodiment of the present invention. FIG. 30 illustrates a film cartridge for used in this embodiment. The difference from FIG. 27 lies in that a cut portion 50 is added to the index ring 22.

FIGS. 30A, 30B and 30C illustrate the states similarly to FIG. 27, where FIG. 30A illustrates the UN state, FIG. 30B illustrates the PA state and FIG. 30C illustrates the EX state.

FIG. 31 is a perspective view which illustrates a camera according to the present invention. Referring to FIG. 31, reference numeral 61 represents a body of the camera, 62 represents a lens, 63 represents a cartridge lid for covering an opening formed in a cartridge accommodating chamber 61a and 65 represents an intermediate rewinding button for forcibly intermediately rewinding the film.

Figure 33:
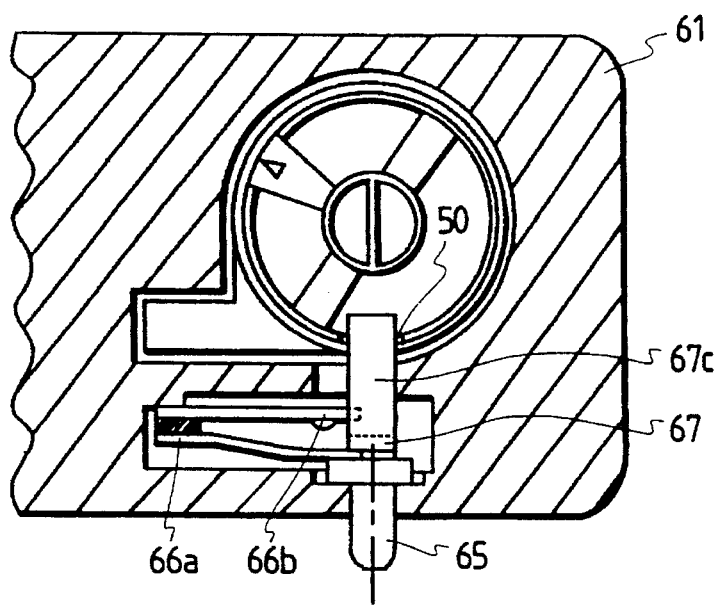
FIG. 33 is a lateral cross sectional view which illustrates the camera according to the embodiment of the present invention shown in FIG. 31.
Figure 32A:
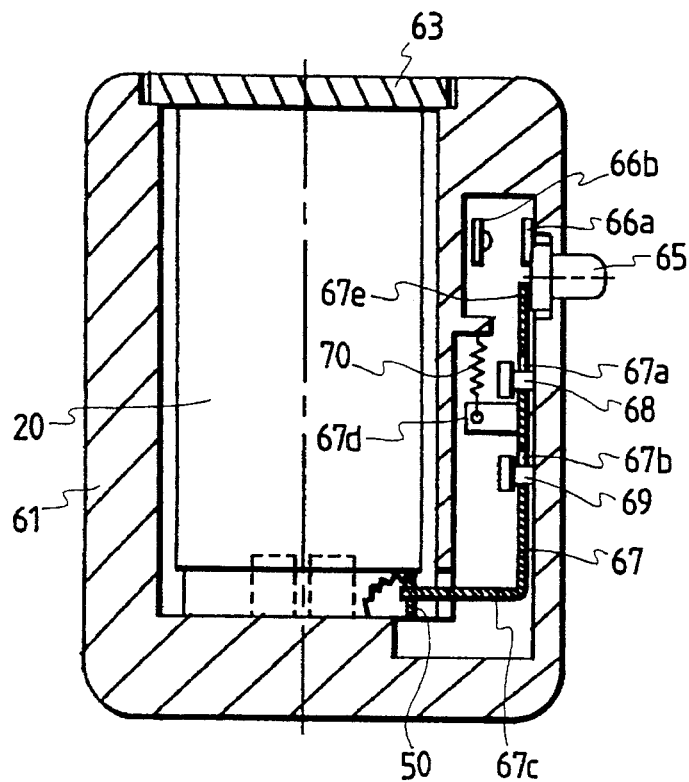
FIGS. 32A and 32B are vertical cross sectional views which illustrate the camera according to the embodiment of the present invention shown in FIG. 31.
Figure 32B:
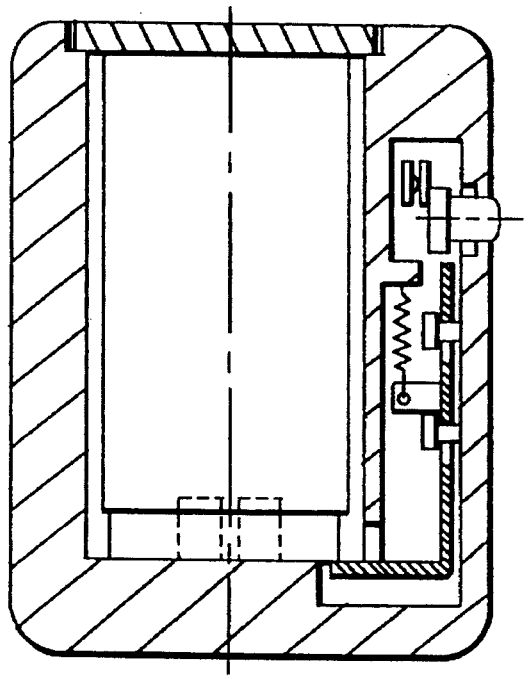

FIG. 32 is a vertical cross sectional view which illustrates the camera body 61, where FIG. 32A illustrates a state where the film cartridge including a film in a condition of PA is accommodated. FIG. 32B illustrates a state where the film cartridge including a film in a condition UN or EX is accommodated. Referring to FIG. 32, reference numerals 66a and 66b represent intermediate rewinding switches which are switched on when an intermediate rewinding button 65 is depressed. Reference numeral 67 represents a slide lever having elongated groove portions 67a and 67b, an engagement portion 67c, a spring fastening portion 67d and a leading portion 67e. The elongated groove portions 67a and 67b are engaged to guide pins 68 and 69 provided for the camera body so that the slide lever 67 is slidably guided in the vertical direction when viewed in the drawing. The slide lever 67 is upwards urged by a spring 70 fastened to the spring fastening portion 67d. The intermediate rewinding button 65 is urged by the intermediate rewinding switch 66a in a direction outwards from the camera body. FIG. 33 is a horizontal cross sectional view which illustrates the camera body 21.

In the structure thus arranged, when the film cartridge in the UN state as shown in FIG. 30A is loaded in the camera, the engagement portion 67c of the slide lever 67 comes in contact with the end surface of the index ring 22 of the film cartridge 20. As a result, it is moved downwards. Therefore, the leading portion 67e of the slide lever 67 is retracted to a position at which it does not come in contact when the intermediate rewinding button 65 is depressed. As a result, the intermediate rewinding switches 66a and 66b are switched on. As a result, the film can be immediately rewound. On the other hand, if the film cartridge in the PA state shown in FIG. 30B is loaded in the camera, the engagement portion 67c of the slide lever 67 is introduced into a cut portion 50 of the index ring 22 as shown in FIG. 32A. As a result, the leading portion 67e is positioned to inhibit the depressing of the intermediate rewinding button. Therefore, the intermediate rewinding switches 66a and 66b cannot be switched on and therefore the film cannot be intermediately rewound.

Therefore, if the film cartridge indicated as "only partial frames have been exposed" is again loaded in the camera, the frames from the intermediate frame to the last frame must be subjected to the exposure. As a result, the indication of the film cartridge becomes "all frames have been exposed" after the film has been rewound. Therefore, this film cannot be used again.

FIG. 34 is a block diagram which illustrates another embodiment of the present invention. Referring to FIG. 34, the same elements as those according to the embodiment shown in FIG. 1 are given the same reference numerals.

Referring to FIG. 34, reference numeral 18 represents an input means for inputting an arbitrary intermediate rewind number, 19 represents a memory for memorizing the intermediate rewind number inputted by the input means 18 and 1000 represents a main switch of the camera. According to this embodiment, the structure of the cartridge is the same as that shown in FIGS. 3 to 5.

Figure 35B:
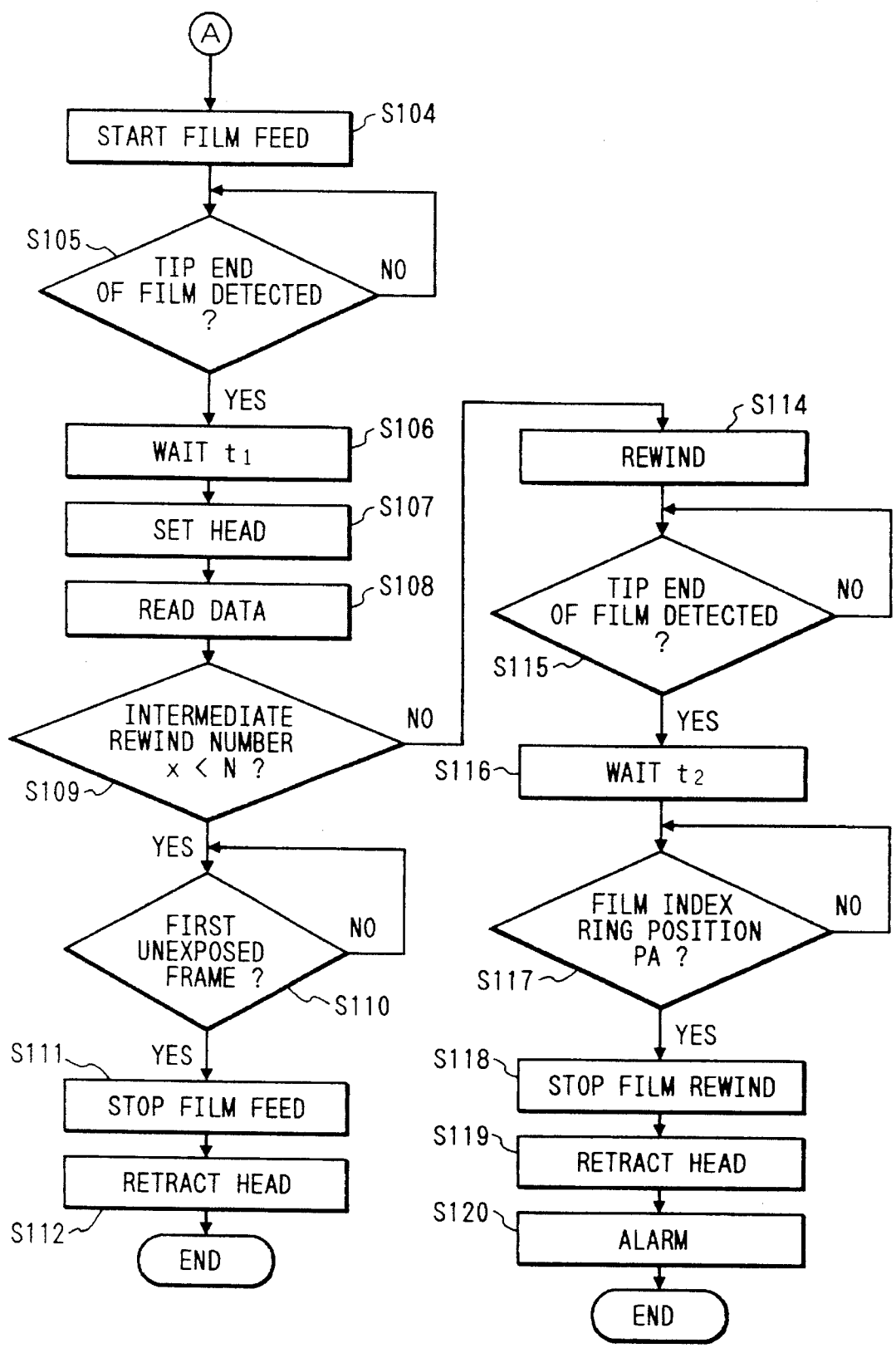
Figures 36, 36A, 36B:
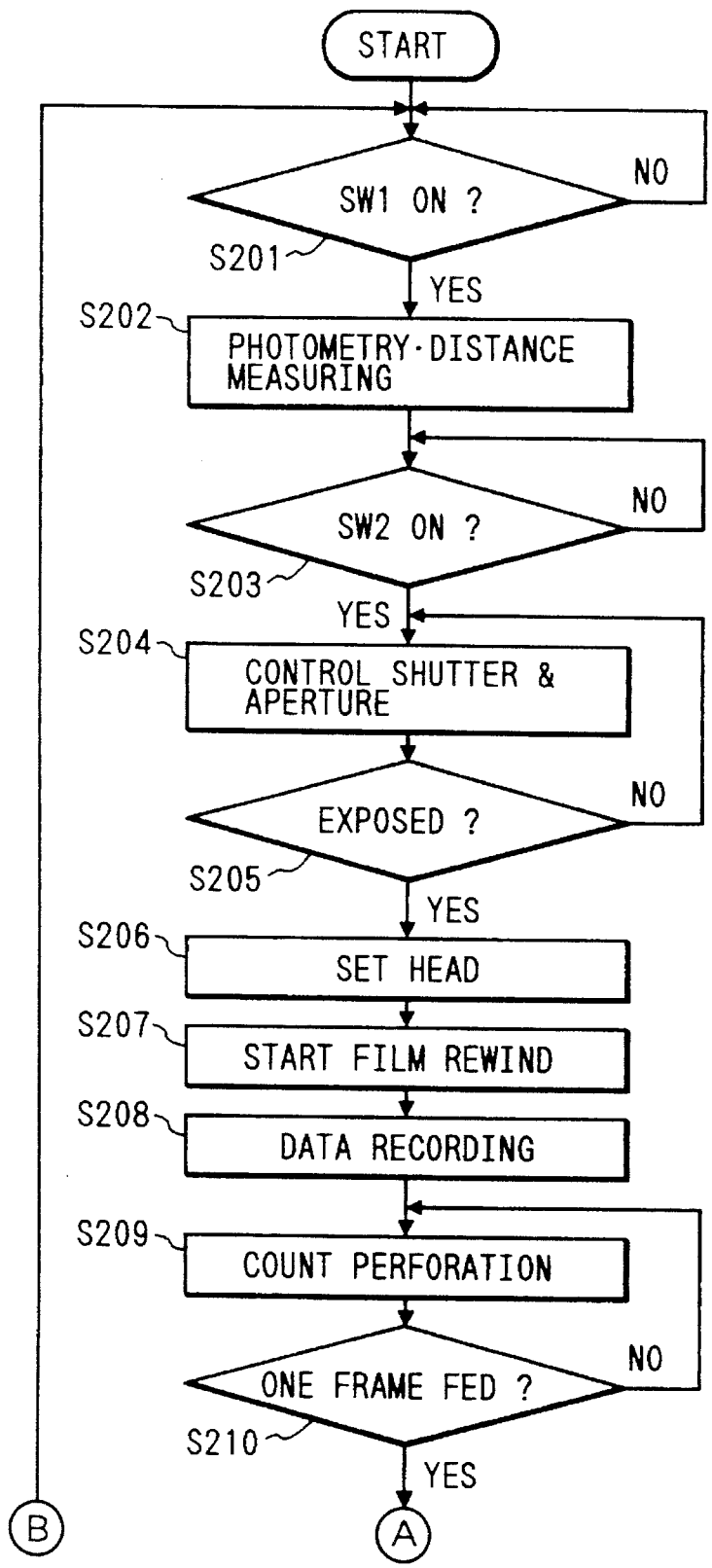
FIG. 36, 36A and 36B is a flow chart which illustrates a flow, realized by the pre-winding method according to the embodiment shown in FIG. 34, from a moment at which the photographing operation is performed to a moment at which the film is rewound.
Figure 36B:
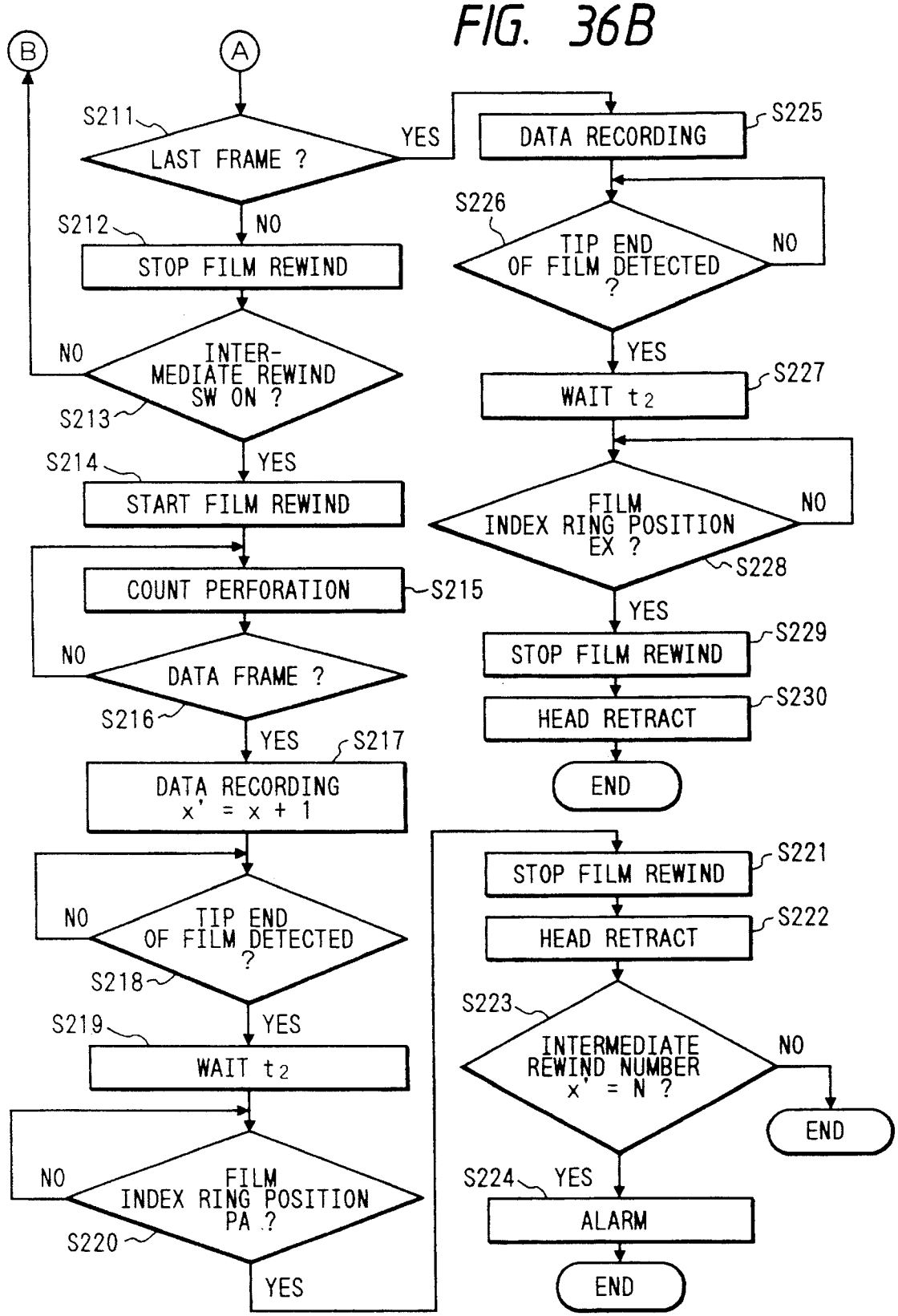

FIGS. 35 and 36 are flow charts which illustrate the operation of this embodiment. FIG. 35 illustrates the operation of the prewinding type camera to be performed from a moment at which the film cartridge is loaded to a moment at which the preparation for the photographing operation is completed. First, whether or not the main switch 1000 has been switched on is discriminated (S97). If it has been switched on, the flow proceeds to S98. In S98, whether or not the intermediate rewind number has been inputted by the intermediate rewind number input means 18 is discriminated. If it has been inputted, the memory 19 memorizes the inputted intermediate rewind number N (S100). In it has not been inputted, the indicator 12 indicates this (S99).

When the film cartridge 30 is then loaded into the cartridge chamber 43 of the camera, the cartridge switch 15 is switched on (S101). When the back lid is then closed, the back lid switch 16 is switched on (S102) and the condition of the film is discriminated by the aforesaid detection method (S103). If a discrimination is made that the condition is EX, the indicator 12 issues a warning that the film cannot be used (S113). If a discrimination is made that the condition of the film is UN, the film feeding motor is rotated by the film feeding driver circuit 5 to start the prewinding operation (S121). Then, the flow proceeds to S122 in which the number of the perforations of the film is counted by the perforation detection circuit 10 to count a predetermined perforation (S123) and whether or not the prewinding operation has been completed is discriminated. If the same has not been completed, the flow returns to step 121. If the same has been completed, the flow proceeds to S124 in which the rotation of the film feeding motor is stopped by the film feeding driving circuit 5. If a discrimination is made in S103 that the condition of the film is PA, the film feeding motor is rotated by the film feeding driver circuit 5 to start the prewinding operation (S104). Then, in step S105, the leading portion of the film is detected by the perforation detection circuit. If it has been detected, timer time t₁ is passed in S106, and then the magnetic head 2 is brought into contact with the surface of the film by the magnetic head retraction driver circuit 4 in S107. Then, data recorded on the magnetic recording region 40 of the film 33 is read by the magnetic recording circuit in S108. In S109, whether or not the intermediate rewind number x is smaller than the intermediate rewind number N memorized in the memory 19 is discriminated. If an affirmative discrimination is made (if it is smaller than N), the flow proceeds to S110 in which whether or not the film has been fed to its leading frame of the unexposed frames is discriminated according to data about the unexposed frame among data read in S108. If the film has been fed as described above, the flow proceeds to S111 in which the film feeding motor is stopped by the film feeding driver circuit 5. In S112, the magnetic head retraction driver circuit 4 is actuated to retract the magnetic head 2 from the surface of the film 33. If a discrimination is made in S109 that the intermediate rewind number x is larger than the predetermined number N, the flow proceeds to S114 in which the film feeding driver circuit 5 is actuated to reversely rotate the film feeding motor. As a result, an operation of rewinding the film 33 is started. In next step S115, the leading portion of the film 33 is detected by the perforation detection circuit 10. If it has been detected, timer time t₂ is passed in S116. In S117, the film exposure state detection circuit 11 is actuated to detect the position of the indicator 31a of the indication ring of the film 33. If PA is indicated, the flow proceeds to S118 in which the rotation of the film feeding motor is stopped by the film feeding driver circuit 5. Thus, the rewinding operation is completed. The timer time t₂ is a time required to completely wind up the film 33 into the cartridge. In next step S119, the magnetic head 2 is retracted from the surface of the film 33. In S120, the indicator 12 warns that the film cannot be used.

FIG. 36 illustrates the operation to be executed from a moment at which the photographing operation is performed to a moment at which the film is rewound. First, whether or not the photomerry switch 13 has been switched on is examined (S201). If it has been switched on, the photometry circuit 6 and the distance measuring circuit 7 are actuated (S202). According to information obtained from the circuits 6 and 7, the photometry and the distance measurement are performed. Then, whether or not the exposure switch 14 has been switched on is examined (S203). If it has been switched on, the flow proceeds to S204 in which the shutter control circuit 8 and the aperture control circuit 9 are actuated and the exposure operation is started. Then, whether or not the exposure operation has been completed is examined (S205). If it has been completed, the head retraction driver circuit 4 is actuated to bring the magnetic head 2 into contact with the surface of the film 33 (S206). Whether or not the exposure operation has been completed is detected by, for example, a method which uses a signal denoting the completion of running of the rear curtain of the shutter.

Then, the film feeding driver circuit 5 is actuated to start rewinding the film 33 in S207. Then, the magnetic recording circuit 3 is actuated to record data about the exposure condition and an arbitrary comment or the like to the film 33 (S208). Then, the number of the perforations is counted by the perforation detection circuit 10 (S209) so as to examine whether or not the perforations for one frame have been counted (S210). If one frame has been fed, whether or not the exposed frame is the last frame is examined (S211). If it is negated, the film feeding driver circuit 5 is actuated so as to stop rewinding the film (S212). Then, whether or not the intermediate rewinding switch 17 has been switched on is detected (S213). If it is negated, the flow returns to S201 in which the photographing operations in S201 to S213 are repeated. If the fact that the exposed frame is the last frame has been detected, data is recorded on the magnetic recording region 40 of the data frame 36 shown in FIG. 4 by the magnetic recording circuit 3 (S225). Then, whether or not the leading portion of the film has passed is examined by the perforation detection circuit (S226). If the fact that the leading portion has passed is detected, the timer time $t_2$ is passed in S227. In S228, the film exposure state detection circuit 11 is actuated to detect the position of the indicator 31a of the index ring of the film (S228). If EX is indicated, the film feeding motor is stopped by the film feeding driver circuit 5 (S229). Thus, the film rewinding operation is completed. Then, the magnetic head 2 is retracted from the surface of the film (S230). If a fact that the intermediate rewinding switch has been switched on is detected in step 213, the film feeding motor is rotated by the film feeding driver circuit 5 and the operation of rewinding the film 33 is started (S214). Then, the number of the perforations is counted by the perforation detection circuit 10 (S215). Then, whether or not the data frame 36 is in front of the aperture 47 is discriminated (step 216). If an affirmative discrimination is made, intermediate rewind number x'=x+1 is recorded to the magnetic recording region 40 of the data frame 36 (S217). Then, whether or not the leading portion of the film 33 has passed is detected by the perforation detection circuit 10 (S218). If passing has been detected, timer time $t_2$ is passed in S219. Then, the position of the indicator 31a of the index ring of the film is detected by the film exposure state detection circuit 11 (S220). If PA is indicated, the rotation of the film feeding motor is stopped by the film feeding driver circuit 5 and the rewinding operation is completed (S221). Then, the magnetic head 2 is retracted from the surface of the film 33 (S222). Then, whether or not the intermediate rewind number x' recorded in S217 is the same as the inputted intermediate rewind number N is discriminated (S223). If it is negated, the operation is completed. If the intermediated rewind number x' is the same as the inputted intermediate rewind number N, a fact that the film cannot be used is alarmed by means of the indicator (S224).

Figure 37:
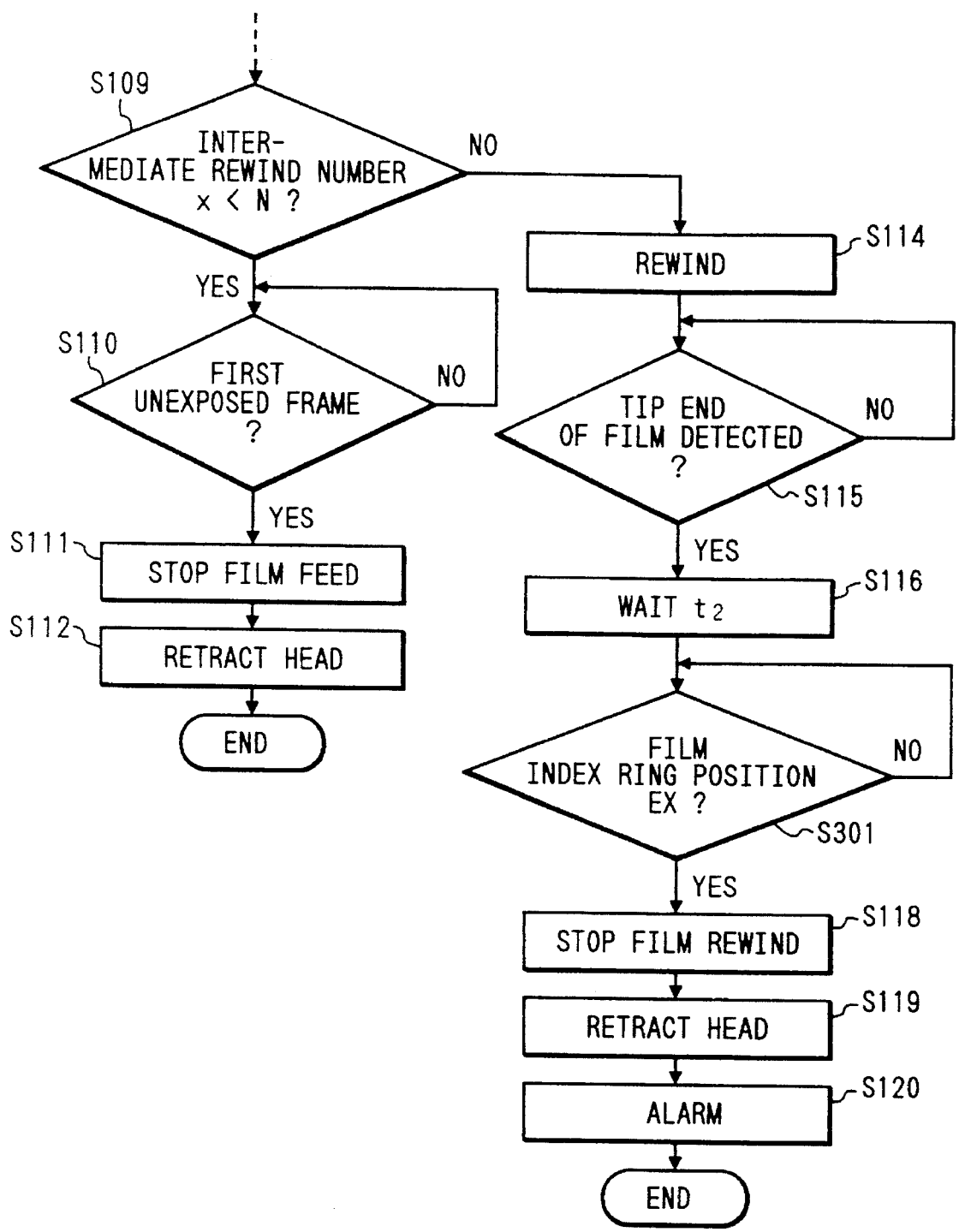
FIG. 37 is flow chart which illustrates a flow according to another embodiment of the present invention from a moment at which a cartridge is loaded to a moment at which a preparation for a photographing operation is made.
Figure 38:
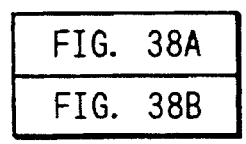
FIG. 38, 38A and 38B is a flow chart which illustrates a flow according to the embodiment shown in FIG. 37 from a moment at which the photographing operation is performed to a moment at which the film is rewound.
Figure 38A:
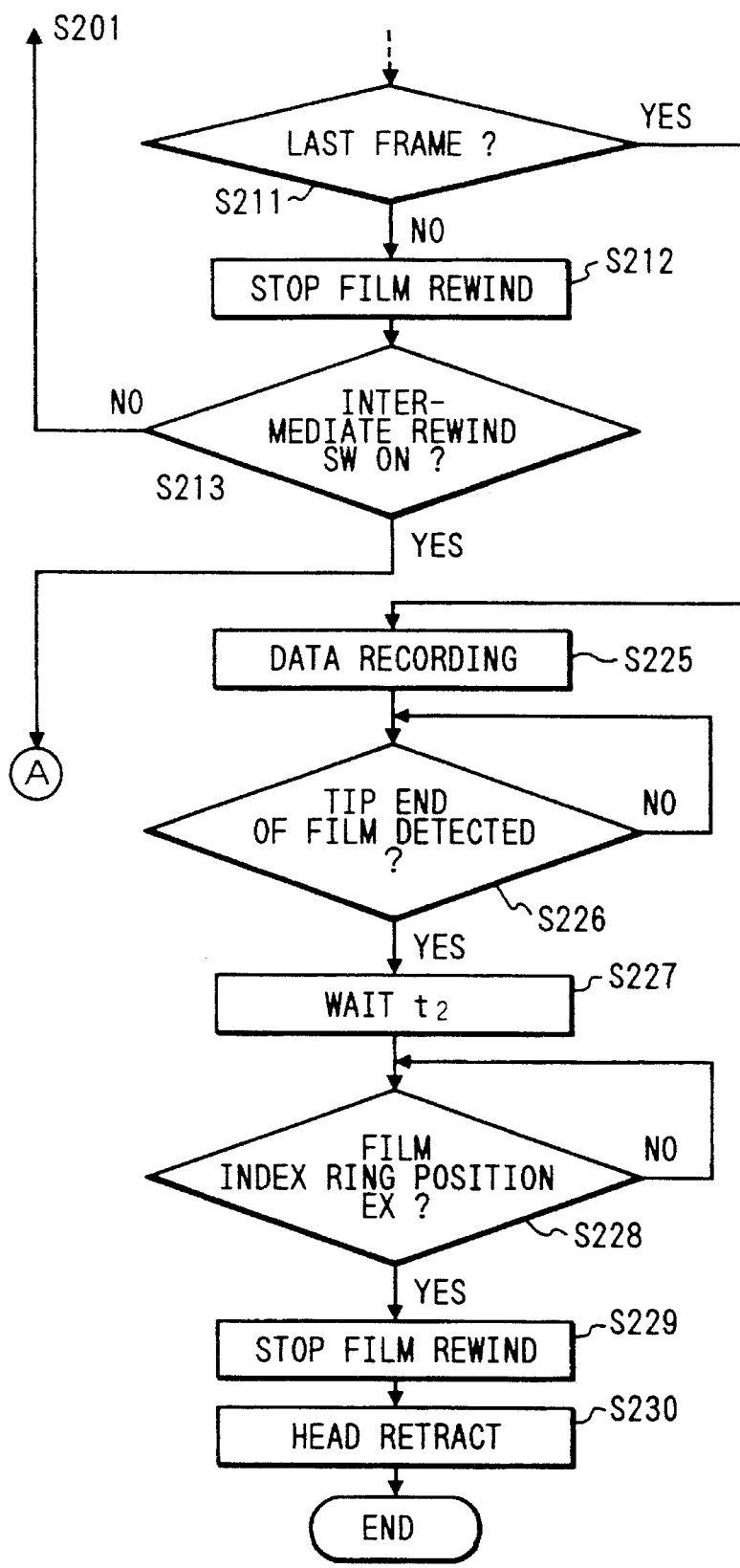
Figure 38B:
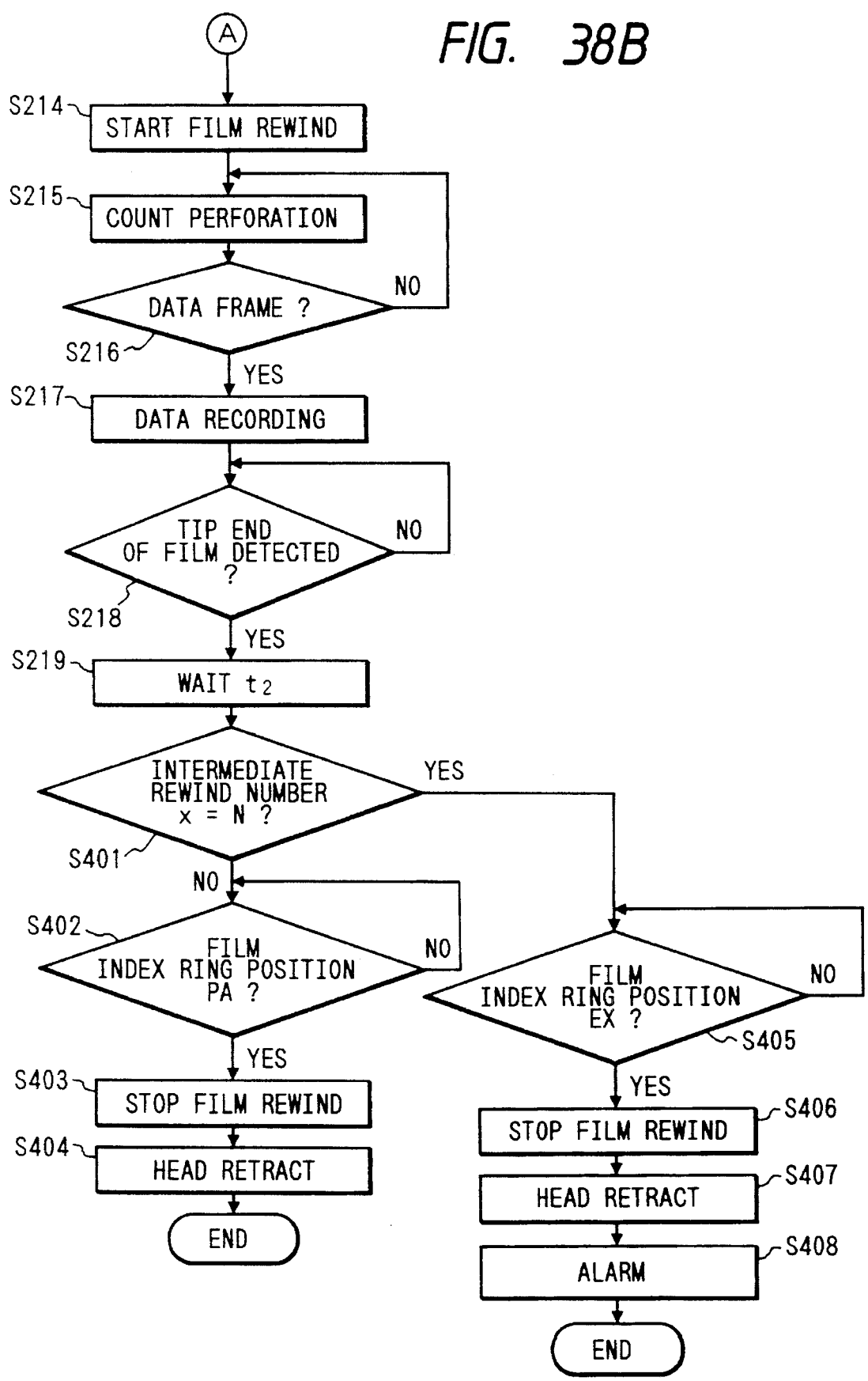

FIGS. 37 and 38 are flow charts which illustrate another operation of this embodiment. FIG. 37 illustrates the operation to be performed from a moment at which the film cartridge is loaded to a moment at which the preparation for the photographing operation is completed. The difference from FIG. 35 lies in S301 in which a fact that the indicator 31a of the index ring indicates EX is detected. Then, rewinding of the film is stopped (S118).

FIG. 38 illustrates the operation to be performed from a moment at which the photographing operation is performed to a moment at which the film is rewound. The same operations as those shown in FIG. 36 are given the same step numbers. In S401, whether or not the recorded intermediate rewind number x' is the same as the intermediate rewind number N inputted by an operator is discriminated. If it is negated, whether or not the indicator 31a of the index ring of the film cartridge indicates PA is discriminated (S402). If PA is indicated, the film rewinding operation is stopped (S403), and the magnetic head 2 is retracted (S404). If the recorded intermediate rewind number x' is the same as the inputted intermediate rewind number N, whether or not the indicator 31a of the index ring indicates EX is examined (S405). If the indicator 31a of the index ring indicates X, the film rewinding operation is stopped (S406). Then, the magnetic head 2 is retracted from the surface of the film (S407). Furthermore, the indicator 12 indicates that the film cannot be used again (S408).

The difference between the embodiment shown in FIG. 37 and 38 and that shown in FIG. 35 and 36 lies in that, when the intermediate rewind number reaches the intermediate rewind number N which has been previously inputted by an operator, the indication "all frames have been exposed" is indicated by the condition indicating means of the film cartridge.

Figure 39:
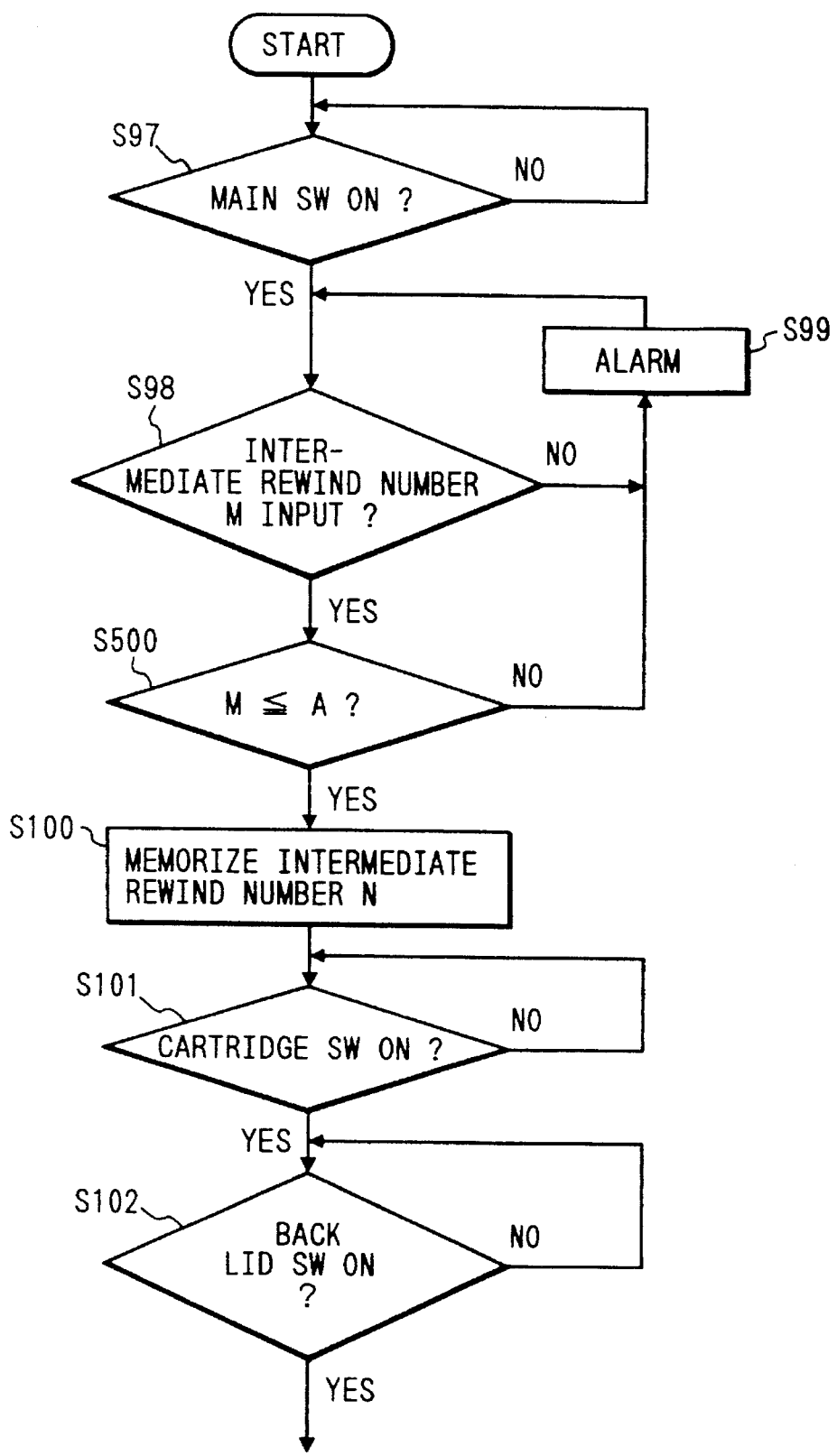
FIG. 39 is a flow chart which illustrates an operation performed in a case, according to another embodiment of the present invention, where an input of the number of the intermediate rewind operations is limited.
Figure 40B:
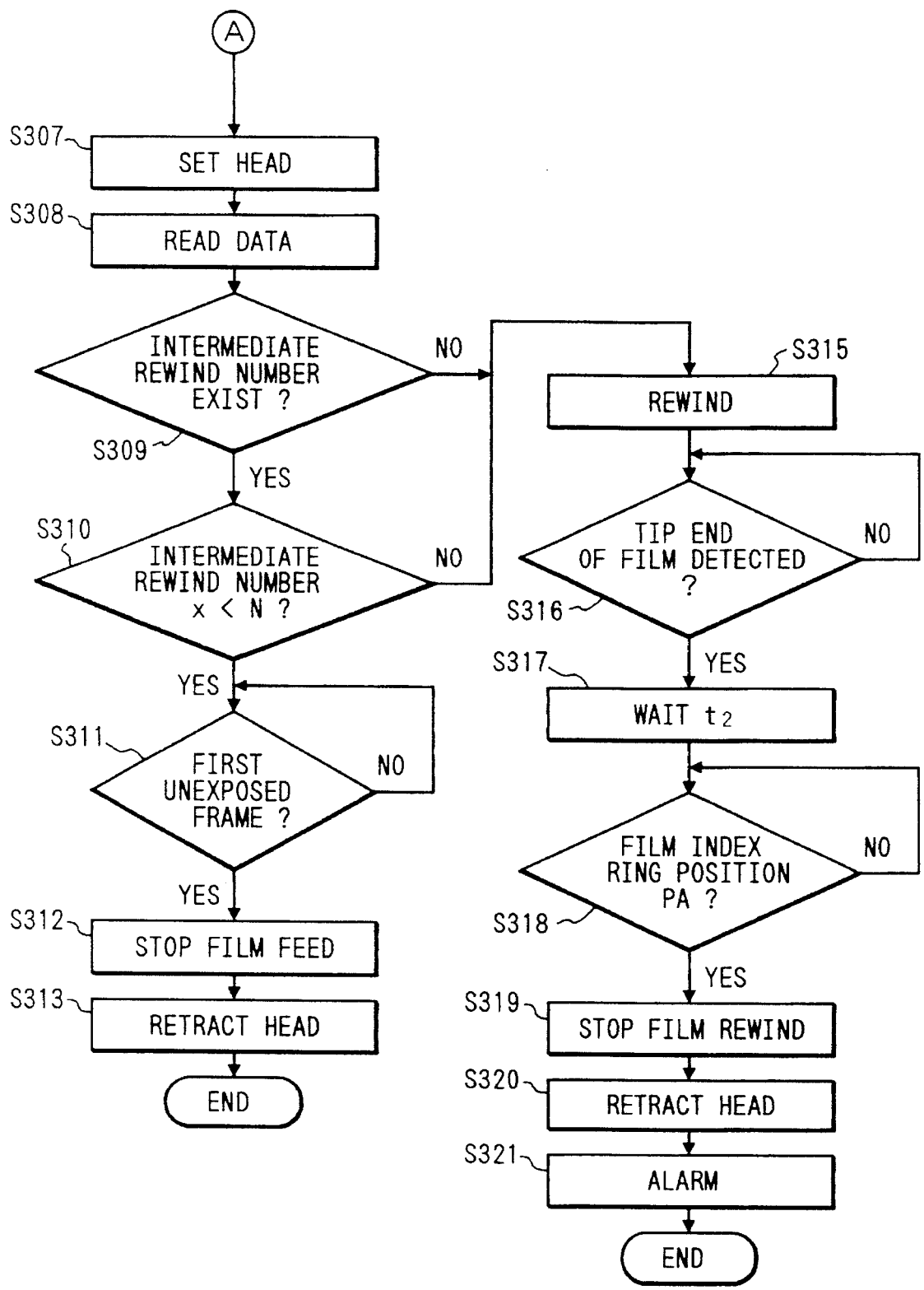

FIG. 39 is a flow chart which illustrates another embodiment of the present invention. The same functions as those shown in FIG. 35 are given the same step numbers and their descriptions are omitted here. The difference from FIG. 35 lies in that the intermediate rewind number M which can be inputted in S500 is limited to A or less. Thanks to this limit, a risk generated in that the flaw of the surface of the film becomes critical due to an erroneous input of the intermediate rewind number can be prevented. FIG. 40 is a flow chart which illustrates the operation of another embodiment of the present invention, in which the operation of the prewinding type camera from a moment at which the film cartridge is loaded to a moment at which the preparation for the photographing operation is completed. When the film cartridge 30 is loaded into the cartridge chamber 43, the cartridge switch 15 is switched on (S301). Then, the back lid is closed, the back lid switch 16 is switched on (S302), and the flow proceeds to S303. By the aforementioned detection method, the film exposure state is discriminated (S303). If the film exposure state is EX, the flow proceeds to S314 in which the indicator 12 indicates that the film cannot be used. If a discrimination is made that the film condition is UN, the flow proceeds to S322 in which the film feeding motor is driven by the film feeding driver circuit 5 to start the prewinding operation (S322). Then, the perforations of the film are counted by the perforation detection circuit 10 (S323). In S324, whether or not the predetermined perforations have been counted and the rewinding operation has been completed is discriminated. If it has not been completed, the flow returns to step 323. If the same has been completed, the flow proceeds to S325 in which the rotation of the film feeding motor is stopped by the film feeding driving circuit 5. If a discrimination is made in S303 that the condition of the film is PA, the film feeding motor is rotated by the film feeding driver circuit 5 to start the prewinding operation (S304). Then, in step S305, the leading portion of the film is detected by the perforation detection circuit. If it has been detected, timer time $t_1$ is passed (S306), and then the magnetic head 2 is brought into contact with the surface of the film by the magnetic head retraction driver circuit 4 in S307. Then, data recorded to the magnetic recording region 40 of the film 33 is read by the magnetic recording circuit in S308. Then, whether or not data about the intermediate rewind number is included in read data is discriminated (S309). If no data about the rewind number is present, the flow proceeds to S315. If it is present, the flow proceeds to S310 in which whether or not intermediate rewind number X is smaller than the predetermined number N is discriminated (S310). If a discrimination is made that x<N, the flow proceeds to S311 in which whether or not the film has been fed to its leading frame of the unexposed frames is discriminated according to data about the unexposed frame among data read in S308. If the film has been fed as described above, the film feeding motor is stopped by the film feeding driver circuit 5 (S312). If a discrimination is made in S310 that the intermediate rewind number x is larger than the predetermined number N, the flow proceeds to S315 in which the film feeding driver circuit 5 is actuated to reversely rotate the film feeding motor. In next S316, the leading portion of the film 33 is detected by the perforation detection circuit 10. If it has been detected, timer time $t_2$ is passed in S317. In S318, the position of the indicator 31a of the index ring of the film is detected by the film exposure state detection circuit 11. If PA is indicated, the flow proceeds to S319 in which the rotation of the film feeding motor is stopped by the film feeding driver circuit 5. Thus, the rewinding operation is completed. The timer time $t_2$ is a time required to completely wind up the film 33 into the cartridge. Then, the magnetic head 2 is retracted from the surface of the film 33 (S320). Then, the indicator 12 warns that the film cannot be used (S321).

Figure 41:
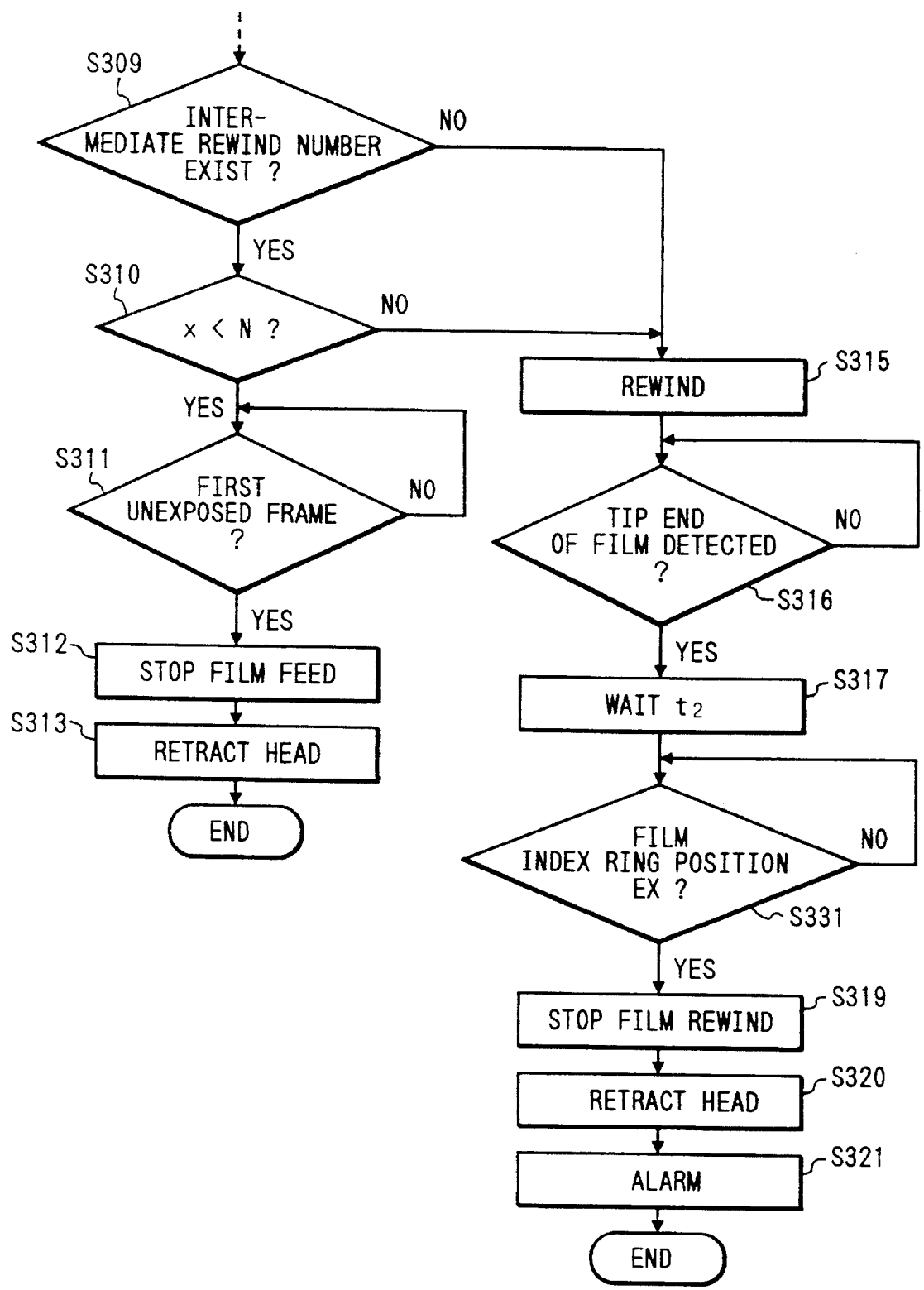
FIG. 41 is flow chart which illustrates a flow according to another embodiment of the present invention from a moment at which a cartridge is loaded to a moment at which a preparation for a photographing operation is made.

FIG. 41 is a flow chart which illustrates the operation to be executed in a case where, if the intermediate rewind number cannot be read, the indication of the cartridge is made to be "exposed".

FIG. 41 illustrates the operation to be executed from a moment at which the film cartridge is loaded to a moment at which the preparation for the photographing operation is completed. The same operations as those shown in FIG. 40 are given the same step numbers. The difference from FIG. 40 lies in S331 in which a fact that the indicator 31a of the index ring indicates EX is detected to stop rewinding the film (S319).

Figure 42B:
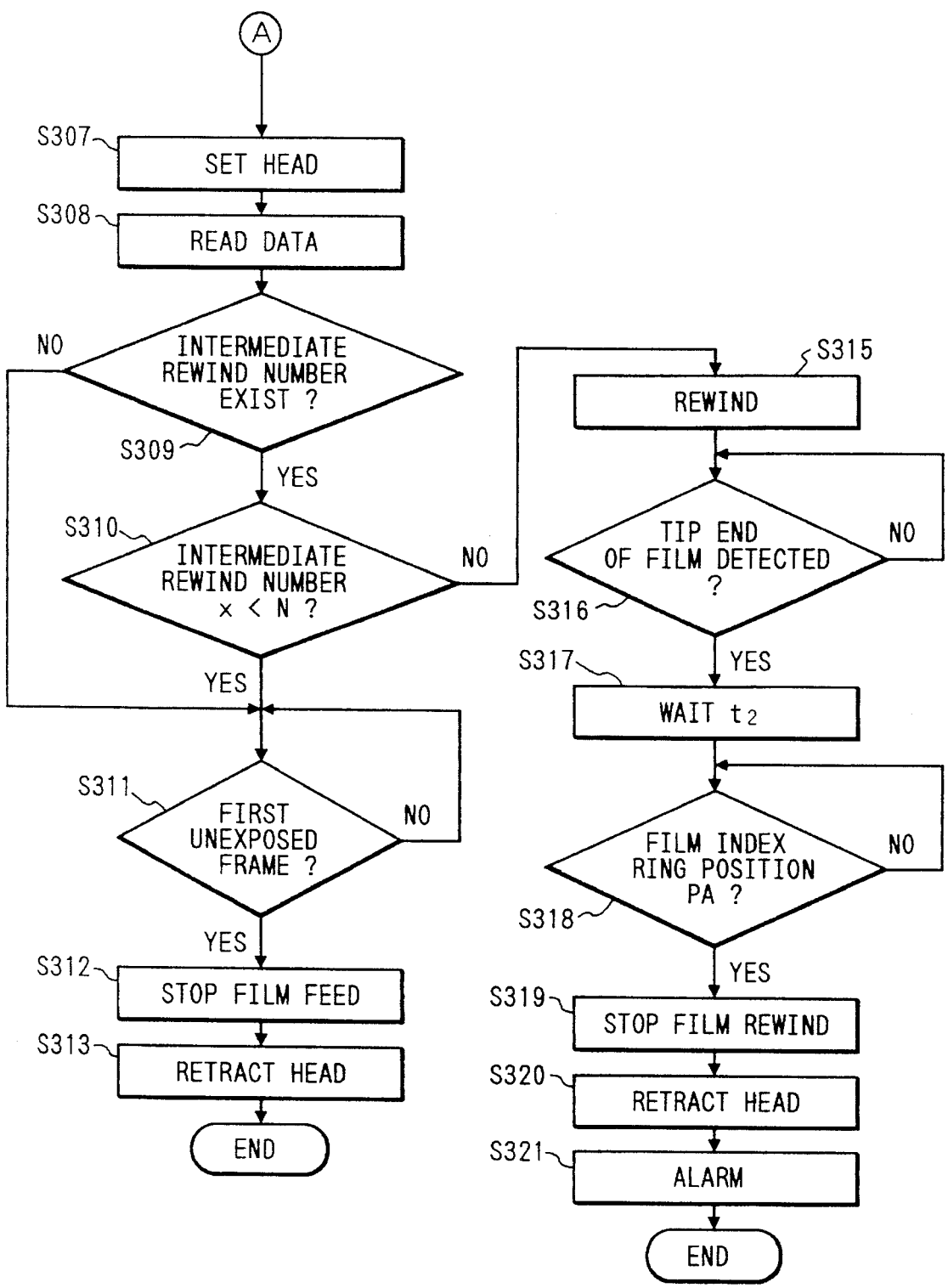
Figure 43B:
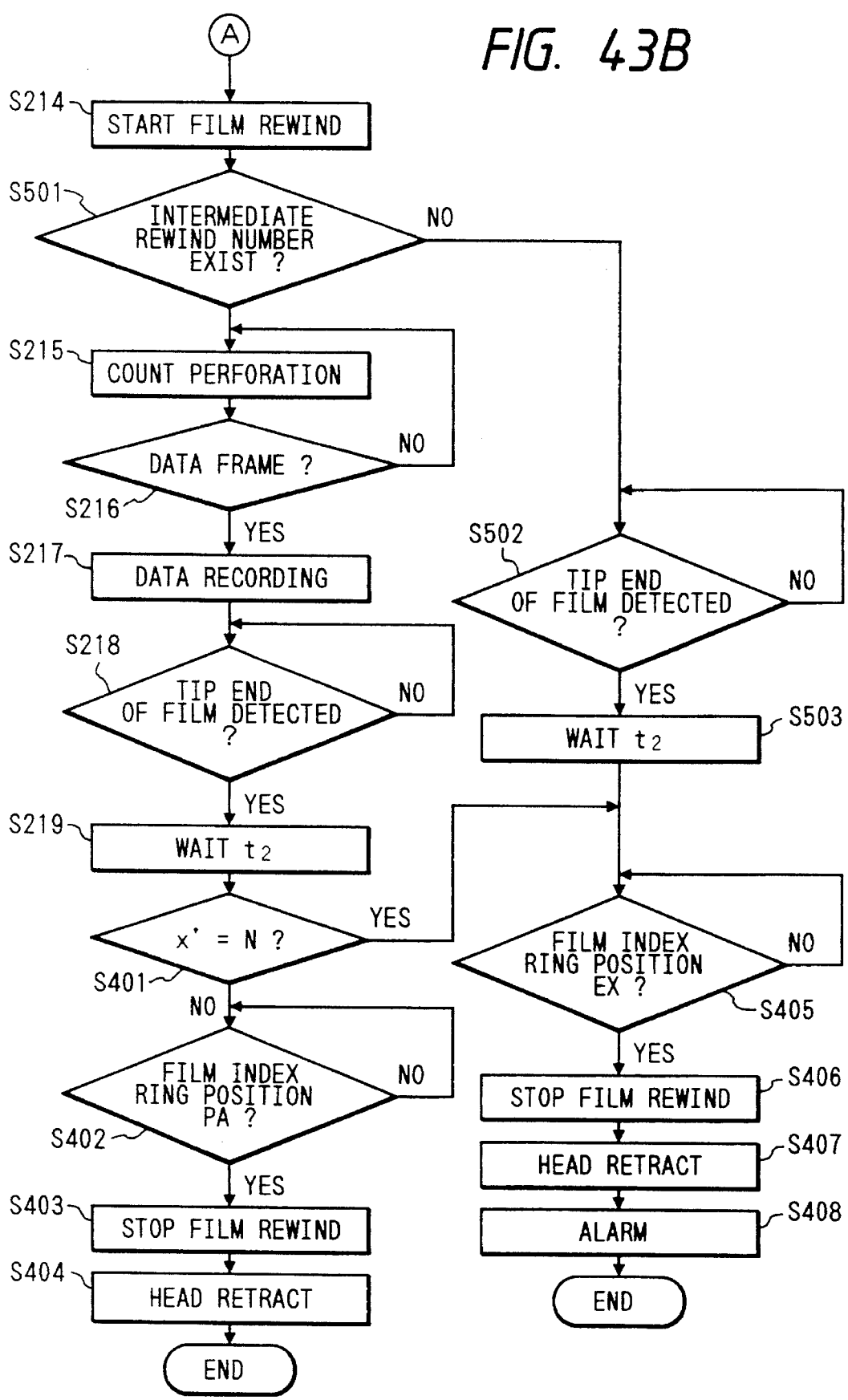

FIGS. 42 and 43 are flow charts which illustrate the operation arranged in such a manner that, if the intermediate rewind number cannot be read, the intermediate rewinding is allowed to be again performed only one time.

FIG. 42 illustrates the operation to be performed from a moment at which the film cartridge is loaded to a moment at which the preparation for the photographing operation is completed. The same step numbers represent the same operations. The difference from FIG. 41 lies in S309 in which whether or not the intermediate rewind number is present is discriminated. If it is present, the flow proceeds to S310. If it is not present, the flow proceeds to S311. That is, if the intermediate rewind number could not be read, the flow is able to proceed to the completion of the preparation for the photographing operation. FIG. 43 illustrates the operation to be performed from a moment at which the photographing operation is performed to a moment at which the film is rewound. The same operations as those shown in FIG. 38 are given the same step numbers. The difference from FIG. 38 lies in S501. In this case, if a discrimination is made in S109 that there is data of the intermediate rewind number, the flow proceeds to S215. If there is no data, the flow proceeds to S502.

In S502 and S503, the same operations as those in S218 and S219 are performed.

Figure 44B:
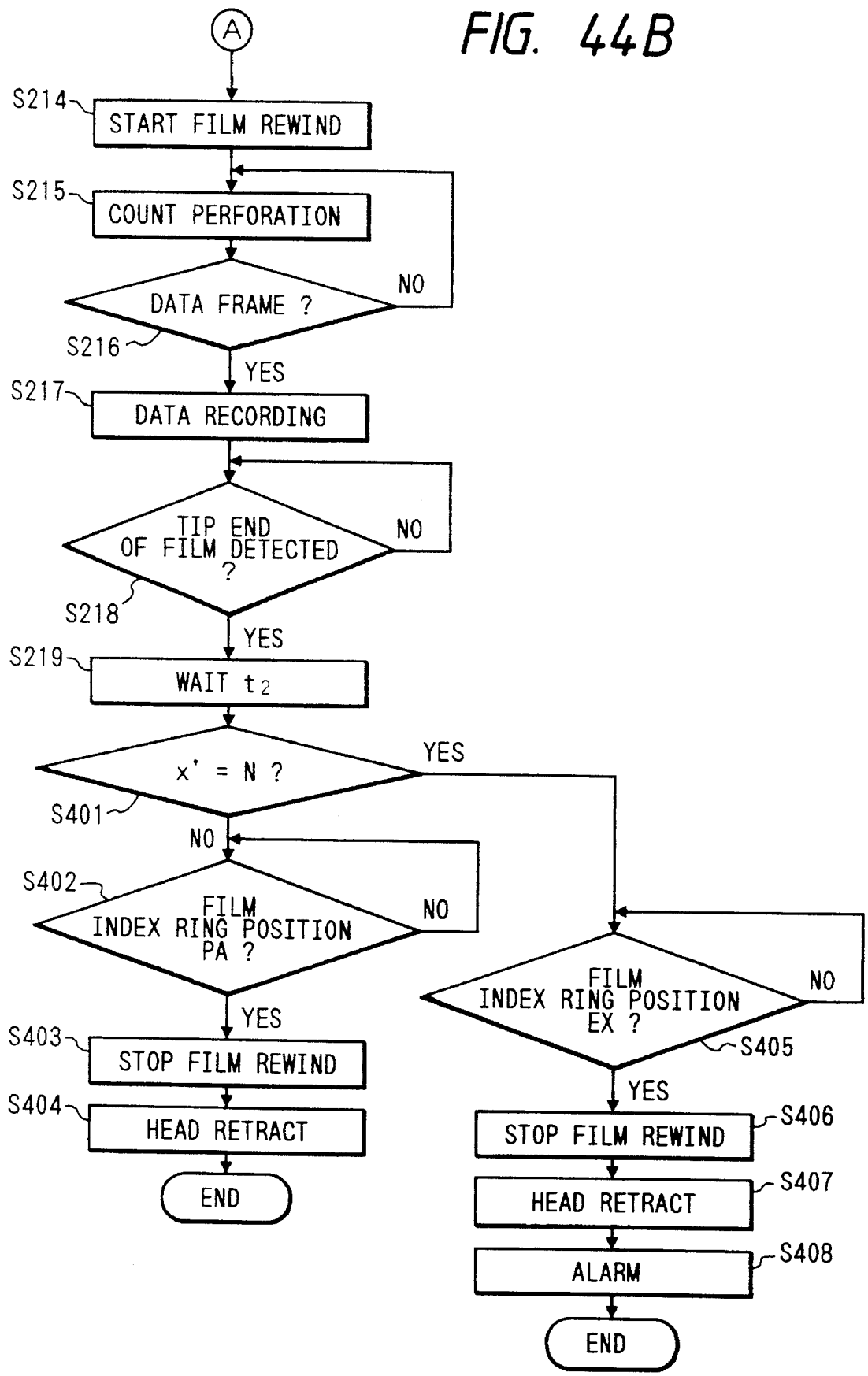

FIG. 44 is a flow chart which illustrates the operation arranged in such a manner that, if the intermediate rewind number could not be read, it is inhibited that the intermediate rewinding operation is performed again.

The difference between the operation shown in FIG. 44 and FIG. 38 lies in S601 in which the flow proceeds to S213 if a discrimination is made in S609 that there is data of the intermediate rewind number. If there is no data, the flow returns to S201. That is, if data of the intermediate rewind number could not be read, adoption of the intermediate rewinding operation in S213 is inhibited.

Although a description has been given about the prewinding type camera in the above described embodiments, a similar effect can, of course, be obtained in a case where the present invention is embodied in a normal winding type camera.

Although the intermediate rewind number is recorded on the data frame provided in the leader portion of the film according to the aforesaid embodiments, the recording portion is not limited to this. It may be recorded to a magnetic recording region of each frame.

The timing for inputting the intermediate rewind number is not limited to that according to this embodiment. It may be input at any timing.

Figure 45:
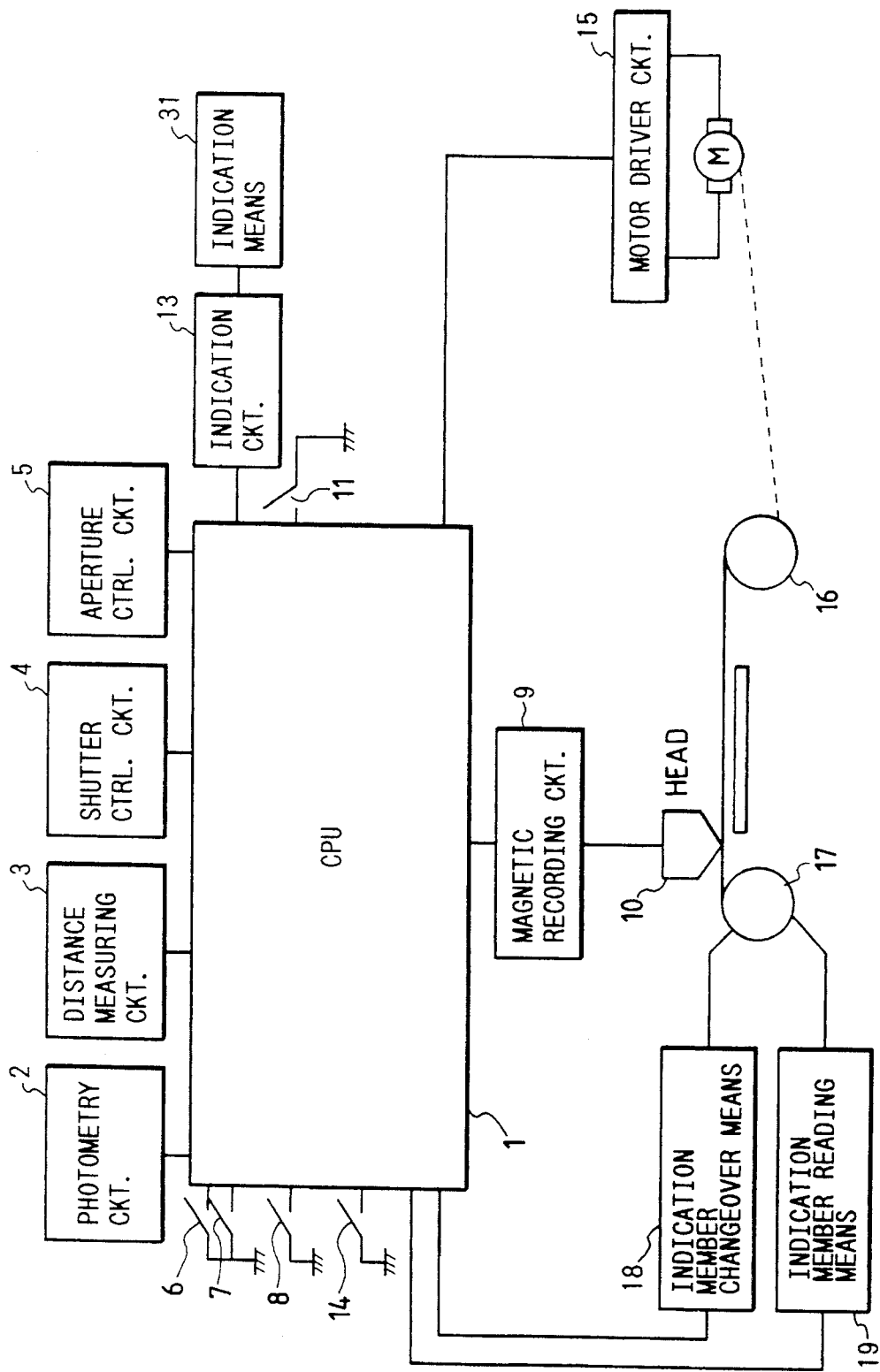
FIG. 45 is a block diagram which illustrates the main structure of another embodiment of the camera according to the paresent invention.

FIGS. 45 to 52 illustrate another embodiment of the present invention. Referring to FIG. 45, reference numeral 1 represents a microprocessor for controlling the overall operation of the camera. Reference numeral 2 represents a photometry circuit, 3 represents a distance measuring circuit, 4 represents a shutter control circuit and 5 represents an aperture control circuit. The aforesaid elements 2 to 5 are formed into conventional circuits. Reference numeral 6 represents a photometry and distance measurement start switch (sw1) and 7 represents an exposure start switch (sw2) which are arranged to be switched on at a first stroke and a second stroke of a release button. Reference numeral 8 represents a main switch, 9 represents a magnetic recording circuit, 10 represents a magnetic head and 11 represents a rewinding start button. Reference numeral 13 represents an indicating circuit for indicating the shutter speed, the aperture value, a fact of whether or not the film cartridge is present, the ejection of the film and the like. Reference numeral 14 represents a back lid switch for detecting whether or not the back lid is opened. Reference numeral 15 represents a motor driver circuit for feeding a film 16. Reference numeral 17 represents a film cartridge for accommodating the film 16 and is formed as disclosed in U.S. Pat. No. 4,965,600, the film cartridge having an indicating member for indicating the condition of the film. Reference numeral 18 represents a changeover means for changing over the indicating member of the film cartridge of the type disclosed in U.S. Pat. No. 4,965,600 or U.S. Pat. No. 4,947,197. The changeover means 18 may be structured in such a manner that a driving means such as a motor is used to rotate the aforesaid indicating member and the indication is changed over. Reference numeral 19 represents a reading means for reading the indicating member of the film cartridge. The indicating member is formed into, for example, a disc (omitted from illustration) on which information about the film rotated integrally with the spool is recorded in the form of a bar code.

Then, the operation of the microprocessor 1 will now be described with reference to flow charts shown in FIGS. 46 to 49.

Figure 46:
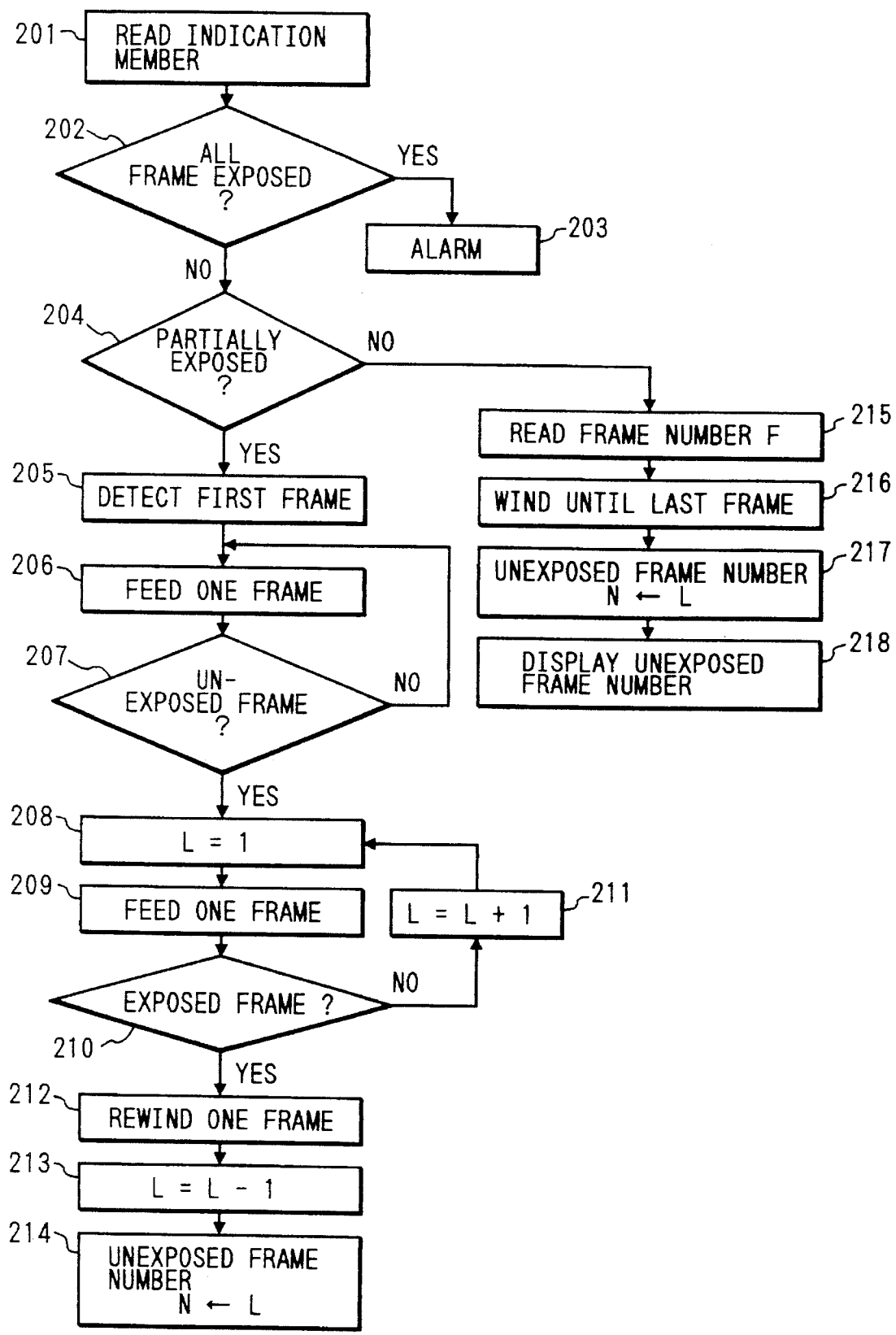
FIG. 46 is a flow chart which illustrates a state of an automatic loading operation to be performed in the pre-wind camera.

FIG. 46 is a flow chart which illustrates a state of the automatic loading operation performed by the prewinding type camera.

First, the indicating member of the film cartridge is read (S201), and then a discrimination is made of whether or not the operation of reading the indicating member resulted in the fact that all frames are exposed (S202). If a discrimination is made that all frames have been exposed, an alarm is issued by flashing the indication or the like (S203). Thus, the operation is completed. If a discrimination is made that all frames have not been exposed and another discrimination is made in S204 that only partial frames have been exposed, the operations in S205 to S214 are executed as follows. If a discrimination is made that the state is not the "partial exposure", the operations in S215 to 217 are performed.

In a case where a discrimination is made that a portion of the frames of the film has been exposed (S204), the film is fed until the leading frame is detected (S205). Then, the frames are fed one by one (S206) to detect the unexposed frame (S207). If the exposed frames are being detected, the aforesaid loop is continued. In step 208, the counter for counting the number of the unexposed frames is set to 1. In steps 209 to 211, the sequential frame feeding is continued until the exposed frame is detected (S209) so as to discriminate whether or not the subject frame is the exposed frame (S210). During this operation, the count of the counter L is increased by one whenever one frame is detected (S211). If an exposed frame is detected, one frame is rewound (S212) to feed the film to the leading frame of the unexposed frames. Then, the count of the counter L is decreased by one since one frame is rewound (S212). The value thus obtained is substituted for the number N of the unexposed frames.

In a case where all frames are unexposed frames, that is, the subject film is the unexposed film, the number of the frames of the film is read and the value of the number of the frames is made to be F (S215). Then, the film is wound to the last frame (S216), and F is substituted for the number N of the unexposed frames (S217). Then, the number of the unexposed frames is, if necessary, indicated by the indicating means 31 by the operation of the indicating circuit 13 (S218).

Figure 47:
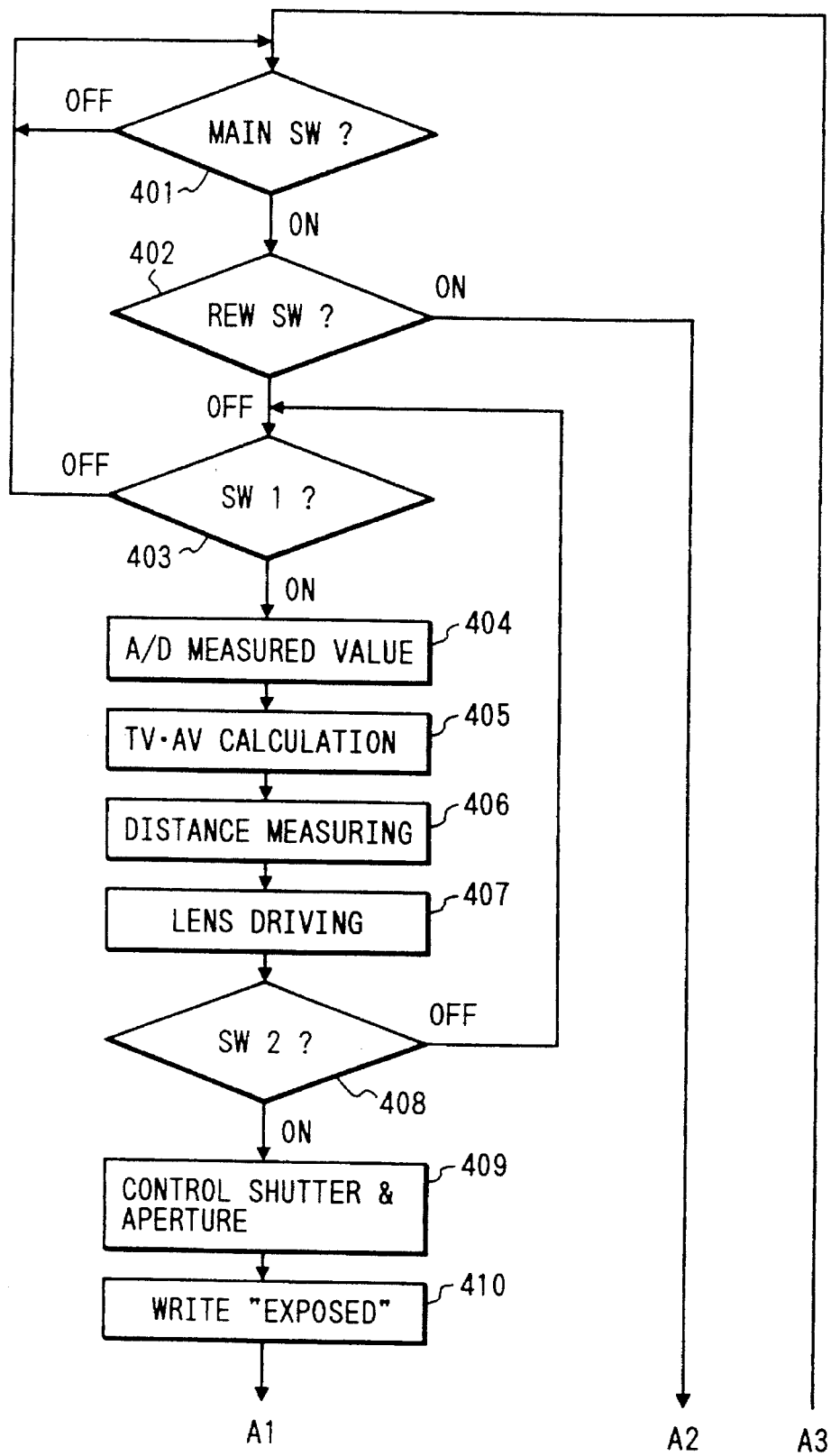
FIG. 47 is a flow chart which illustrates a main routine of the camera shown in FIG. 45.
Figure 48:
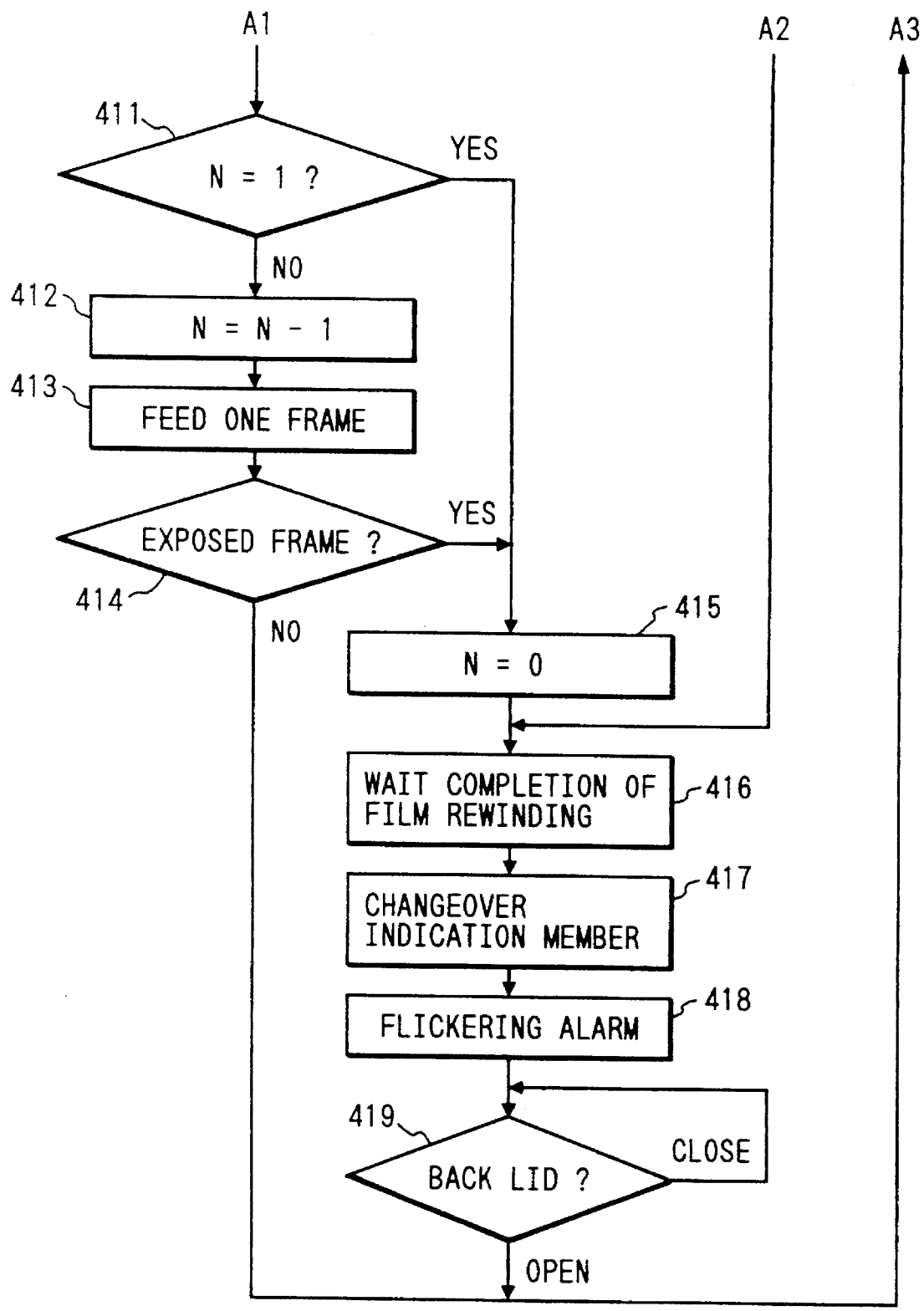
FIG. 48 is a flow chart which illustrates a main routine of the camera shown in FIG. 45.

FIGS. 47 and 48 are flow charts which illustrate the main routine of the camera shown in FIG. 45. When the main switch is switched off, the changing over operations of other switches are not adopted. When the main switch is switched on, the flow proceeds from S410 to S402. If the state is set in such a manner that the automatic loading operation is performed, the routine for the automatic loading is executed. First, whether nor the rewinding button has been depressed is discriminated (S402). If it has been depressed, the flow proceeds to S416. If it has not been depressed, a discrimination is made whether or not the photometry/distance measurement start switch (swl) has been switched on (S403). If it is switched off, the flow returns to S401. If it has been switched on, the flow proceeds to S404 and ensuing steps. Then, the photometry circuit 2 is actuated to obtain the photometry value, this value is A/D converted (S404) and the flow proceeds to S405 in which the values of TV (shutter speed) and AV (aperture) are determined according to the program graph (omitted from illustration) stored in the microprocessor 1. Then, the distance measurement circuit 3 is actuated to obtain information about the distance measurement (S406). According to the distance measurement information, the lens is driven (S407). If the exposure start switch (sw2) 7 is then switched on, the shutter control circuit 4 and the aperture control circuit 5 are actuated (S409) to expose the film. Then, information about fact that the film has been exposed is recorded on the magnetic recording portion of the film by the magnetic head 10 (S410). Then, the number N of the unexposed frames is discriminated (S411). In a case where the frame which has been recorded as an exposed frame is N=1, that is, if it is the last frame of the unexposed frames, the flow proceeds to S415. If the frame which has been written as an exposed frame is not the last frame, that is, if it is not N=1, N is subtracted by one (S412). Furthermore, the film is fed in the rewinding direction by one frame (S413). Then, a discrimination as to whether or not the frame after the frame which has been fed is the exposed frame is made (S414). Usually, only the unexposed frame is subjected to S414 and this step is provided against an emergency. Since there are unexposed frames in an ordinary case, the flow returns to step 401. In a case where the frame which has been written as an exposed frame is the last frame of the unexposed frames, setting of N=φ is made, and the rewinding routine is started. That is, in the aforesaid case and in a case where the rewinding button has been depre;ssed, film is rewound and the completion of rewinding is waited for (S416). Then, the indication made by an indicating member to be described later is changed over (S417). After the film has been rewound, an alarm for forcing the ejection of the film from the camera is performed by flashing the film mark or the like (S418), and opening of the back lid of the camera is waited for (S419).

FIG. 49 is a flow chart which illustrates an operation of changing over the indicating member serving as the means for indicating the film exposure state. In this case, the predetermined number of the frames is made to be a constant value larger than 1, the number of the unexposed frames is N and the predetermined number of frames is K (S501). Then,. whether or not the number of the unexposed frames is 0 is discriminated (S502). If N=0, or if N≦K when the unexposed frame number N and the predetermined frame number K are compared with each other (S503), the indication member is shifted to the position corresponding to the fact that all frames have been exposed. If the unexposed frame number is not the same as the predetermined frame number, N and K are compared with each other (S503). If N>K, the indication member is shifted to the position corresponding to the fact that only partial frames have been exposed.

FIG. 50 illustrates a film having a magnetic recording member for use in the aforesaid embodiment.

Figure 50A:
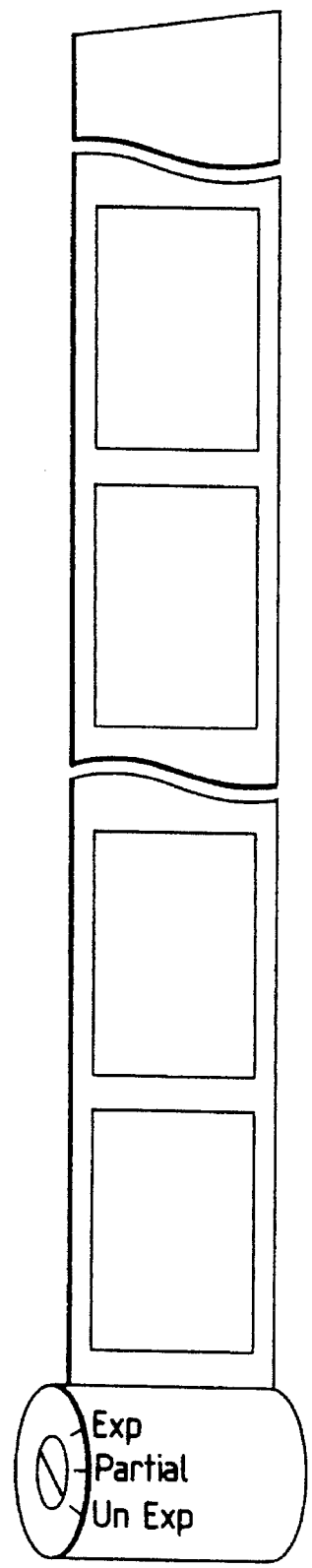
FIG. 50A illustrates an unexposed film.
Figure 50B:
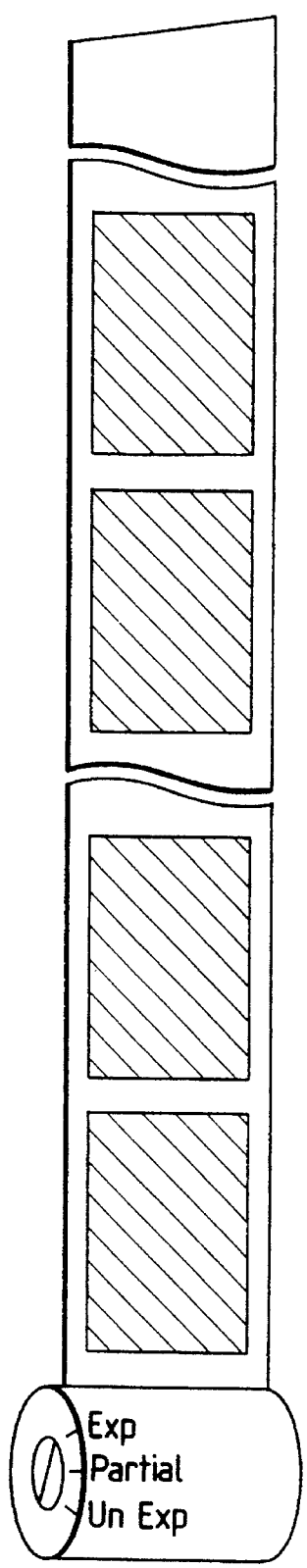
FIG. 50B illustrates an exposed film.

FIG. 50A illustrates the unexposed film and FIG. 50B illustrates the exposed film. FIGS. 51A, 51B and 51C illustrate a partially-exposed film. FIG. 51A illustrates the exposure state of each frame of a film which has been intermediately ejected after it had been exposed in a normal winding type camera. FIG. 51B illustrates the state of a film which has been intermediately ejected after it had been exposed in a prewinding type camera. FIG. 51C illustrates the plate of a film which has been exposed in a normal winding type camera, intermediately ejected, again exposed in a prewinding type camera and intermediately ejected, or the state of a film which has been exposed in a prewinding camera, intermediately ejected, again exposed by the normal winding type camera and intermediately ejected.

Referring to FIG. 51, the frames with oblique lines are exposed frames.

Figure 52:
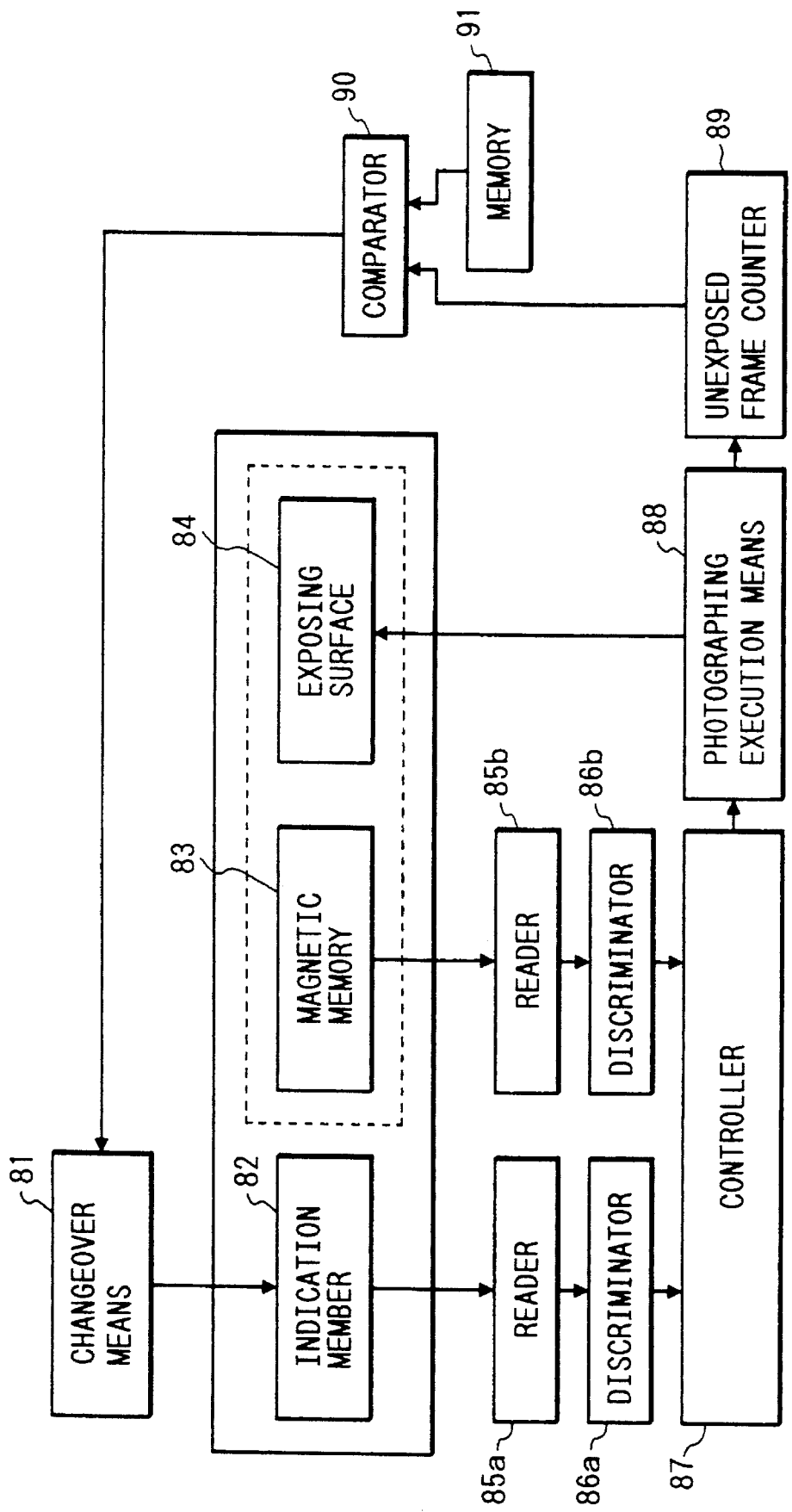
FIG. 52 is a block diagram which illustrates the operation of an embodiment of the present invention.

FIG. 52 is a block diagram which illustrates the operation of the embodiment shown in FIG. 49. The film for use in this embodiment is accommodated in a film cartridge having an indication member for indicating the exposure state of the film, the film having the surface composed of a magnetic recording portion and a surface to be exposed. Information about the film is read from an indication member 82 and a magnetic recording portion 83 (omitted from illustration) provided for the film cartridge. Information thus read is discriminated by a discriminating means 87. If the film is the unexposed film, the film is fed to the leading frame. If the film is the film which has been intermediately ejected, the film is fed to the leading frame of the unexposed frames by a control means. Furthermore, the surface of the film is exposed by an exposure execution means and an unexposed frame counter 89 is controlled whenever the frame is exposed. That is, the value of the unexposed frame counter 89 and a predetermined value are compared with each other by a comparison means 90. According to the result, the indication member is changed over by an indication changeover means 81.

Figure 53:
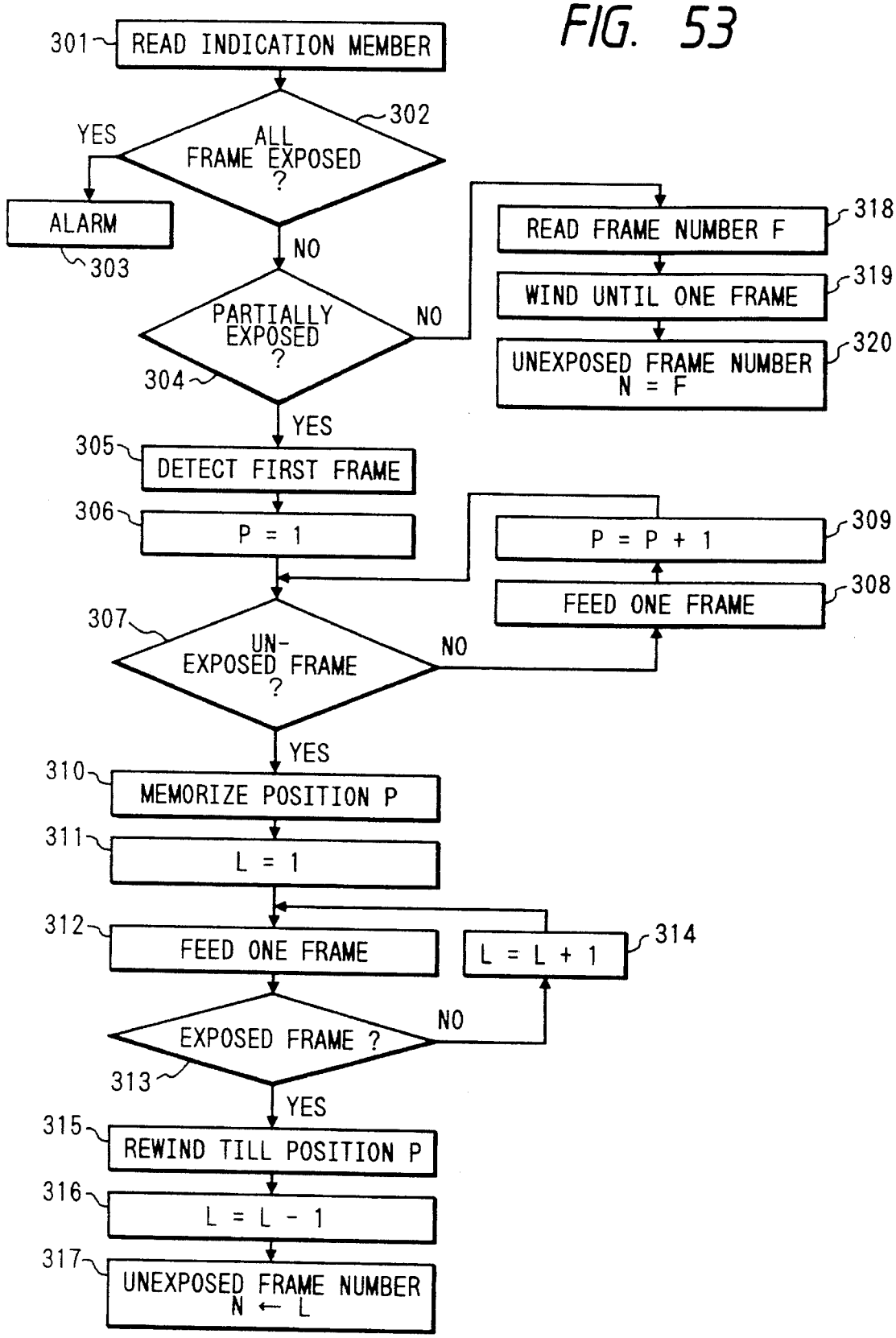
FIG. 53 is a flow chart which illustrates a state of the automatic loading operation performed by a normal wind camera according to another embodiment of the present invention.

FIG. 53 is a flow chart which illustrates a state of the automatic loading operation to be performed by the normal winding type camera according to another embodiment of the present invention.

First, an indication member (omitted from illustration) provided for the film cartridge is read (S301) so as to discriminate the indication means. Then, whether or not all frames have been exposed is discriminated (S302) according to the result of the reading operation. If a discrimination is made that all frames have been exposed, an alarm is made by flashing the indicator or the like and the process is completed (S303). If a discrimination is made in S302 that all frames have not been exposed but only partial frames have been exposed (S304), the operations in S305 to S317 are performed. In a case where a discrimination is made that a portion of the frames has not been exposed and all frames are unexposed frames, the operations in S318 to S320 are performed. That is, in S305, the film is fed until the first frame of the film is detected to set the leading frame. The unexposed frame is detected in S306 to S309. The aforesaid loop is continued during the detection of the exposed frame. A pointer is increased by one (S309) whenever one frame is fed (S308). Furthermore, pointer P when an unexposed frame is detected (S307) is recorded (S310).

Then, the counter L for counting the unexposed frame number is set to 1 (S311). Then, in S312 to 314, feeding of the film is continued until the exposed frame is detected (S312). During the aforesaid feeding operation, each frame is discriminated as to whether or not it is the exposed frame (S313). Furthermore, the counter L is increased by one whenever one frame is detected (S314).

When an exposed frame is detected, the film is rewound to the position of the pointer P (S315) to rewind the film to the leading frame of the unexposed frames. In S316, the counter L indicates the leading frame of the exposed frames and therefore the count is decreased by one. The value of the counter L is substituted for the unexposed frame number N.

In S318 to 320, operations for an unexposed film are performed. In S318, the number of the frames of the film is read and this value is made to be F. In S319, the film is wound to the first frame, and in S320, F is substituted for the unexposed frame number N. Since the ensuing process of the main routine of the camera is the same as that according to the embodiment shown in FIGS. 47 and 48, its description is omitted here.

Figure 54:
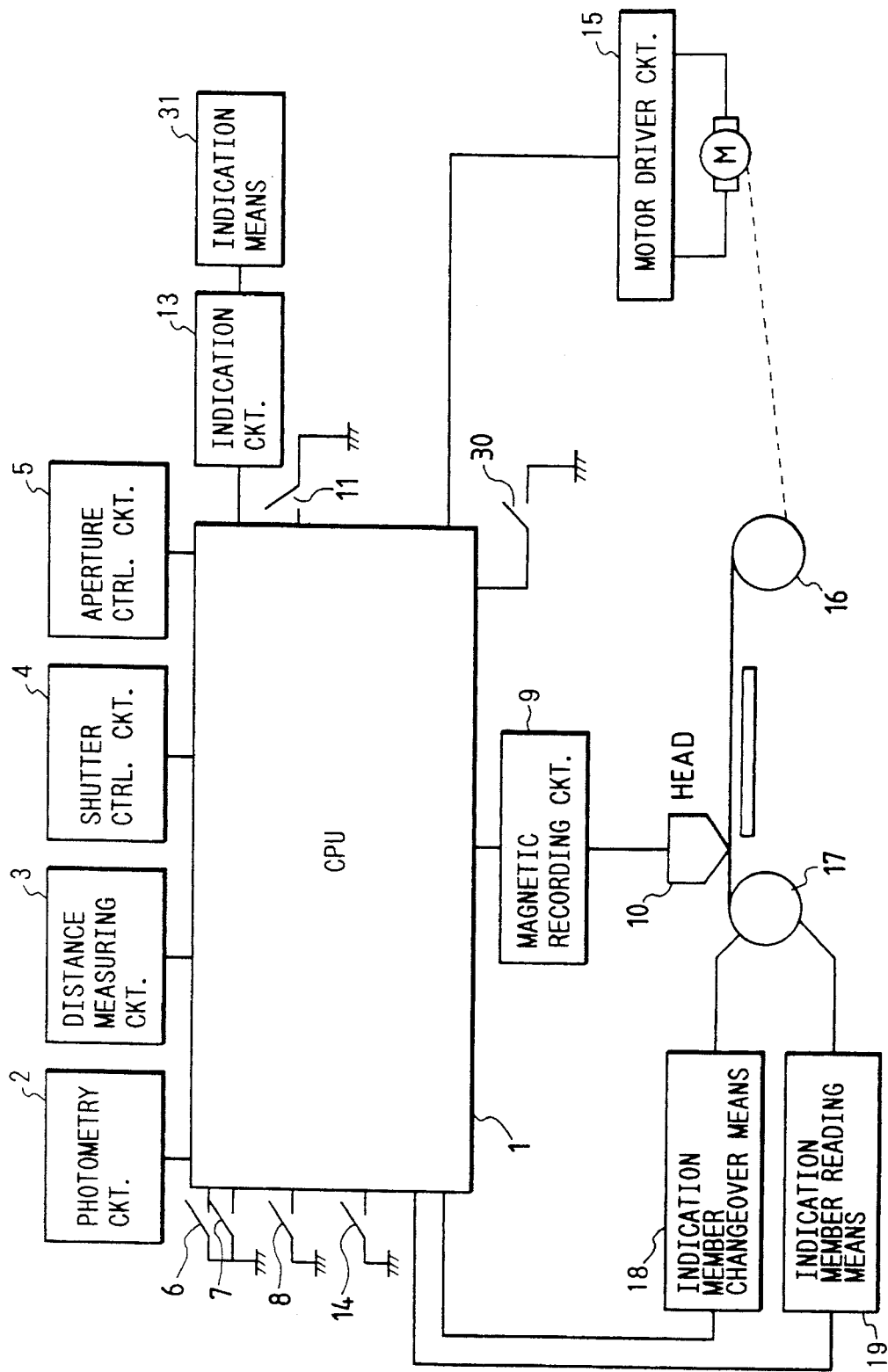
FIG. 54 is is a block diagram which illustrates another embodiment of the present invention.
Figure 55:
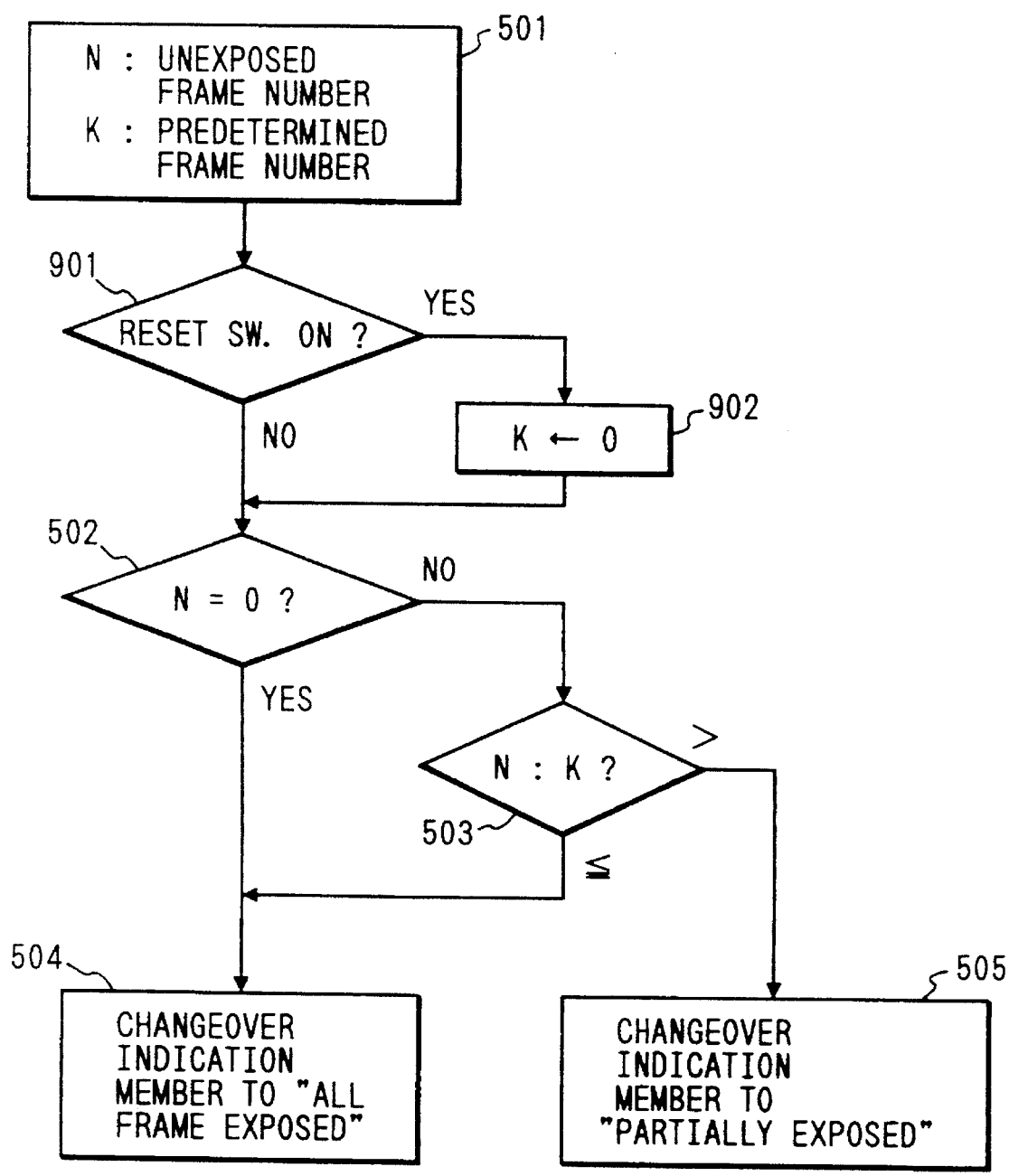
FIG. 55 is a flow chart which illustrate the operation of the embodiment shown in FIG. 54.

FIG. 54 is a block diagram which illustrates another embodiment of the present invention. FIG. 55 is a flow chart which illustrates the operation of FIG. 54. Referring to the block diagram shown in FIG. 54, the same functions as those shown in FIG. 45 are given the same step numbers and their descriptions are omitted here. Referring to FIG. 54, reference numeral 30 represents a reset switch serving as the reset means for making the predetermined frame number K according to the embodiment shown in FIG. 49 to be zero. The state of the automatic loading operation is the same as that shown in FIG. 46 and the main routine of the camera is the same as that shown in FIG. 47, their descriptions are omitted here. FIG. 55 illustrates the operation of changing over the indication member. Referring to FIG. 55, the same functions as those shown in FIG. 5 are given the same step numbers and their descriptions are omitted here. Referring to FIG. 11, in S901, whether or not the reset switch 30 shown in FIG. 54 has been switched on is discriminated. If it has been switched on, the flow proceeds to S902 in which 0 is substituted for the predetermined frame number K. Then, the flow proceeds to S502. Although the ensuing process is the same as that shown in FIG. 49, the predetermined frame number is made to be 0 and thereby changing over to a partial exposure is enabled if one or more unexposed frames are present.

Figure 56:
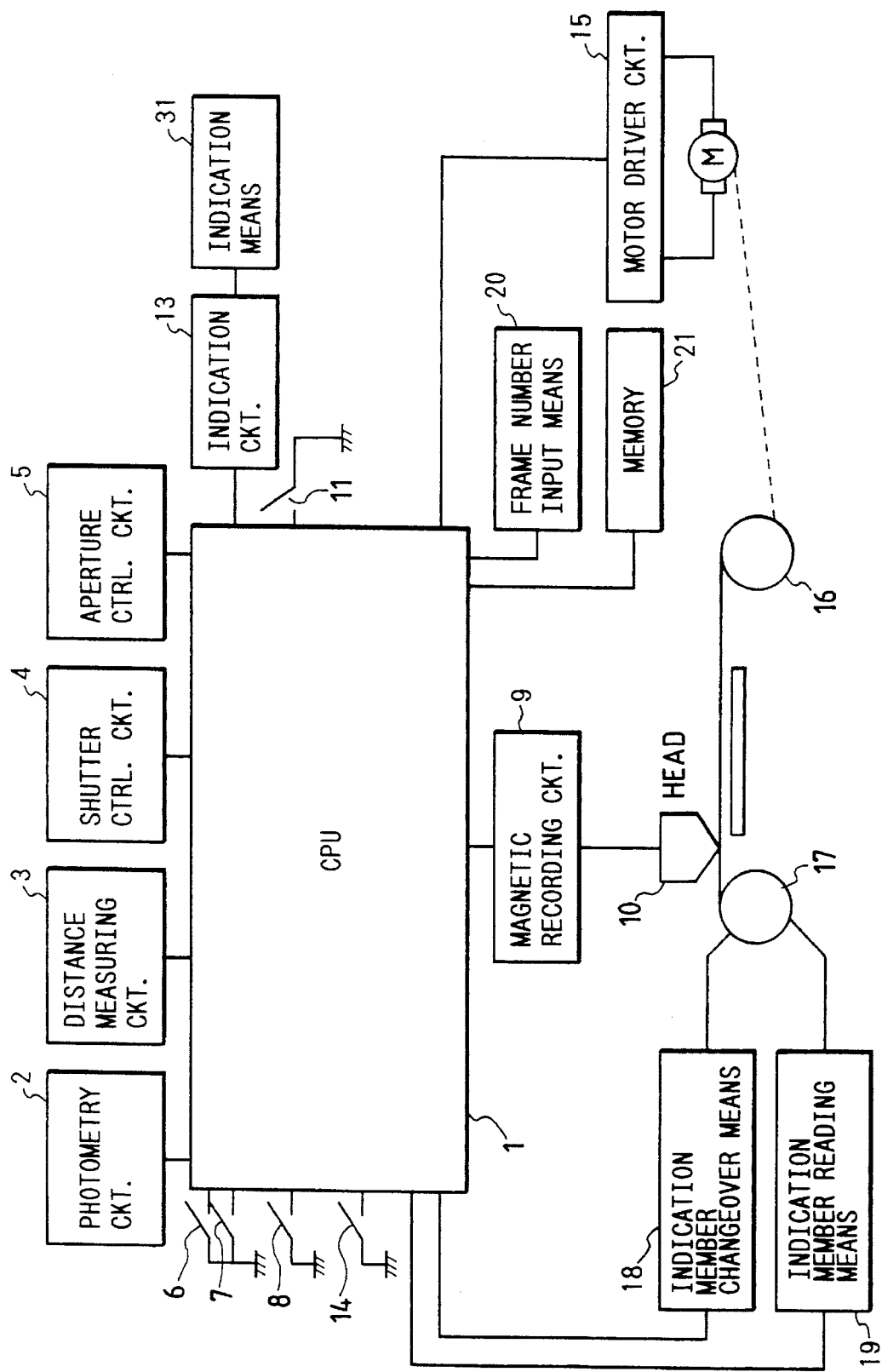
FIG. 56 is is a block diagram which illustrates another embodiment of the present invention.

FIG. 56 is a block diagram which illustrates another embodiment of the present invention. Referring to FIG. 56, reference numeral 20 represents a frame number input means for inputting arbitrary frame numbers, which is one or more, and 21 represents a memory for memorizing the frame number inputted by the frame input means 20. Since the other structures are the same as those shown in FIG. 45, their descriptions are omitted here.

Figure 57:
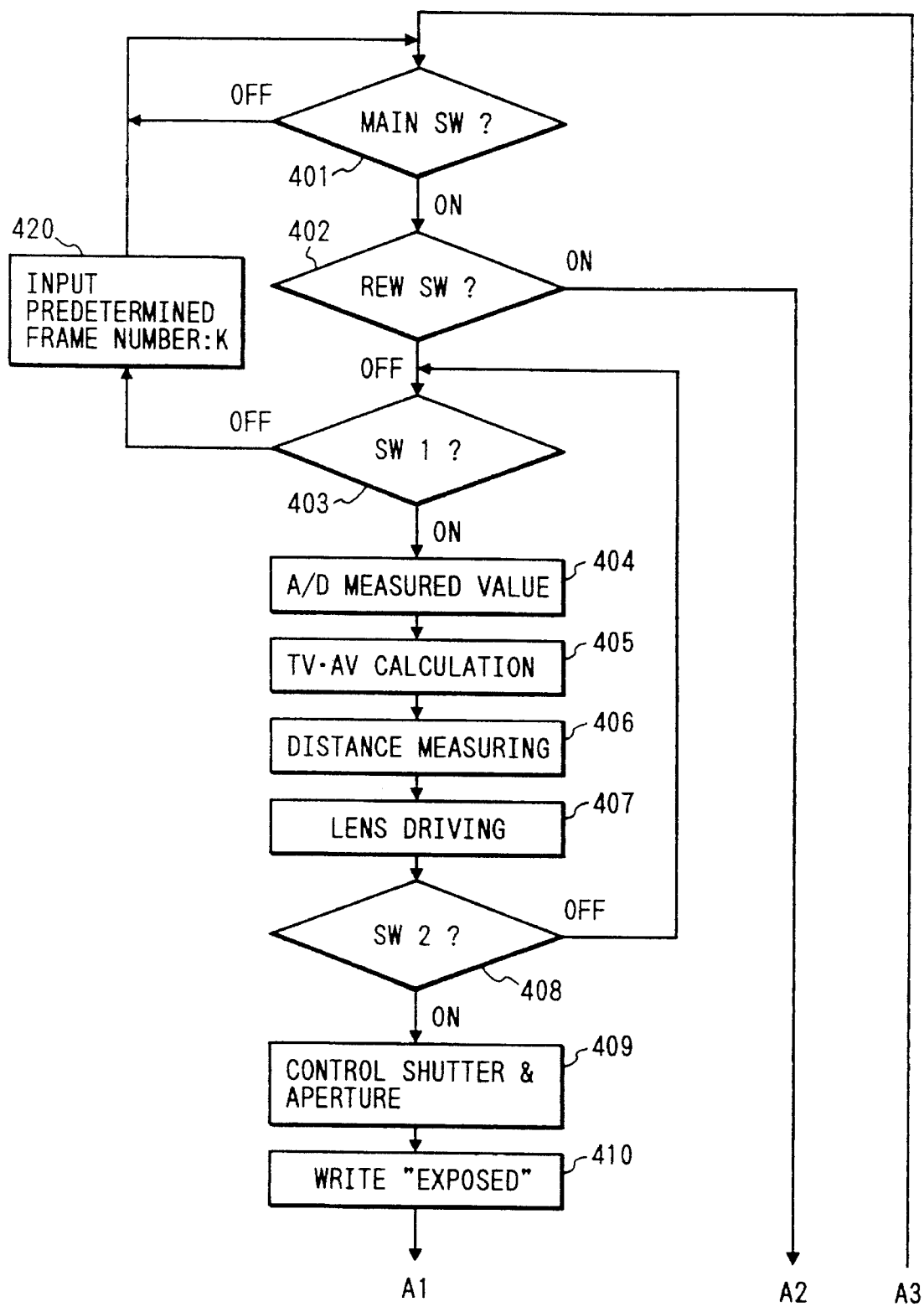
FIG. 57 is a flow chart which illustrates a portion of routine work performed by the camera shown in FIG. 56.
Figure 58:
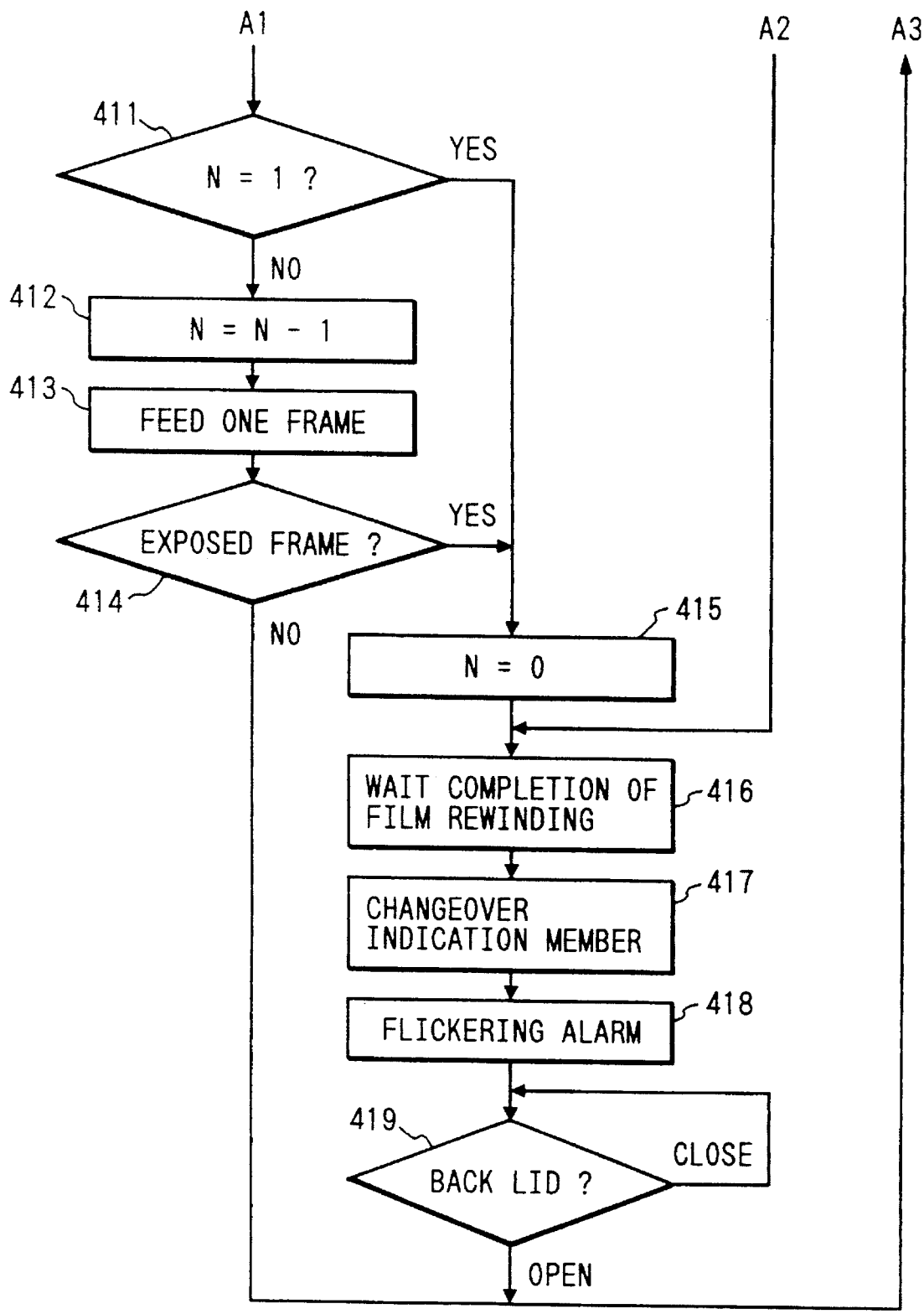
FIG. 58 ms a flow chart which illustrates a portion of the routine work performed by the camera shown in FIG. 56.

FIGS. 57 and 58 are flow charts which illustrate a portion of the routine of the camera shown in FIG. 56. Referring to FIGS. 57 and 58, the same operations as those shown in FIGS. 47 and 48 are given the same step numbers and their descriptions are omitted here. Referring to FIG. 57, whether or not the switch (SW1) 6 has been switched on is discriminated (S403). If it has been switched off, the predetermined number of frames is inputted by the frame number input means 20 and the memory 21 in S420 so as to store it. Then, the flow returns to S401. If it has been switched on, the flow proceeds to S404 and ensuing steps. The other operations are the same as those shown in FIGS. 47 and 48.

Figure 59:
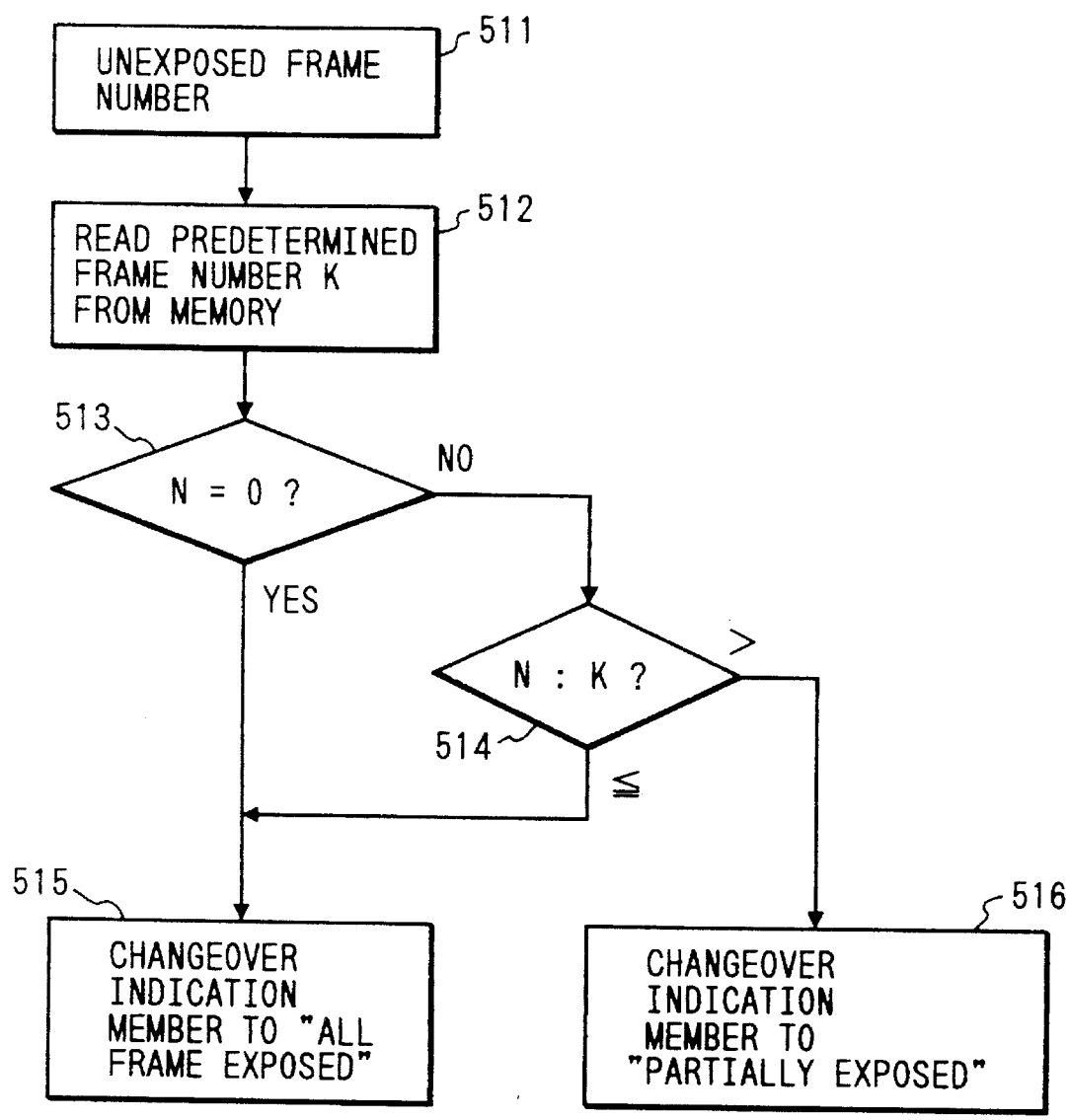
FIG. 59 ms a flow chart which illustrates an operation of changing over an indication member serving as an indication means for indicating the condition of the film according to the embodiment shown in FIG. 56.

FIG. 59 is a flow chart which illustrates an operation of changing over the indication member serving as the indication means for indicating the film exposure state according to the embodiment shown in FIGS. 56, 57 and 58. According to this embodiment, the predetermined frame number is made to be a variable value. Letting the value inputted and memorized in S420 shown in FIG. 57 be K, a discrimination is made whether or not the number of the unexposed frame number is zero (S513). If N=0, the unexposed frame number N and the predetermined frame number K are compared to each other (S514). If N≦K, the indication member is shifted to a position corresponding to the fact that all frames have been exposed in S515. If the relationship N=0 is not held and N>K is held, the indication member is shifted to a position corresponding to the fact that the frames have been partially exposed in S516.

Figure 60:
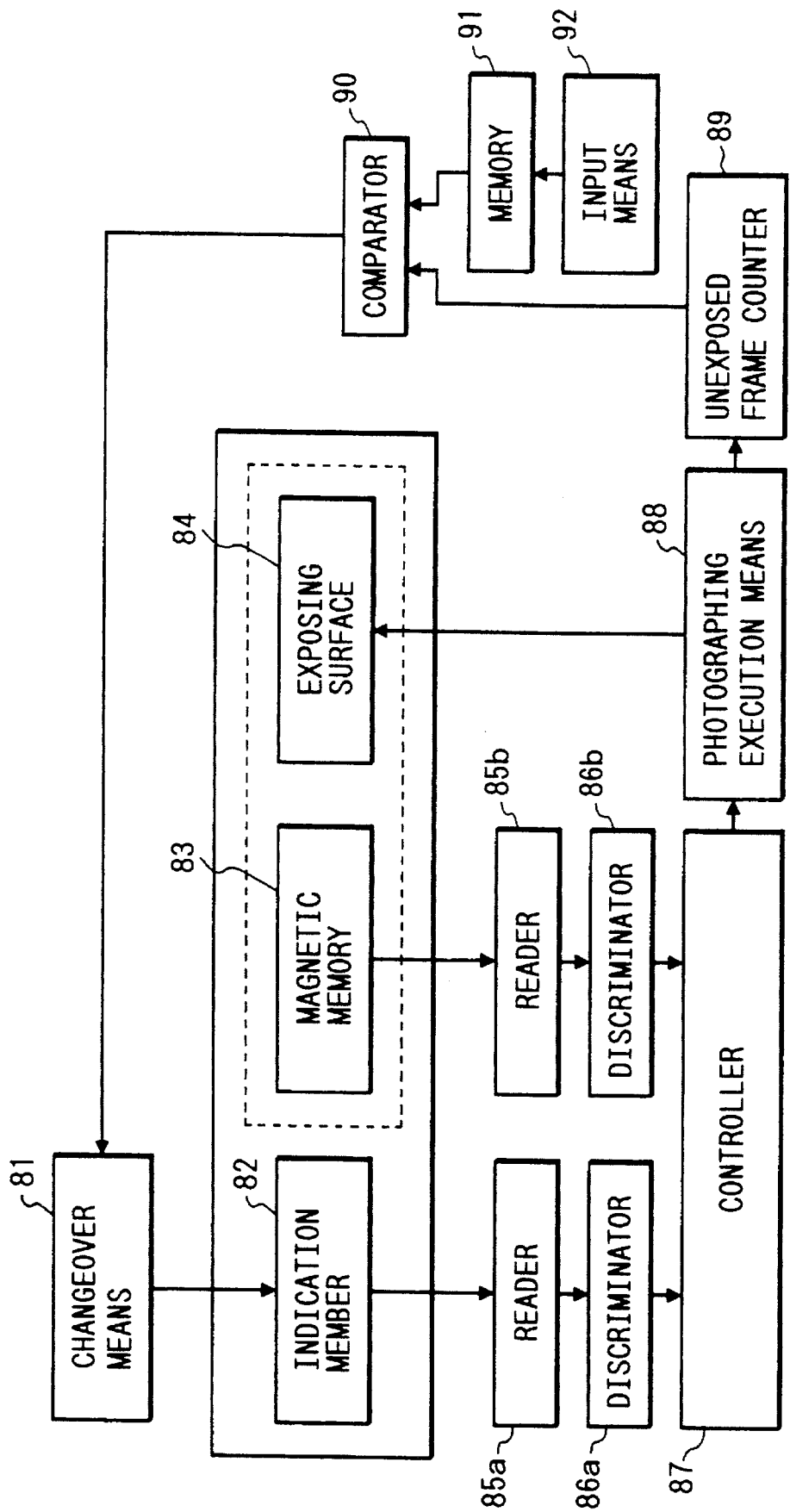
FIG. 60 is a block diagram which illustrates the operation of the embodiment shown in FIG. 56.

FIG. 60 is a block diagram which illustrates the operation of the embodiment shown in FIG. 56. Referring to FIG. 60, the value of the counter 89 denoting the unexposed frames obtained and shown in FIG. 52 and the value inputted by the input means and stored in the memory in S420 shown in FIG. 57 are compared to each other by the comparison means 90. According to the result of the comparison, the indication member of the film cartridge is changed over by the indication changeover means 81. Since the aforesaid operation is the same as that shown in FIG. 52, its description is omitted here.

Figure 61:
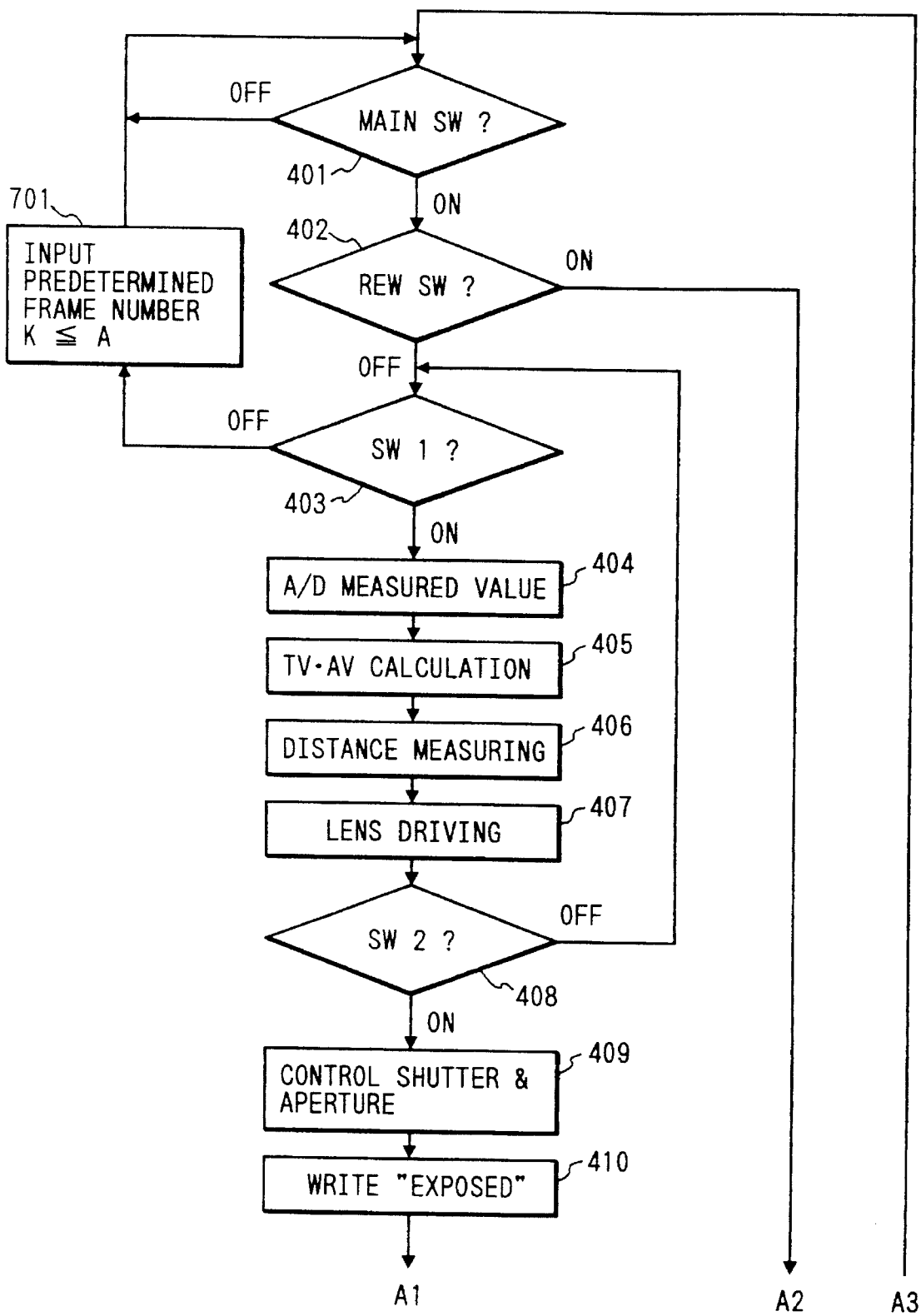
FIG. 61 is a flow chart which illustrates a main routine according to another embodiment of the present invention.

FIG. 61 is a flow chart which illustrates the main routine of another embodiment of the present invention. The same functions as those shown in FIG. 47 are given the same step numbers and their descriptions are omitted here. The difference between FIG. 61 and FIG. 47 lies in that the predetermined frame number K which can be inputted in S701 is limited to A or less. Thanks to this limit, a risk generated when a multiplicity of unexposed frames cannot be used due to an erroneous input of the predetermined frame number can be prevented.

Figure 62:
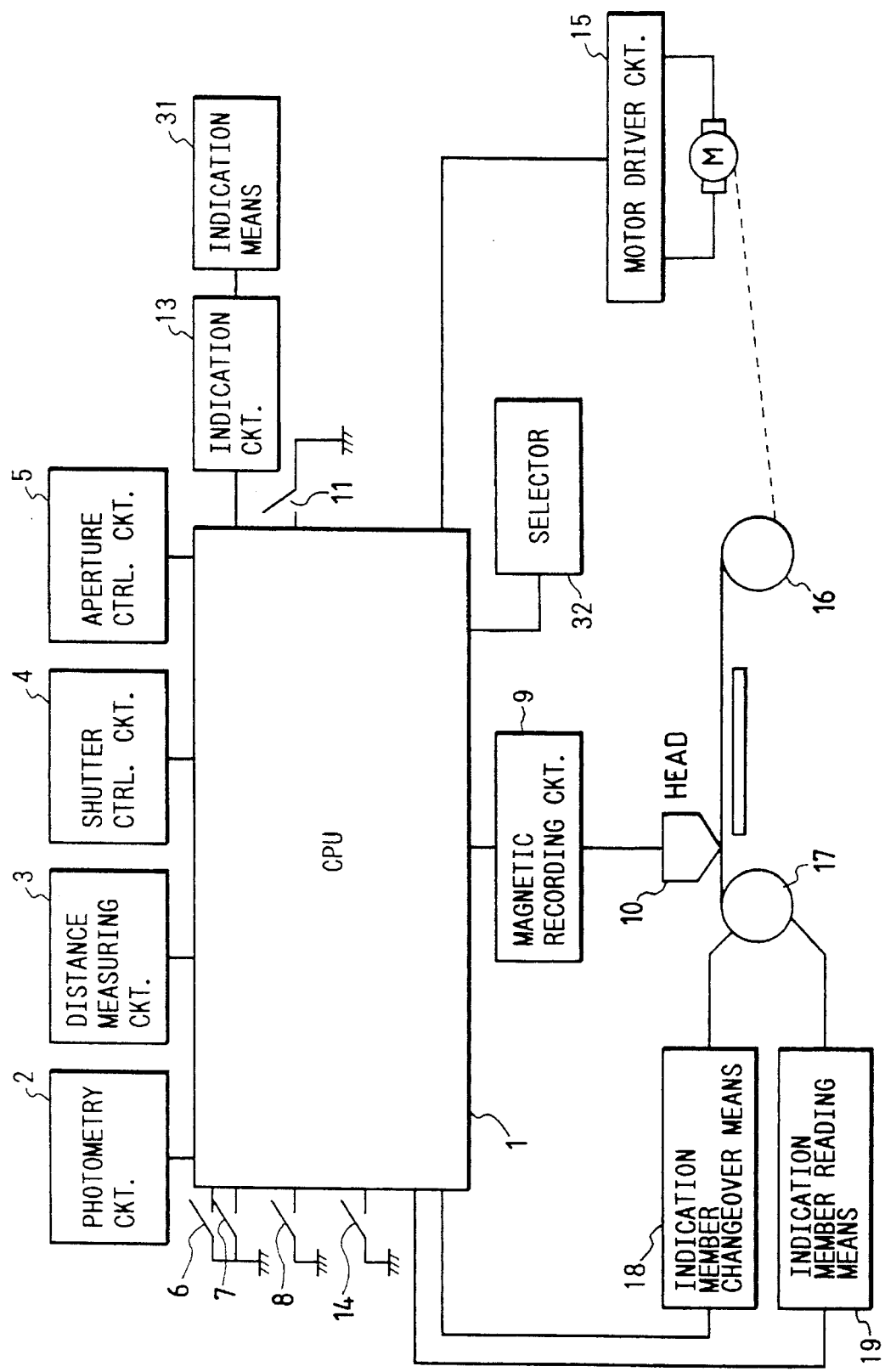
FIG. 62 is a block diagram which illustrates another embodiment of the present invention.
Figure 63:
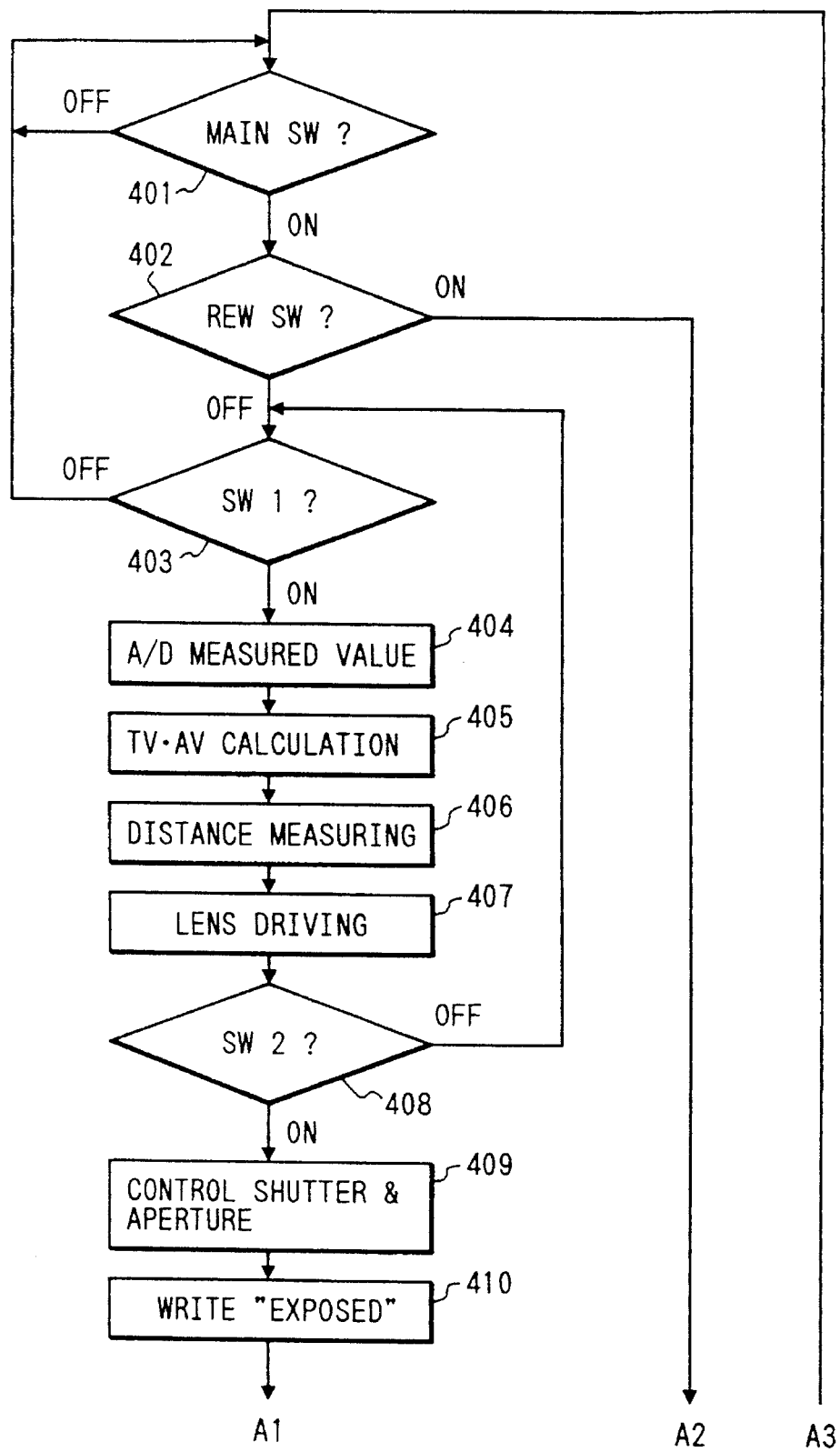
FIG. 63 is a flow chart which illustrates a main routine of the camera according to the embodiment shown in FIG. 62.
Figure 64:
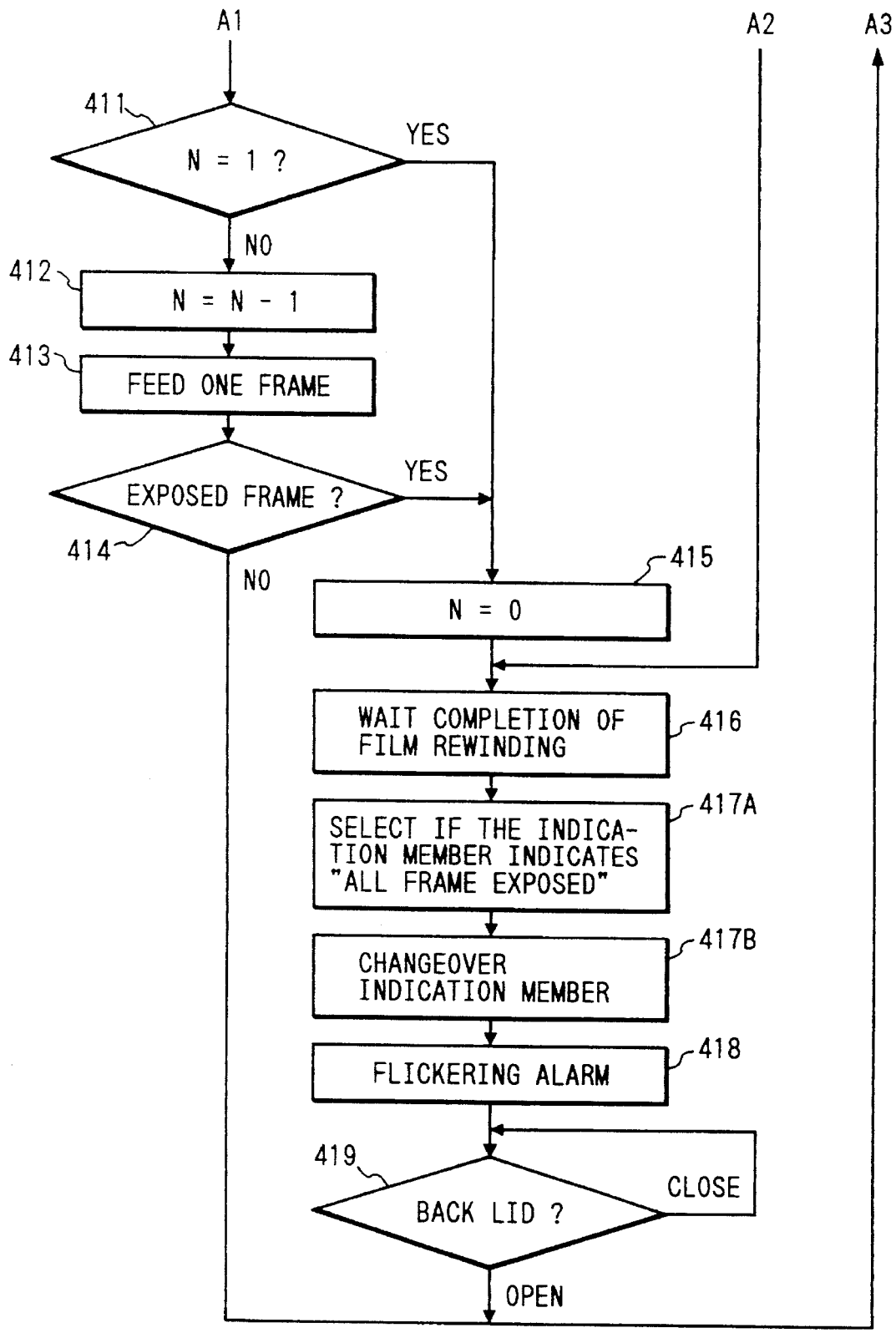
FIG. 64 is a flow chart which illustrates a main routine of the camera according to the embodiment shown in FIG. 62.

FIG. 62 is a block diagram which illustrates another embodiment of the present invention. Referring to FIG. 62, reference numeral 32 represents a selection means for selecting whether or not the indication means of the film cartridge indicates the "all frames have been exposed" after the intermediate rewinding has been completed. Since the other structures are the same as those shown in FIG. 45, their descriptions are omitted here. FIGS. 63 and 64 are flow charts which illustrate the main routine of the camera according to the embodiment shown in FIG. 62. Referring to FIGS. 63 and 64, the same functions as those shown in FIGS. 47 and 48 are given the same step numbers and their descriptions are omitted here. The difference from the embodiment shown in FIGS. 47 and 48 lies in that a selection of whether or not the indication of the film cartridge is made to be the "all frames have been exposed" is made (S417A) so as to change over the indication member to be described later (S417B).

Figure 65:
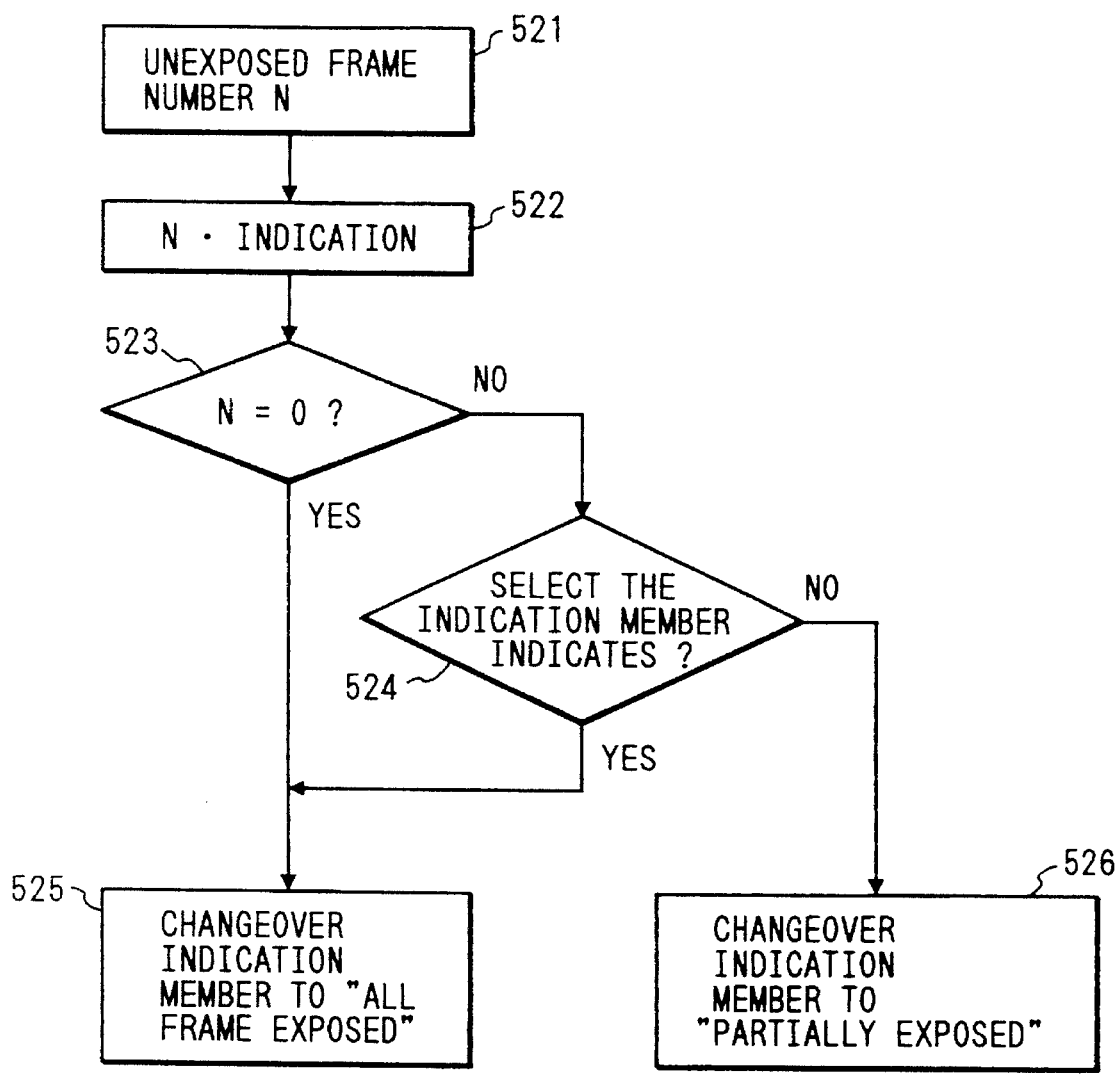
FIG. 65 is a flow chart which illustrates an operation of changing over the indication member of the film cartridge.

FIG. 65 is a flow chart which illustrates changing over the indication member of the film cartridge in 417B shown in FIG. 64. In a case where the film is intermediately rewound before all frames are exposed, that is, in a case where there are unexposed frames, the indication of the film cartridge can be selected from "only partial frames have been exposed" or "all frames have been exposed". The unexposed frame number N is indicated (S522), and then the indication member is changed over (S525) to indicate that all frames have been exposed in a case N=0. In a case where a relationship N=0 is not held, the indication of the indication member is selected from "only partial frames have been exposed" or "all frames have been exposed" (S524). Then, the indication member is changed over to "only partial frames have been exposed" (S526).

Figure 66:
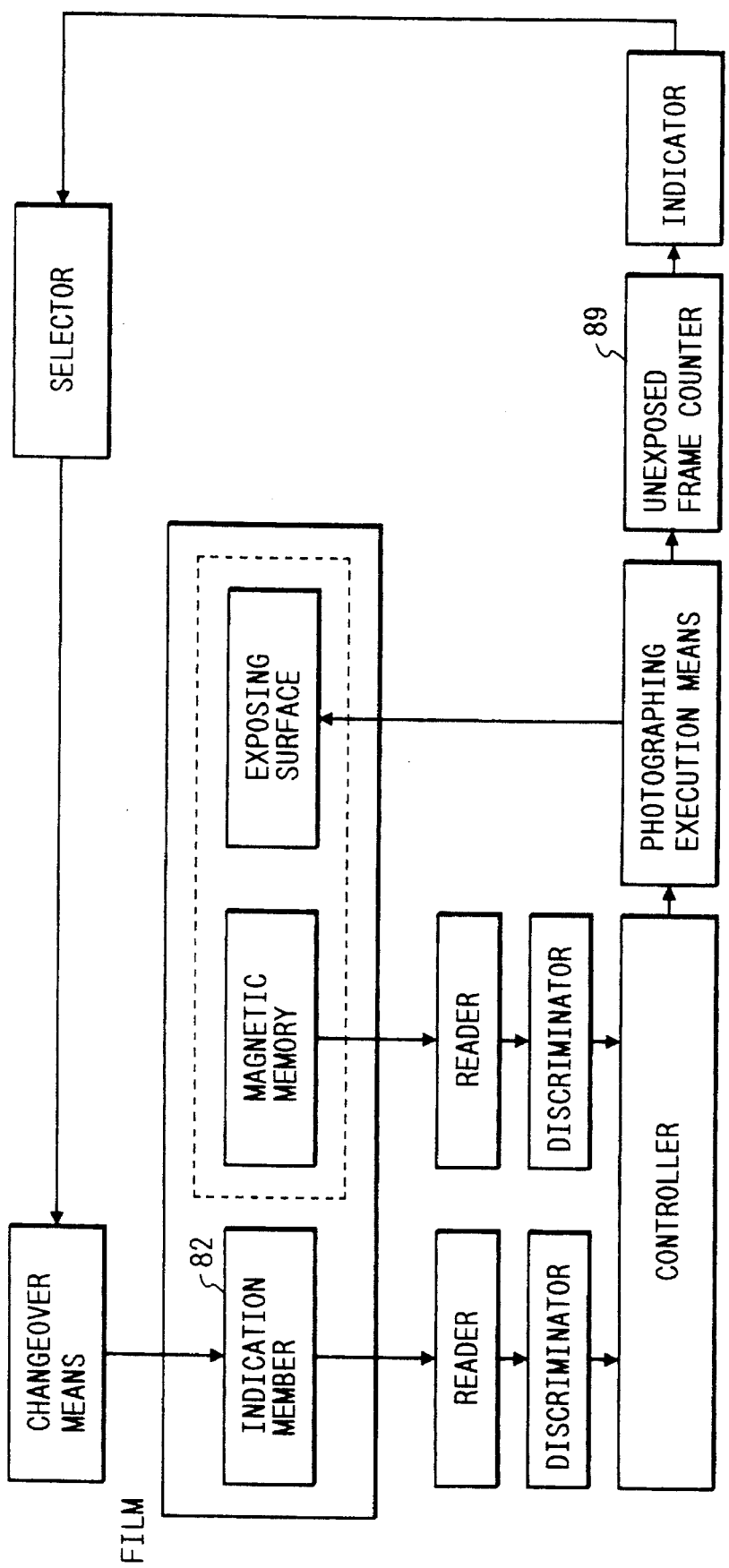
FIG. 66 is a block diagram which illustrates the operation of the embodiment of the present invention shown in FIG. 62.

FIG. 66 is a block diagram which illustrates the operation of the embodiment shown in FIG. 62. Since the same step numbers as those shown in FIG. 52 have the same functions, their descriptions are omitted here. Referring to FIG. 66, a photography execution means performs an operation of photographing the exposure surface of the film and the unexposed frame counter 89 is controlled at each photographing operation. The count of the unexposed frame counter 89 is indicated by the indication means. According to this value, a user selects the indication of the indication member of the film cartridge by the selection means 30 so as to change over the indication member of the film cartridge.

Figure 67:
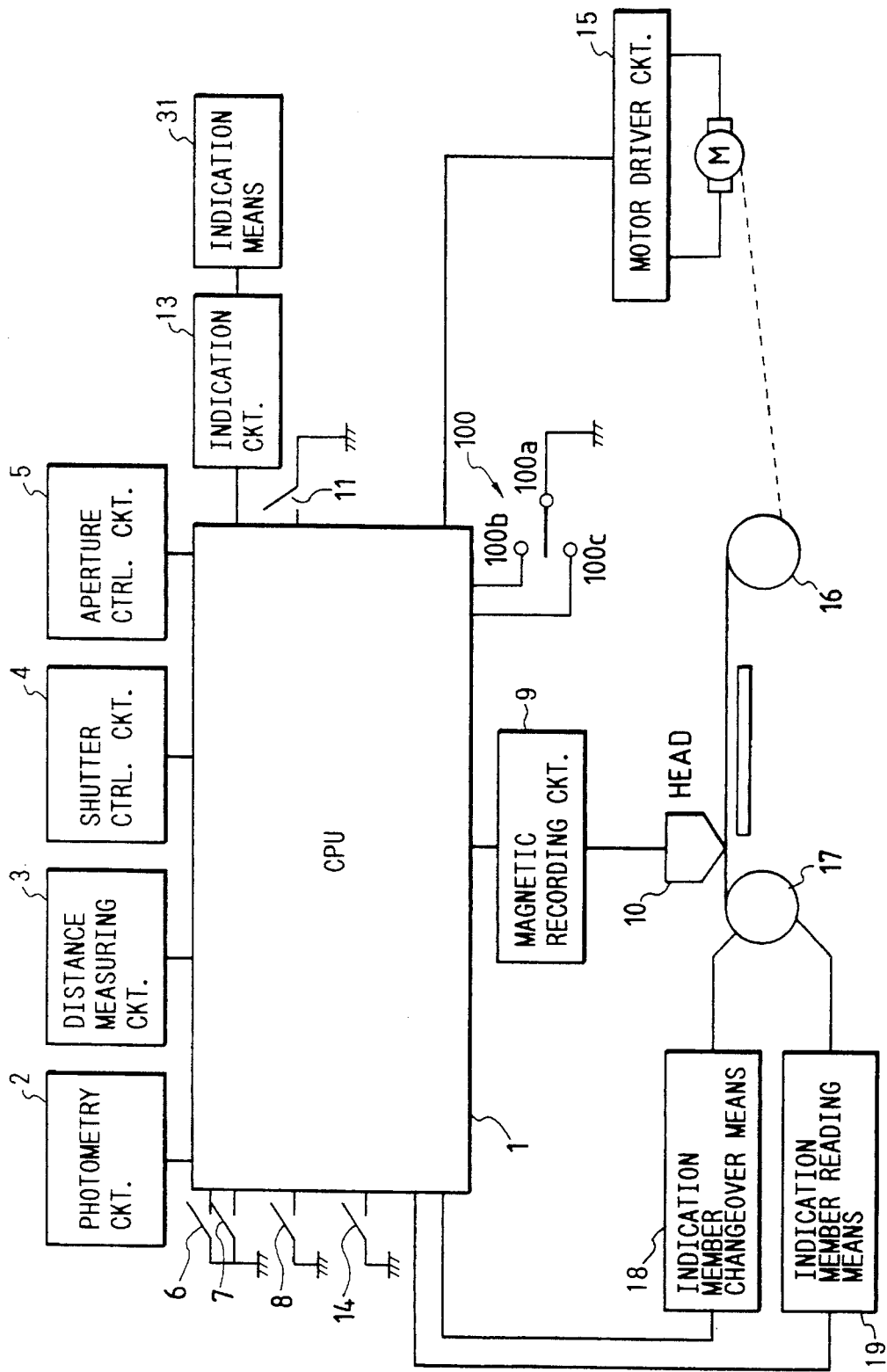
FIG. 67 is a block diagram which illustrates the main structure of another embodiment of the camera according to the present invention.

FIG. 67 is a block diagram which illustrates an essential portion of the camera according to another embodiment of the present invention. Referring to FIG. 67, the same elements as those shown in FIG. 62 are given the same reference numerals and their descriptions are omitted here. Reference numeral 100 represents a selection means having a contact 100a which can be conducted with a contact 100b or 100c by an operation member (omitted from illustration).

Since the flow chart for the automatic loading operation shown in FIG. 67 is the same as that shown in FIG. 46, its description is omitted here.

Figure 68:
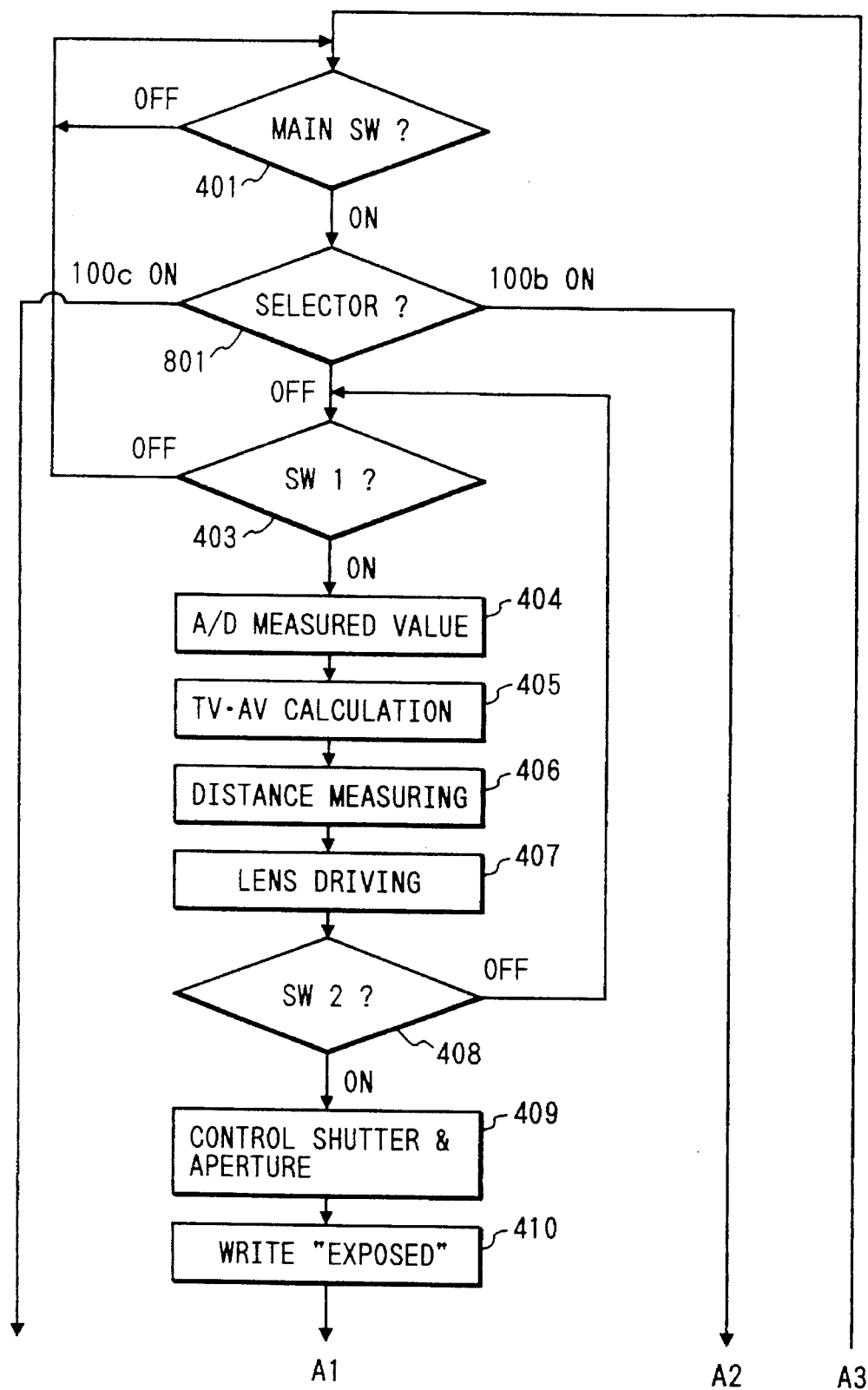
FIG. 68 illustrates a main routine of the camera shown in FIG. 67.
Figure 69:
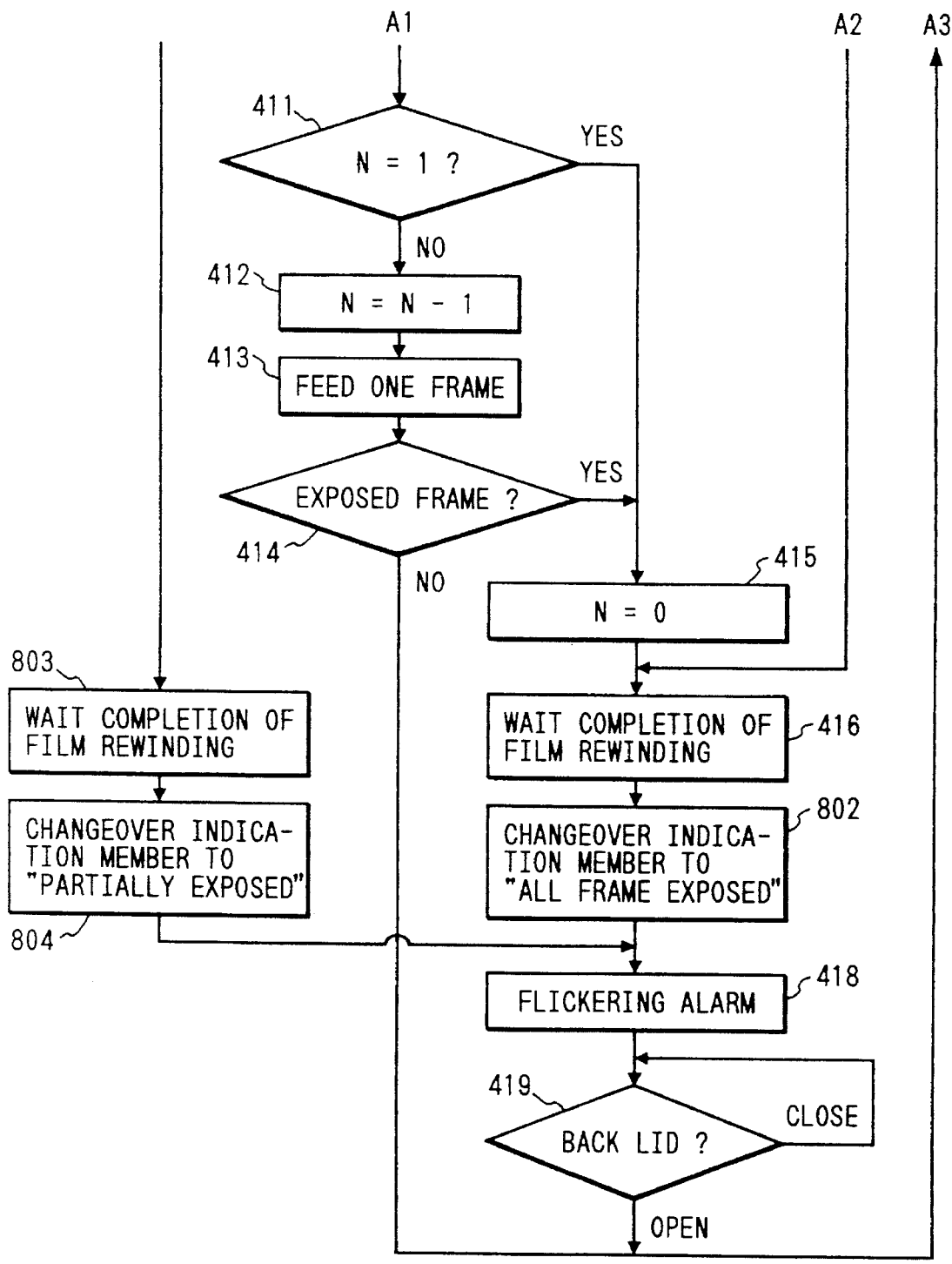
FIG. 69 illustrates a main routine of the camera shown in FIG. 67.

FIGS. 68 and 69 illustrate the main routine of the camera shown in FIG. 67. Referring to FIGS. 68 and 69, the same operations as those shown in FIGS. 64 and 65 are given the same step numbers and their descriptions are omitted here. Referring to FIGS. 68 and 69, if the main switch 8 is switched on (S401) and also the contact 100a and 100b of the selection means are in contact with each other in S801, rewinding of the film is started. Then, the flow proceeds to S416. If the contact 100a is in contact with the contact 100c, film rewinding is started, and the flow proceeds to S803. Furthermore, the completion of the operation of rewinding the film is waited for in both cases. If the contact 100a is not in contact with any contact, the flow proceeds to S403 in which the photographing operation is performed. In S802, the indication member of the film cartridge is changed over to "all frames have been exposed" by the indication member changeover means 18. On the contrary, in S804, the indication member of the film cartridge is changed over to "only partial frames have been exposed" by the indication member changeover means 18. Then, the flow proceeds to S418.

Although the invention has been described in its preferred form with a certain degree of particularly, it is understood that the present disclosure of the preferred form may be changed in the details of construction and other combinations and arrangements of the parts may be resorted to without departing from the spirit and the scope of the invention as hereinafter claimed.

What is claimed is:

1. Camera apparatus comprising:
   (a) intermediate rewinding means for performing an intermediate rewinding operation on a film of a film cartridge installed in said camera, said intermediate rewinding operation being performed at a stage where a portion of the film has not yet been exposed;
   (b) detection means for detecting a number of times said intermediate rewinding operation has been performed in the past on the same film cartridge; and
   (c) restriction means for restricting a number of times the intermediate rewinding operations are performed on the basis of the number of times detected by said detection means and a predetermined number so as not to exceed a predetermined number of rewinding operations on the same film cartridge.

2. Camera apparatus comprising:
   (a) intermediate rewinding means for performing an intermediate rewinding operation on a film of a film cartridge installed in said camera, said intermediate rewinding operation being performed at a stage where a portion of the film has not yet been exposed;
   (b) detection means for detecting a number of times said intermediate rewinding operation has been performed in the past on the same film cartridge; and
   (c) inhibition means for inhibiting further exposure of the film in said same film cartridge when said number of times detected by said detection means reaches a predetermined number.

3. Apparatus according to claim 2, wherein said inhibition means inhibits an operation of feeding said film to a position at which said film is exposed.

4. Apparatus according to claim 2, further comprising feeding means for automatically feeding said film to a predetermined unexposed frame position when said film cartridge is loaded, wherein said inhibition means inhibits said feeding to said predetermined unexposed frame position and rewinds said film into said film cartridge.

5. Apparatus according to claim 2, further comprising alarm means for issuing an alarm when said inhibition means is operated.

6. Apparatus according to claim 2, wherein said film cartridge has indication means for indicating the exposure state of said film, said indication means indicating that that all frames have been exposed when said inhibition means is operated.

7. Camera apparatus capable of using a film cartridge which has film exposure state indication means for indicating the exposure state of a film in said film cartridge by indicating that the exposure state is one of (i) a state where all frames have been exposed, (ii) a state where only a portion of the frames have been exposed, and (iii) a state where all of the frames have been exposed, said camera .apparatus comprising:
   (a) intermediate rewinding means for rewinding the film into the film cartridge at a stage where a portion of the film frames has not yet been exposed; and
   (b) indication changeover means for changing over the indication of said film exposure state-indication means to indicate the state where all frames have been exposed upon the operation of said intermediate rewinding means even when said indication means initially indicates that the exposure state is the state where only a portion of the frames have been exposed.

8. Camera apparatus capable of using a film cartridge having a film exposure state indication means for indicating the exposure state of a film in said film cartridge in such a manner that said film exposure state is one of (i) a state in which all frames have been exposed, (ii) a state in which only a portion of the frames have been exposed, and (iii) a state in which all frames are unexposed, said camera apparatus comprising:

(a) detection means for detecting the film exposure state;

(b) intermediate rewinding means for performing an intermediate rewinding operation on the film of the film cartridge said intermediate rewinding operation being performed at a stage where a portion of the frames have been exposed; and (c) prohibition means for prohibiting the operation of said intermediate rewinding means in response to a detection output of said detection means when said detection means detects that the film exposure state is the state in which only a portion of the frames have been exposed.

9. Camera apparatus, comprising:

(a) intermediate rewind means for performing an intermediate rewinding operation on a film of a film cartridge installed in said camera apparatus, said intermediate rewinding operation being performed at a stage when a portion of the film has not yet been exposed;

(b) detection means for detecting a number of times the intermediate rewinding operation has been performed by said intermediate rewind means in the past on the same film cartridge; and (c) inhibition means for inhibiting an execution of a photographing operation on the film in said cartridge if the detected number of times of said intermediate rewinding operations is larger than a predetermined number set according to the type of said film.

10. Apparatus according to claim 9, wherein said detection means comprises means for detecting that said film is a negative film or a positive film.

11. Camera apparatus capable of using a film cartridge including a film having a magnetic memory portion, said camera comprising:

(a) a magnetic head for writing and/or reading information to or from said magnetic memory portion of said film;

(b) intermediate rewind means for performing an intermediate rewinding operation on said film of said film cartridge, said intermediate rewinding operation being performed at a stage where a portion of the film has not yet been exposed;

(c) means for discriminating a type of the film in said film cartridge;

(d) a processing circuit for writing onto said film magnetic memory portion information representing that an intermediate rewinding operation has been performed when said intermediate rewind means performs the intermediate rewinding operation, said processing circuit writing said information at every intermediate rewinding operation performed by said intermediate rewind means so that said film magnetic memory portion stores information representing a number of times the intermediate rewinding operation has been performed in the past on said film cartridge; and (e) means for reading from said film magnetic memory portion the stored number of times said intermediate rewinding operation has been performed by said intermediate rewind means.

12. Camera apparatus comprising:

(a) intermediate rewind means for performing an intermediate rewinding operation on a film of a film cartridge installed in the camera apparatus, said intermediate rewinding operation being performed at a stage where a portion of the film has not yet been exposed;

(b) preset means for presetting an allowable number of times the intermediate rewinding operation may be performed by said intermediate rewind means;

(c) detection means for detecting a number of times the intermediate rewinding operation has been performed by said intermediate rewind means in the past on the same film cartridge; and (d) inhibition means for inhibiting a photographing operation for the film in said same film cartridge in a case where the number of times the intermediate rewinding operation has been performed by said intermediate rewind means is larger than the number of times set by said preset means.

13. Apparatus according to claim 12 further comprising means for limiting the number of times which can be set by said preset means.

14. Camera apparatus capable of using a film cartridge which holds a film having a magnetic memory portion and which has film exposure state indication means for indicating that a film exposure state is one where (i) all frames have been exposed, (ii) only a portion of the frames have been exposed, or (iii) all frames are unexposed frames, said camera apparatus comprising:

(a) a magnetic head for writing and/or reading information to or from said magnetic memory portion of said film;

(b) intermediate rewind means for rewinding said film into said film cartridge at a stage where a portion of the film frames has not yet been exposed;

(c) detection means for detecting the film exposure state;

(d) a writing processing circuit, for in a case where said intermediate rewind means performs an intermediate rewinding operation, causing said magnetic head to write on said film magnetic memory_portion information representing that an intermediate rewinding operation has been executed;

(e) a reading processing circuit for causing said magnetic head to read from said film magnetic memory portion the information representing that the intermediate rewinding operation has been performed; and (f) control means for causing said intermediate rewind means to automatically rewind the film into the film cartridge when said reading processing circuit does not read from the film magnetic memory portion the information representing that the intermediate rewinding operation has been performed even though said detection means detects that the film exposure state is the state where only a portion of the frames have been exposed.

15. Apparatus according to claim 14, further comprising alarm means for issuing an alarm after said film has been automatically rewound.

16. Apparatus according to claim 14, wherein the film exposure state indication means of said film cartridge indicates that all frames have been exposed after said film has been automatically rewound.

17. Camera apparatus which uses a film cartridge containing a film having a magnetic memory portion and which has film exposure state indication means for indicating that the film exposure state of the film in the cartridge is one of (i) a state in which all of the frames have been exposed, (ii) a state in which only a portion of the frames have been exposed, or (iii) a state in which all frames are unexposed frames, said camera apparatus comprising:

(a) a magnetic head for writing and/or reading information to of from said magnetic memory portion of said film;

(b) intermediate rewind means for rewinding said film into said film cartridge at a stage where a portion of the film frames has not yet been exposed;

(c) detection means for detecting the film exposure state;

(d) a writing processing circuit for, in a case where said intermediate rewind means performs an intermediate rewinding operation, causing said magnetic head to write onto said film magnetic memory portion information representing that an intermediate rewinding operation has been executed;

(e) a reading processing circuit for causing said magnetic head to read from said film magnetic memory portion the information representing that the intermediate rewinding operation has been performed; and (f) control means for causing the film exposure state indication means to indicate that all frames have been exposed in a case where said reading processing circuit does not read the information from said film magnetic memory portion the information representing that the intermediate rewinding operation has been performed even though said detection circuit detects the film exposure state to be the state where only a portion of the frames have been exposed.

18. Camera apparatus which uses a film cartridge holding a film having a magnetic memory portion and which has film exposure state indication means for indicating that the film exposure state of the film in the cartridge in one of (i) a state in which all of the frames have been exposed, (ii) a state in which only a portion of the frames have been exposed, or (iii) a state in which all frames are unexposed frames, said camera apparatus comprising:

(a) a magnetic head for writing and/or reading information to or from said magnetic memory portion of said film;

(b) intermediate rewind means for performing an intermediate rewinding operation on said film of said cartridge, said intermediate film rewinding operation being performed at a stage where a portion of the film has not yet been exposed;

(c) detection means for detecting the film exposure state;

(d) a writing processing circuit for, in a case where said intermediate rewind means performs an intermediate rewinding operation, causing said magnetic head to write on the film magnetic memory portion information representing that the intermediate rewinding operation has been performed;

(e) a reading processing circuit for causing said magnetic head to read from said film magnetic memory portion the information representing that the intermediate rewinding operation has been performed; and (f) prohibition means for prohibiting the intermediate rewind means from performing an intermediate rewinding operation when said reading processing circuit does not read from the film magnetic memory portion the information representing that the intermediate rewinding operation has been performed even though said detection means detects the film exposure state to be the state where only a portion of the frames has been exposed.

19. Camera apparatus which uses a film cartridge containing a film and having film exposure state indication means for indicating that the exposure state of the film in the film cartridge is one of (i) a state in which all frames have been exposed, (ii) a state in which only a portion of the frames have been exposed, or (iii) a state in which all frames are unexposed frames, said camera apparatus comprising:

(a) detection means for detecting the number of unexposed frames of said film;

(b) intermediate rewind means for rewinding said film into said film cartridge at a stage where a portion of the film frames has not yet been exposed; and (c) means for, in response to an intermediate rewinding operation performed by said intermediate rewind means, changing-over the film exposure state indication means to the state where all frames have been exposed when the number of unexposed frames detected by said detection means is equal to or smaller than a predetermined number, said predetermined number being smaller than a number of frames of said film, and for changing-over said film exposure state indication means to the state where a portion of the frames have been exposed when the number of unexposed frames detected by said detection means is larger than said predetermined number.

20. Apparatus according to claim 19, further comprising reset means for resetting said predetermined number to zero.

21. Apparatus according to claim 19, further comprising:

frame number input means for inputting a frame number; and memory means for memorizing said frame number inputted by said frame number input means, wherein, in a case where the number of unexposed frames is smaller than said memorized predetermined number, said means for changing-over causes said indication means of said film cartridge to indicate that all frames have been exposed.

22. Camera apparatus which uses a film cartridge containing a film and having film exposure state indication means for indicating that the exposure state of the film in the film cartridge is one of (i) a state in which all frames have been exposed, (ii) a state in which only a portion of the frames have been exposed, or (iii) a state in which all frames are unexposed frames, said camera apparatus comprising:

(a) intermediate rewind means for rewinding said film into said film cartridge at a stage where a portion of the film frames has not yet been exposed; and (b) means for changing-over the indication of said film exposure state indication means when said intermediate rewind means performs an intermediate rewinding operation; and (c) selection means for selectively causing said indication changeover means to cause said film exposure state indication means to indicate that only partial frames have been exposed or that all frames have been exposed in a case where said film has been intermediately rewound by said intermediate rewind means.

23. Apparatus according to claim 22, further comprising indication means for indicating the number of unexposed frames after said film has been rewound.

* * * * *

UNITED STATES PATENT AND TRADEMARK OFFICE
CERTIFICATE OF CORRECTION

PATENT NO. : 5,530,497
DATED : June 25, 1996
INVENTOR(S) : Masaaki Ishihara

Page 1 of 2

It is certified that error appears in the above-indentified patent and that said Letters Patent is hereby corrected as shown below:

Drawings:

SHEET 41

Fig. 35A, "NAMBER N" should read --NUMBER N--.

Column 1,

Line 21, "exposed." should read --exposed is
       retained.--; and
   Line 22, "is retained" should be deleted.

Column 2,

Line 26, "with" should be deleted and "film" should
       read --film,--.

Column 6,

Line 19, "ms" should read --is--.

Column 10,

Line 37, "compiLeted." should read --completed.--.

Column 11,

Line 21, "circuit i1" should read --circuit 11--.

Column 22,

Line 31, "photomerry" should read --photometry--.

UNITED STATES PATENT AND TRADEMARK OFFICE
CERTIFICATE OF CORRECTION

PATENT NO. : 5,530,497  
DATED : June 25, 1996  
INVENTOR(S) : MASAAKI ISHIHARA

It is certified that error appears in the above-indentified patent and that said Letters Patent is hereby corrected as shown below:

<u>Column 31,</u>

Line 62, "particularly," should read --particularity,--.

<u>Column 32,</u>

Line 65, "have" should read --has--.

<u>Column 34,</u>

Line 17, "claim 12" should read --claim 12,--; and  
   Line 51, "have" should read --has--.

<u>Column 35,</u>

Line 27, "have" should read --has--; and  
   Line 33, "have" should read --has--.

<u>Column 36,</u>

Line 6, "have" should read --has--; and  
   Line 44, "have" should read --has--.

Signed and Sealed this

Nineteenth Day of November, 1996

Attest:

BRUCE LEHMAN

*Attesting Officer*     *Commissioner of Patents and Trademarks*